(12) United States Patent
Osada

(10) Patent No.: US 6,847,397 B1
(45) Date of Patent: Jan. 25, 2005

(54) SOLID-STATE IMAGE SENSOR HAVING PIXELS SHIFTED AND COMPLEMENTARY-COLOR FILTER AND SIGNAL PROCESSING METHOD THEREFOR

(75) Inventor: Masaru Osada, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 729 days.

(21) Appl. No.: 09/606,005

(22) Filed: Jun. 29, 2000

(30) Foreign Application Priority Data

Jul. 1, 1999 (JP) .......................................... 11/187178

(51) Int. Cl.$^7$ ............................................. H04N 5/225
(52) U.S. Cl. ....................................................... 348/273
(58) Field of Search ........................ 348/273; 358/453, 358/511; 382/167

(56) References Cited

U.S. PATENT DOCUMENTS

| | | | |
|---|---|---|---|
| 4,516,154 A | | 5/1985 | Nishizawa et al. |
| 5,347,371 A | * | 9/1994 | Nishimura et al. .......... 358/453 |
| 5,347,599 A | * | 9/1994 | Yamashita et al. .......... 382/278 |
| 5,448,300 A | * | 9/1995 | Yamada et al. .............. 348/571 |
| 5,471,323 A | * | 11/1995 | Suetsugi et al. ............. 358/511 |
| 6,160,593 A | * | 12/2000 | Nakakuki .................... 348/713 |
| 6,404,918 B1 | * | 6/2002 | Hel-or et al. ................ 382/167 |
| 6,563,538 B1 | * | 5/2003 | Utagawa ...................... 348/273 |
| 6,603,509 B1 | * | 8/2003 | Haruki ...................... 348/231.1 |

FOREIGN PATENT DOCUMENTS

| JP | 59072283 | 4/1984 |
|---|---|---|
| JP | 8031688 | 5/1985 |
| JP | 8340455 | 12/1996 |

* cited by examiner

Primary Examiner—Andrew Christensen
Assistant Examiner—Brian Genco
(74) Attorney, Agent, or Firm—Birch, Stewart, Kolasch & Birch, LLP.

(57) ABSTRACT

A solid-state image sensor capable of enhancing efficient use of incident light and increasing the resolution of an image and a signal processing method therefore are disclosed. A digital camera includes an image pickup section having a photosensitive array in which photosensitive cells or photodiodes are arranged. Signal charges, or pixel data, are read out of the photodiodes, two lines at a time, three lines at a time, or three lines at a time with line-by-line shift in accordance with a color filter using complementary colors. A signal processing section includes a data correcting circuit for correcting the pixel data. Pixel data of one of three primary colors R, G and B is interpolated in the position of each virtual photosensitive cell or that of each real photosensitive cell. The above color filer uses more efficiently incident light than a filter using the primary colors and improves the sensitivity of the photosensitive cells in a dense pixel arrangement, thereby contributing to the enhancement of image quality. Further, the generated pixel data are used to interpolate pixel data in the real photosensitive cells or the virtual photosensitive cells. This is successful to broaden the frequency band of the pixel data of the real photosensitive cells or those of the virtual photosensitive cells and therefore to improve image quality while obviating false colors.

56 Claims, 63 Drawing Sheets

(a) SQUARE LATTICE ARRANGEMENT (b) HONEYCOMB ARRANGEMENT

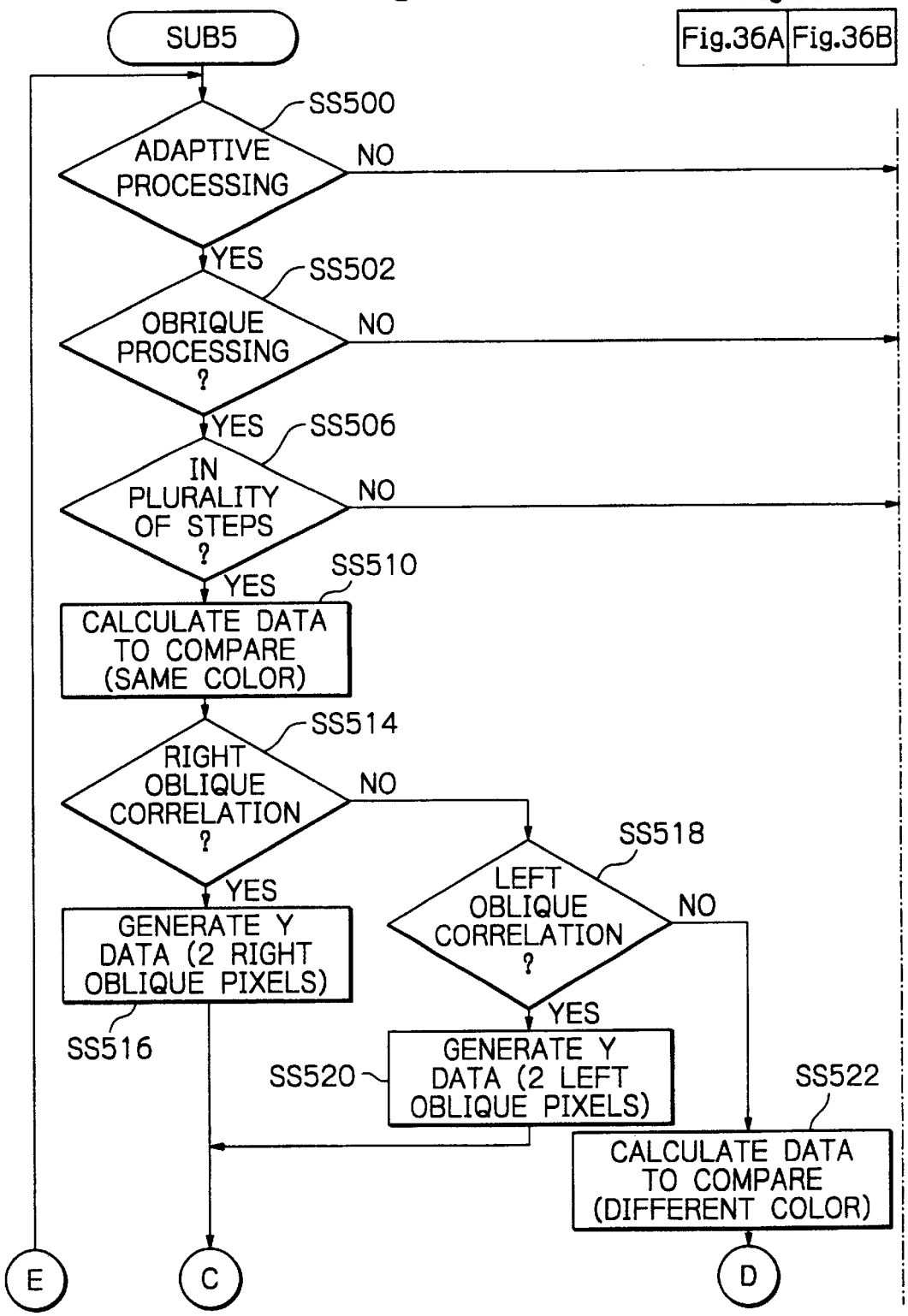

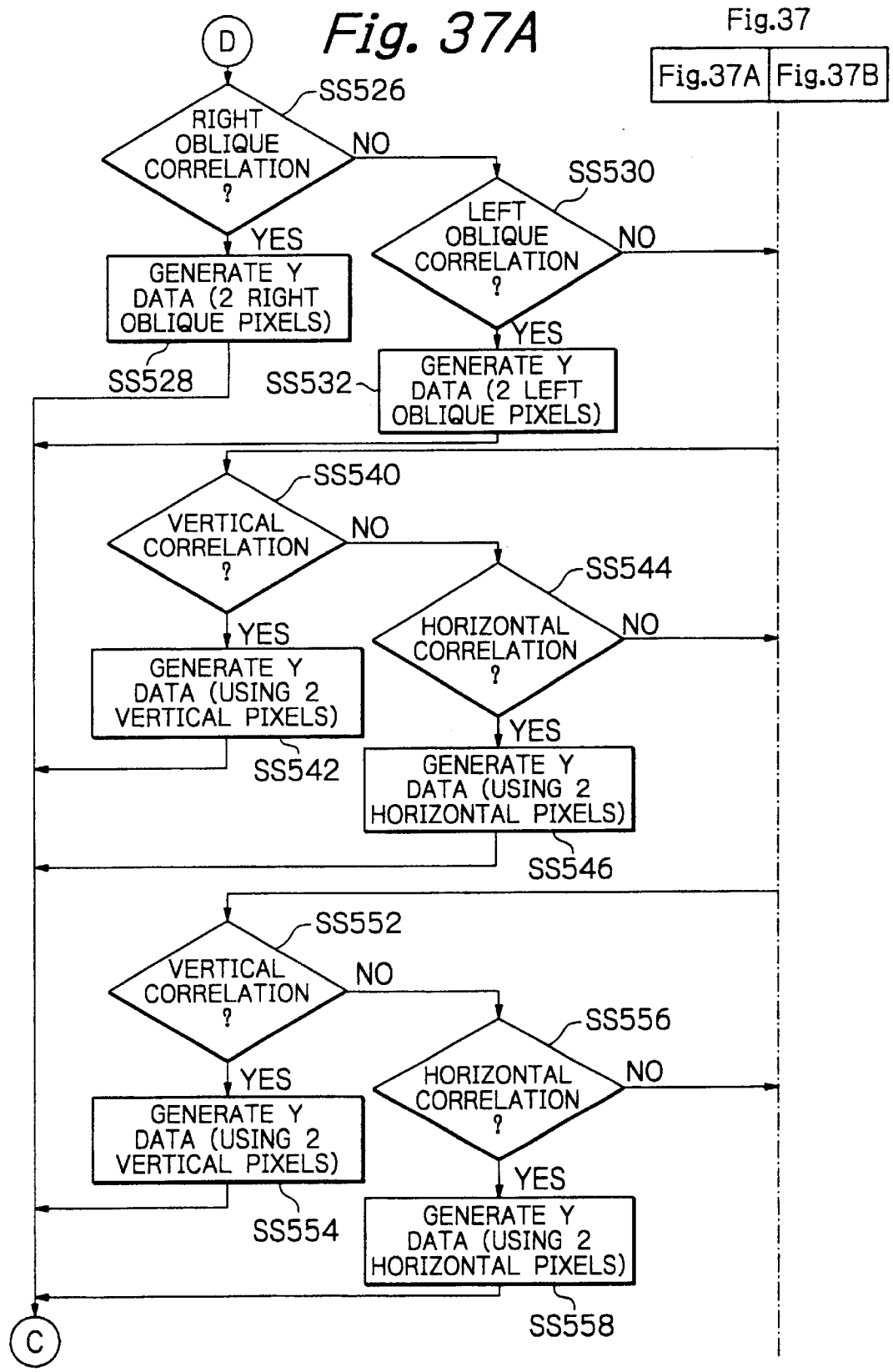

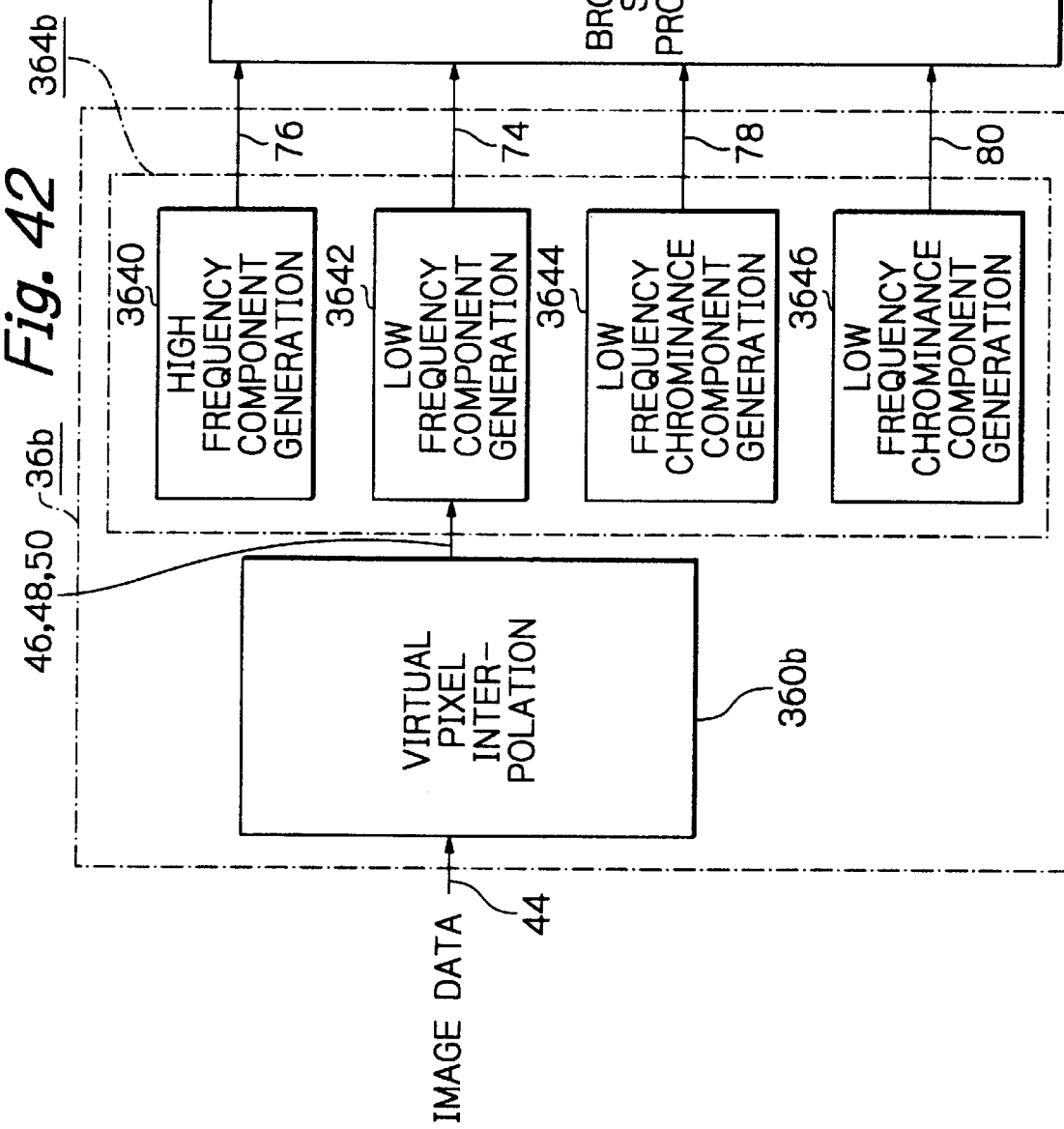

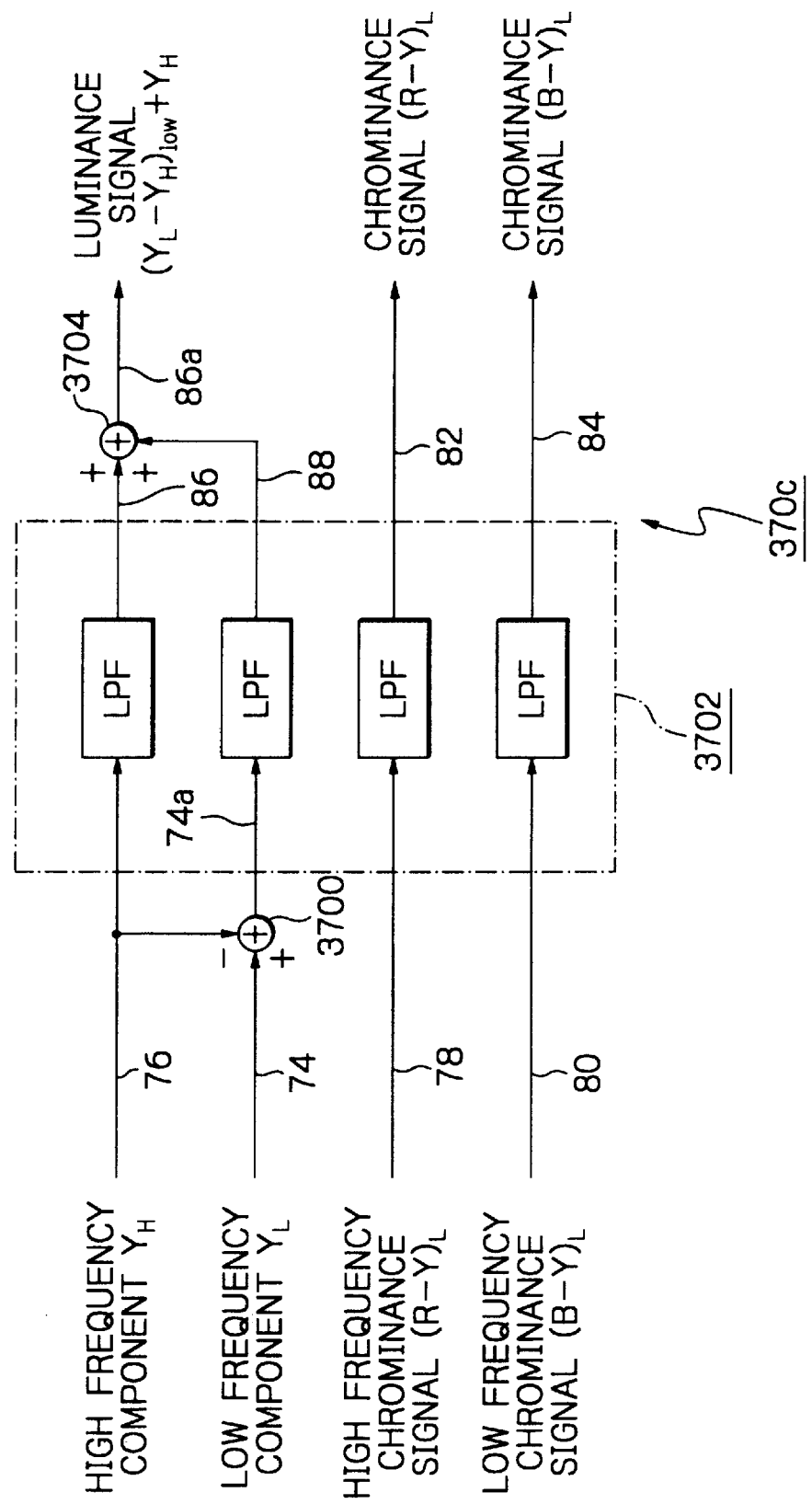

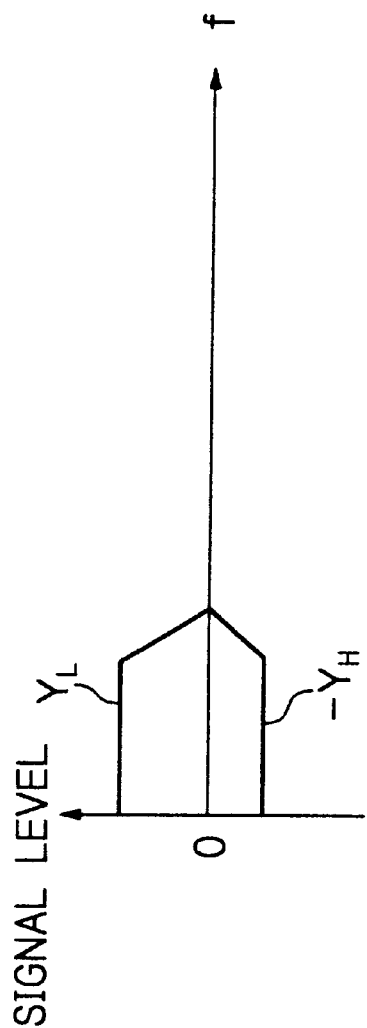
Fig. 45A   SIGNAL $(Y_L - Y_H)_{low}$
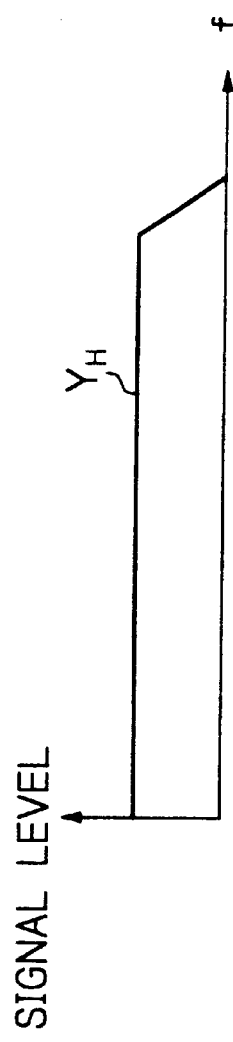
Fig. 45B   SIGNAL $Y_H$
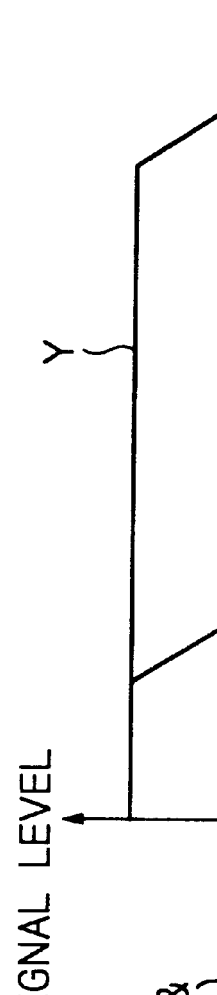
Fig. 45C   LUMINANCE SIGNAL Y (VERTICAL & HORIZONTAL)
$Y = (Y_L - Y_H)_{low} + Y_H$

| Fig48A | Fig.48B |

Fig. 49A
| $R_{10}$ | 11 | $B_{12}$ | 13 |
| 20 | $G_{21}$ | 22 | $G_{23}$ |
| $B_{30}$ | 31 | $R_{32}$ | 23 |
| 40 | $G_{41}$ | 42 | $G_{43}$ |
| $R_{50}$ | 51 | $B_{52}$ | 53 |
Fig. 49D
Fig. 49B
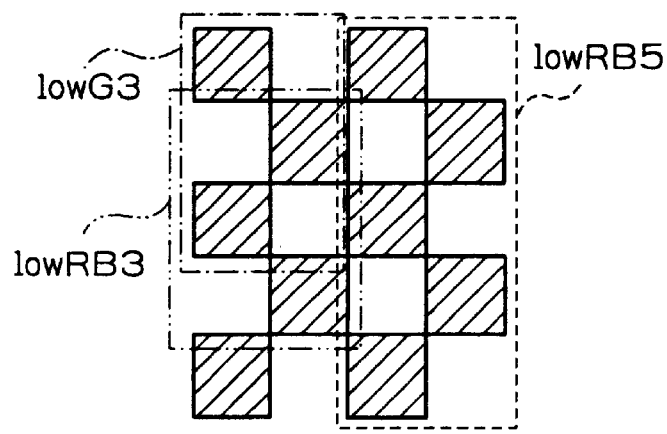
lowG3, lowRB5, lowRB3
Fig. 49E
Fig. 49C
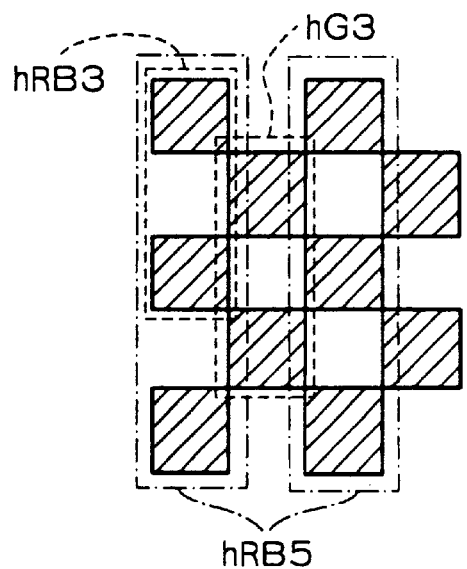
hRB3, hG3, hRB5

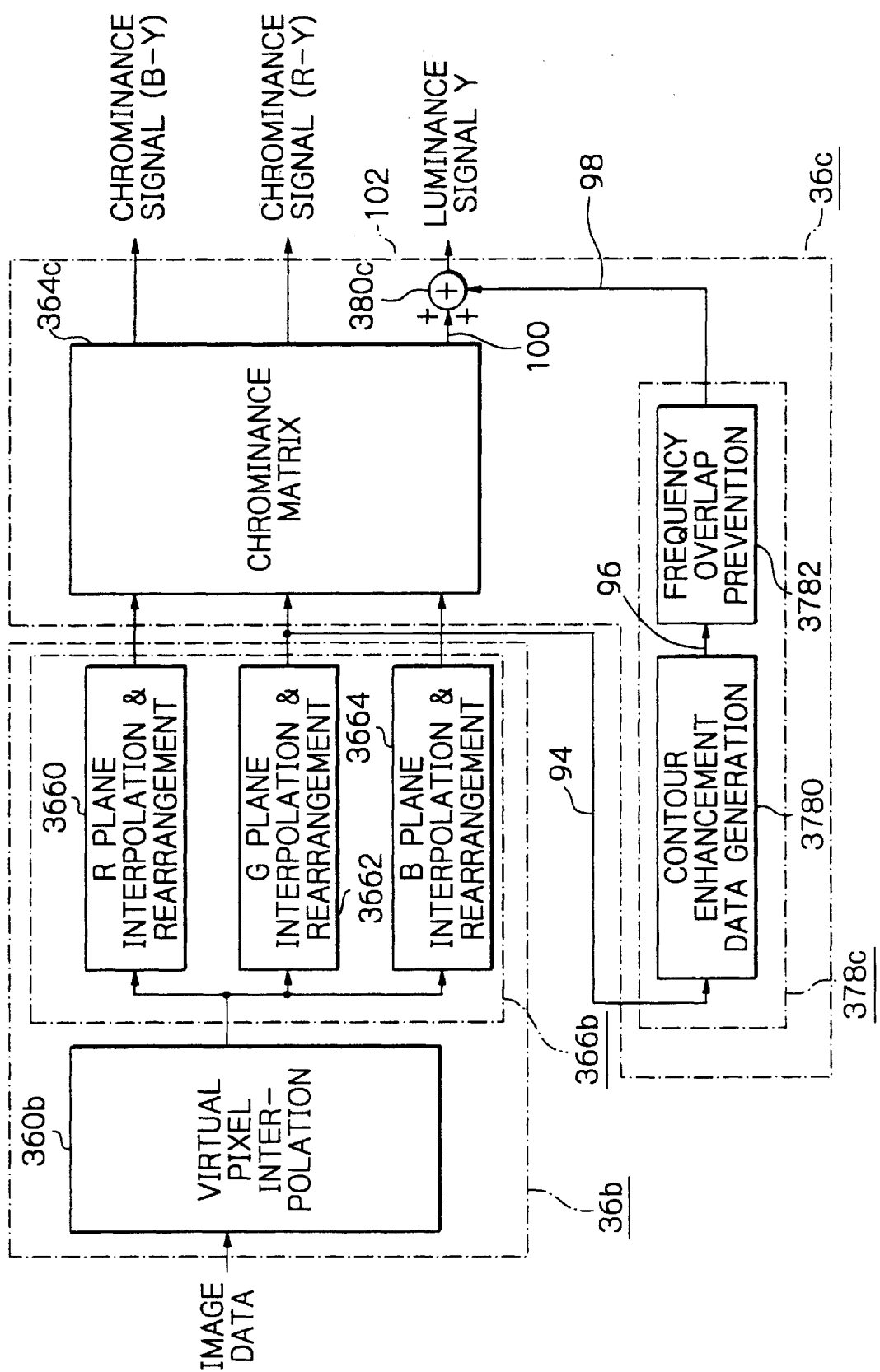

SOLID-STATE IMAGE SENSOR HAVING PIXELS SHIFTED AND COMPLEMENTARY-COLOR FILTER AND SIGNAL PROCESSING METHOD THEREFOR

BACKGROUND OF THE INVENTION

1. Field of the Invention

The present invention relates to a solid-state image sensor having pixels shifted and complementary-color filter and a signal processing method therefor. The apparatus and method of the present invention are advantageously applicable to, e.g., a digital camera, an image inputting apparatus or an image processing apparatus.

2. Description of the Background Art

Today, a digital camera with a solid-state image sensor is spreading because of various advantages thereof. For example, this type of camera implements a picture comparable in resolution with one achievable with a traditional camera using a silver halide photo-sensitive type of film. Also, the digital camera allows the image to be viewed on a monitor or LCD (Liquid Crystal Display) mounted on the camera on a real-time basis or allows it to be input to a computer, as desired. While the pixel size of the image sensor is decreasing to enhance resolution and to reduce the cost, a decrease in pixel size translates into a decrease in sensitivity. In this respect, resolution and sensitivity cannot be enhanced at the same time.

In light of the above, Japanese patent laid-open publication No. 340455/1996, for example, discloses an image signal processing device constructed to enhance resolution by having pixels shifted with respect to each other. Despite that the image processing device uses photosensitive cells arranged in a non-lattice pattern, it is capable of outputting pixel data corresponding to pixels arranged in a lattice pattern suitable for a computer. For this purpose, the image processing device includes pixel data generating means for generating, for a given pixel, pixel data from the image signals of a plurality of real pixels adjoining the given pixel and arranged in a non-lattice pattern.

Japanese patent laid-open publication No. 72283/1984 teaches a video signal processing device for an electronic still camera including a solid-state image sensor of the type having pixels arranged in a checker pattern and capable of reading two scanning lines at a time. The video signal processing device includes first circuit means for interpolating two (upper and lower) scanning lines of video signals together in the horizontal direction so as to generate a single new horizontal scanning signal. Second circuit means delays the signal of lower ore of the above two scanning lines by a single scanning time, and combines the signal of the lower scanning line with the signal of upper one of the next two scanning lines in the horizontal direction, thereby generating another new horizontal scanning signal. The new horizontal scanning signals are output from the first and second circuit means at the same time. This allows two fields (odd and even) of signals in 2:1 interlace scanning to be output in parallel by one time of vertical scanning. The video signal processing device can therefore output a still picture of high quality even when the horizontal and vertical directions are replaced, i.e., without regard to the vertical/horizontal position of a frame.

Other various studies directed toward a smaller pixel size to be spatially sampled and higher sensitivity have also been reported. For example, the influence of the pixel size on the image pickup characteristics, particularly sensitivity and S/N (Signal-to-Noise) ratio, and an image pickup system using a single plate type color filter are discussed in Masafumi Inuiya "Image Pickup Characteristics in Megapixel DS Camera", the Society of Photographic Science and Technology of Japan, Digital Camera Group, 1998. Generally, a solid-state image sensor includes a color filter using three primary colors R (red), G (green) and B (blue) or complementary colors. Inuiya reported that a color filter using complementary colors promoted efficient use of incident light more than a color filter using primary colors.

As for an image pickup system using complementary colors, Japanese patent laid-open publication No. 31688/1983 proposes a solid-state color image sensor configured to improve resolution. In this solid color image sensor, photosensitive cells adjoining each other in the vertical direction are shifted from each other in the horizontal direction by half a pitch. Further, to reduce moire and enhance resolution, the spectral characteristics of three color filter segments are selected such that the sum of outputs of three adjoining photosensitive cells become a signal substantially corresponding to a luminance signal. More specifically, a luminance signal is produced from three adjoining pixels (two horizontal lines) by a complementary color scheme in which colors W (white), Ye (yellow) and Cy (cyan) are arranged in a delta configuration.

The arrangements taught in the above-described laid-open publication Nos. 31688/1983 and 72283/1984 each use a combined two-line reading scheme (or simultaneous two-line independent reading scheme) belonging to a family of color multiplexing schemes. The combined two-line reading scheme feeds signal charges derived from incident light to signal lines and reads them out of two signal lines at a time while combines them. Further, the above documents both are directed toward a movie and use a MOS (Metal Oxide Semiconductor) image sensor.

MOS photosensitive cells, however, do not allow full-pixel (simultaneous) reading conventional with CCDs (Charge Coupled Devices) to be practiced. It follows that resolution available with MOS photosensitive devices is lower than resolution achievable with full-pixel (simultaneous) reading. This is particularly true with the vertical resolution of a moving picture. Even the signal processing device of laid-open publication No. 340455/1996 is not satisfactory as to vertical resolution.

SUMMARY OF THE INVENTION

It is therefore an object of the present invention to provide a solid-state image sensor capable of promoting the efficient use of incident light and enhancing the resolution of an image, and a signal processing method therefor.

In accordance with the present invention, a solid-state image sensor separates the colors of incident light at positions corresponding to apertures formed in a screen member, transforms the color-separated light to electric signals representative of an image, and processes the electric signals to thereby output broadband signals. The image sensor includes a color separating section including, among a plurality of color filters each having a particular spectral characteristic for separating the colors of the light incident via the apertures, a color filter having a spectral characteristic of complementary colors. A photosensitive array includes photosensitive cells, which photoelectrically transduce the light passed through the color filter, and virtual photosensitive cells adjoining the above photosensitive cells. The photosensitive cells are bidimensionally arranged while being shifted from each other in the vertical direction and/or the horizontal direction. Electrodes are so arranged as to go around the apertures formed in the photosensitive array for reading signals out of the photosensitive cells. An image pickup section includes transfer registers for sequentially transferring the signals read out via the electrodes in the horizontal direction or the vertical direction of the photosensitive array. A digital-to-analog converter converts the signals output from the image pickup section to digital data. Assume that positions on a plane, in which the digital data are arranged, void of the photosensitive cells due to the shifted arrangement of the photosensitive cells are virtual photosensitive cells. Then, a signal processing section generates pixel data of any one of R, G and B for interpolating the virtual photosensitive cells or the actually present photosensitive cells on the basis of pixel data that include a plurality of complementary colors and are read out of the actually present photosensitive cells, two lines at a time, three lines at a time, or three lines at a time with a line-by-line shift in accordance with the color filter, and broadens the frequency band of pixel data at the actually present photosensitive cells and virtual photosensitive cells on the basis of the pixel data interpolated.

Also, in accordance with the present invention, a signal processing method uses photosensitive cells bidimensionally arranged beneath apertures that are formed in a screen member for causing light to be incident to the photosensitive cells via a plurality of color filters each having a particular spectral sensitivity characteristic. The apertures have a shape of a square lattice or a polygon and shifted in the vertical direction column by column or in the horizontal direction row by row or a square lattice rotated by 45° or a polygon. The method handles the photosensitive cells as bidimensional pixels for transforming the incident light to image signals based on the pixels and processes the images signals to thereby output broadband image signals. The signal processing method begins with a step of converting signals read out of the photosensitive cells, two lines at a time, three lines at a time or three lines at a time with a line-by-line shift in accordance with the combination pattern of the filters to digital data. A data storing step stores pixel data produced by the digitizing step. A virtual pixel interpolating step reads out the pixel data in the same manner as the signals are read out of the photosensitive cells, and interpolates pixel data of any one of R, G and B in the position of a subject virtual photosensitive cell under consideration, which is void of a photosensitive cell due to the shifted arrangement of the photosensitive cells, on the basis of pixel data of complementary colors output from the.photosensitive cells adjoining the subject virtual photosensitive cell. A band broadening step interpolates pixel data of R, G or B in the position of a subject actually present photosensitive cell under consideration by using the pixel data interpolated by the virtual pixel interpolating step, and uses resulting pixel data to broaden the frequency band of the pixel data at the positions of the actually present photosensitive cells and virtual photosensitive cells.

BRIEF DESCRIPTION OF THE DRAWINGS

The objects and features of the present invention will become more apparent from the consideration of the following detailed description taken in conjunction with the accompanying drawings in which:

FIG. 36 shows how to combine FIGS. 36A and 36B;

FIGS. 36A and 36B are, when combined as shown in FIG. 36, a flowchart showing how luminance data are generated by adaptive processing executed in a subroutine SUB5 shown in FIG. 35;

FIG. 37 shows how to combine FIGS. 37A and 37B;

FIGS. 37A and 37B are, when combined as shown in FIG. 37, a flowchart showing processing to follow the processing shown in FIGS. 36A and 36B;

Figures 40A, 40B, 40C, 40D:
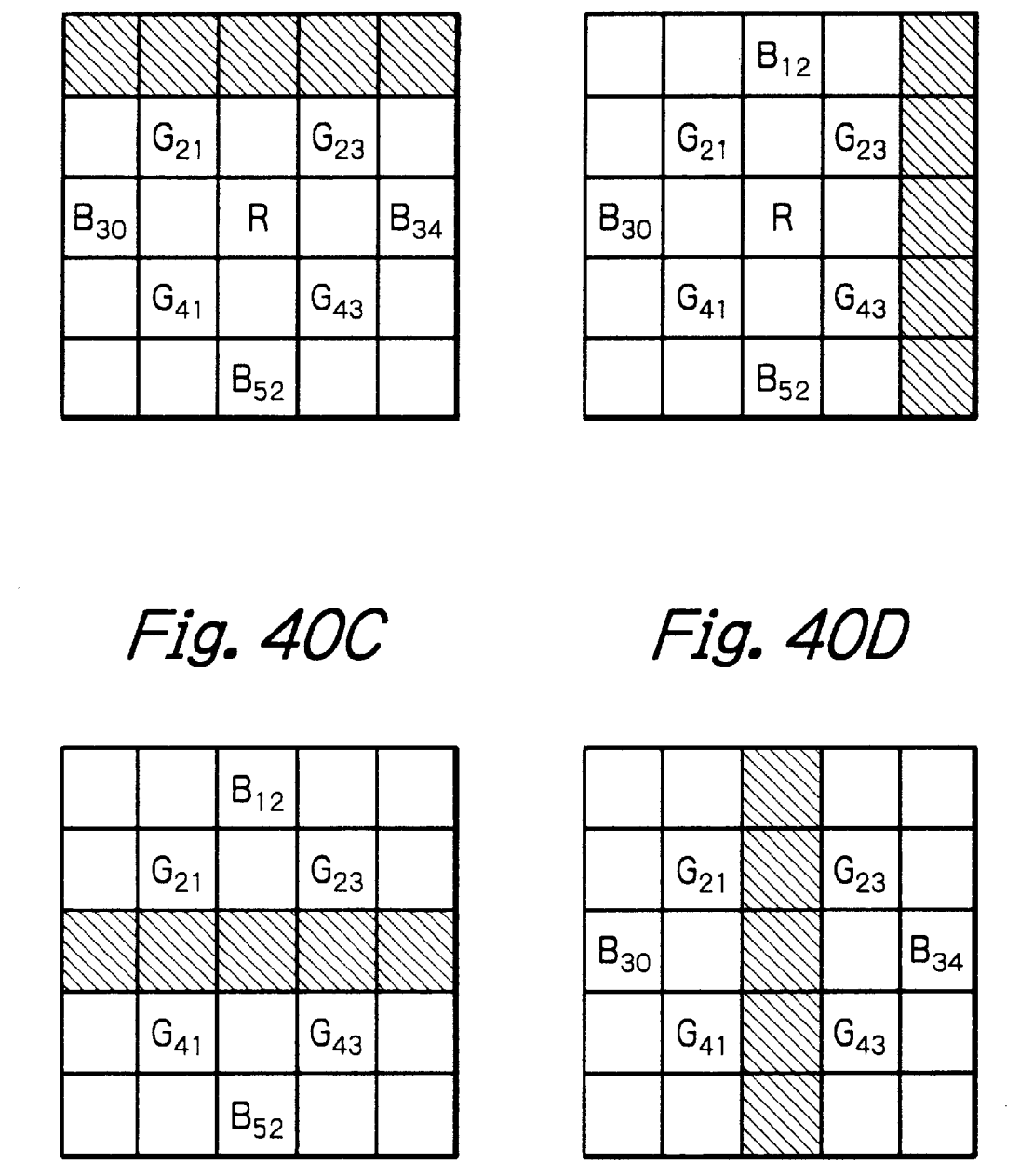

FIGS. 40A through 40D are schematic views each showing a particular color boundary pattern with which decision on vertical correlation and horizontal correlation is practicable in the subroutine SUB5 of FIGS. 36 through 38;

FIG. 42 is a schematic block diagram showing a modification of the signal processing included in the illustrative embodiment;

FIG. 44 is a schematic block diagram showing a pseudo-frequency addition also included in the modification;

FIGS. 45A through 45C are schematic views showing the frequency allocation of a signal output from the pseudo-frequency addition;

FIGS. 49A through 49E are schematic views showing a basic arrangement and areas to be used in the subroutine SUB6;

FIG. 54 is a schematic block diagram showing another modification of the signal processing included in the illustrative embodiment;

DESCRIPTION OF THE PREFERRED EMBODIMENT

Figure 1:
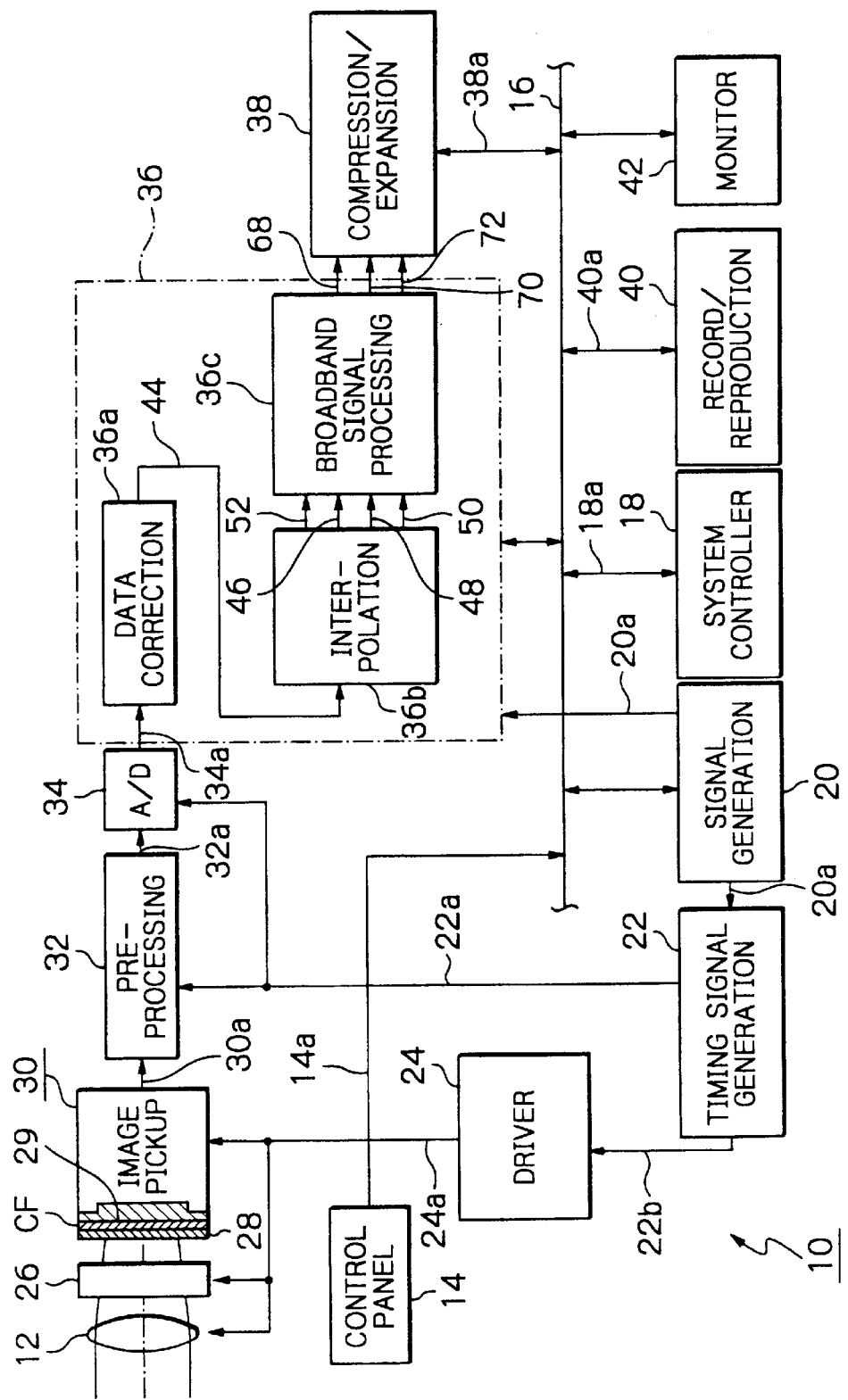
FIG. 1 is a block diagram schematically showing a digital camera including a solid-state image sensor embodying the present invention.

Referring to FIG. 1 of the drawings, a digital still camera to which the present invention is applied is shown and generally designated by the reference numeral 10. Part of the digital still camera 10 not relevant to the understanding of the illustrative embodiment is not shown in FIG. 1 and will not be described specifically. Signals appearing in the circuitry of FIG. 1 are designated by the same reference numerals as connection lines on which they appear.

As shown in FIG. 1, the camera 10 includes an optical lens assembly 12, a control panel 14, a system controller 18, a signal generation 20, a timing signal generation 22, a driver 24, an iris diaphragm mechanism 26, an optical low-pass filter 28, a color filter or color separating section CF, an image pickup 30, a preprocessing 32, an analog-to-digital converter (A/D) 34, a signal processing 36, a compression/expansion 38, a record/reproduction 40, and a monitor 42. The optical lens assembly 12 has, e.g., two or more optical lenses and includes a zoom mechanism and an AF (Automatic Focus control) mechanism although not shown specifically. In response to an operation signal 14a output from the control panel 14, the zoom mechanism controls the positions of the lenses and therefore the view angle of a screen. The AF mechanism focuses the camera 10 on a desired subject in accordance with the distance between the camera 10 and the subject. The operation signal 14a is delivered to the system controller 18 via a system bus 16. Drive signals are fed to the lens assembly 12 via the signal generation 20, timing signal generation 22, and driver 24, as will be described specifically later.

The control panel 14 includes a shutter switch, not shown, and allows the operator of the camera to select, e.g., a desired item appearing on the monitor 42. Particularly, the shutter switch sends the operation signal 14a to the system controller 18 via the system bus 16, causing the system controller 18 to control the camera 10 in a plurality of steps.

The system controller 18 includes a CPU (Central Processing Unit) and a ROM (Read Only memory) although not shown specifically. The ROM stores an operation sequence assigned to the camera 10. In response to the operation signal or information 14a received from the control panel 14, the system controller 18 outputs control signals 18a for controlling the various sections of the camera 10 in accordance with the signal 14a and data stored in the ROM. The control signals 18a are delivered to the signal generation 20, timing signal generation 22, preprocessing 32, and A/D 34.

In addition, the control signals 18a are fed to the signal processing 36, compression/expansion 38, record/reproduction 40 and monitor 42 via the system bus 16. The delivery of the control signals 18a to the timing signal generation 22 is not shown in FIG. 1 specifically.

The signal generation 20 causes an oscillator included therein to generate a system clock 20a under the control of the system controller 18. The system clock 20a is fed to the timing signal generation 22 and signal processing 36. Also, the system clock 20a is delivered via, e.g., the system bus 16 as an operation timing of the system controller 18.

The timing signal generation 22 includes a circuit for generating, based on the system clock 20a and control signal 18a, timing signals 22a and 22b that cause the various sections of the camera 10 to operate. Specifically, the timing signal 22a is applied to the preprocessing 32 and A/D 34 while the timing signal 22b is applied to the driver 24. The driver 24 delivers drive signals 24a to the zoom adjusting mechanism and AF mechanism of the lens assembly 12 as well as to the iris diaphragm mechanism 26 and image pickup 30.

The iris diaphragm mechanism 26 controls the sectional area of a light beam incident thereto, i.e., an opening area such that a light beam optimal for a shot is input to the image pickup 30. The drive signal 24a causes the mechanism 26 to operate under the control of the system controller 18. The system controller 18 executes AE (Automatic Exposure control) processing, i.e., calculates an opening and an exposing time on the basis of signal charges output from the image pickup 30 by photoelectric conversion. More specifically, the system controller 18 delivers the control signal 18a representative of the calculated opening and exposing time to the timing signal generation 22. In response, the timing signal generation 22 feeds the timing signal 22b to the driver 24. The driver 24 delivers the drive signal 24a corresponding to the timing signal 22b to the mechanism 26.

The image pickup 30 includes solid-state photosensitive cells or image sensing devices 29 so arranged as to form a plane perpendicular to the optical axis of the lens assembly 12. The optical low-pass filter 28 limits the spatial frequency of an optical image to a range below the Nyquist frequency. The color filter CF is positioned at the light input side of the photosensitive cells 29 integrally with the optical low-pass filter 28. The color filter CF has filter segments corresponding one-to-one to the photosensitive cells 29. The configuration and operation of the color filter CF will be described more specifically later. The photosensitive cells 29 may be implemented by CCDs (Charge Coupled Devices) or MOS devices.

The image pickup 30 delivers signal charges 30a produced by photoelectric conversion to the preprocessing 32 at a preselected timing, e.g., every time an electronic shutter is turned off. Assume that the photosensitive cells 29 are implemented by CCDs. Then, to read out the signal charges 30a, use is made of a color multiplexing system of field store, combined two-line read-out type or of simultaneous three-line read-out type. The latter type of color multiplexing system allows pixels to be interpolated in accordance with the arrangement of the color filter CF. These color multiplexing systems will be described specifically later.

The preprocessing 32 includes a CDS (Correlated Double Sampling) circuit made up of a clamp circuit and a sample and hold circuit, although not shown specifically. When the photosensitive cells 29 are implemented by CCDs by way of example, the clamp circuit clamps various kinds of noise basically ascribable to the cells 29 in accordance with the timing signal output from the timing signal generation 22. The sample and hold circuit samples and holds the signal charges in accordance with the timing signal. The CDS circuit feeds a signal 32a free from noise to the A/D 34.

The A/D 34 quantizes the levels of the signals or analog signals 32a with respect to a preselected quantization level, thereby outputting a digital signal 34a. The digital signal 34a is fed to the signal processing 36 in accordance with a conversion clock or similar timing signal 22a output from the timing signal generation 22.

The signal processing 36 is made up of a data correction 36a, an interpolation 36b, and a broadband signal processing 36c. The data correction 36a includes a gamma correcting circuit and an AWB (Automatic White Balance control) circuit for automatically executing white balance control, although not shown specifically. The gamma correcting circuit uses a lookup table listing a plurality of data sets each consisting of a digital signal fed to a ROM and correction data corresponding thereto. The data correction 36a corrects the digital data in accordance with a timing signal output from the timing signal generation 22. Preferably, the data correction 36a should include a buffer memory capable of temporarily storing a plurality of frames of digital data. The buffer memory may advantageously be implemented by a nondestructive type of memory in order to allow the digital data to be repeatedly read out. The data correction 36a delivers the corrected data, labeled 44, to the interpolation 36b.

Figure 2:
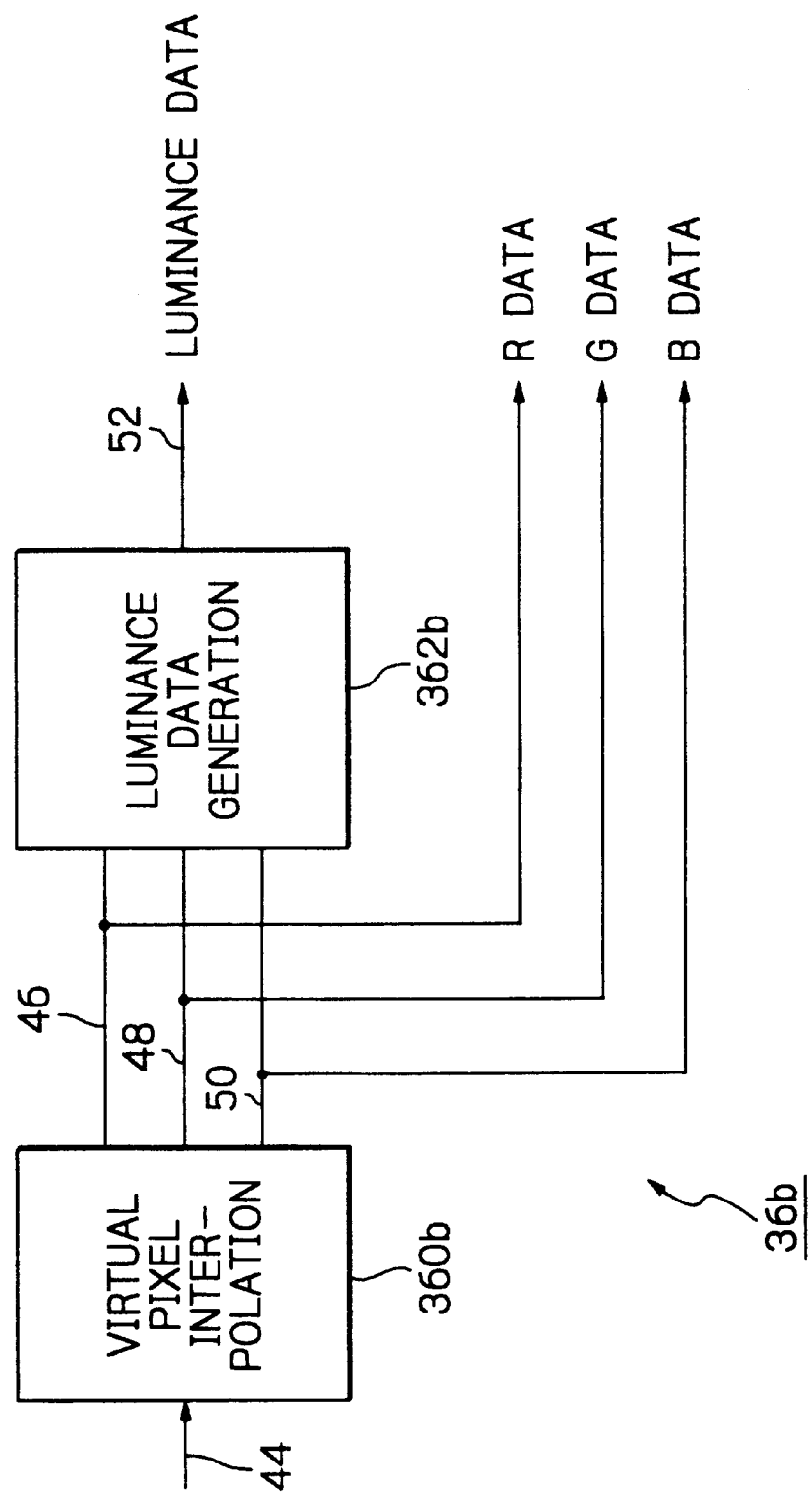
FIG. 2 is a schematic block diagram showing a specific configuration of an interpolation included in the illustrative embodiment.

FIG. 2 shows a specific configuration of the interpolation 36b. As shown, the interpolation 36b is made up of a virtual pixel interpolation 360b and a luminance data generation 362b. The pixel data output from the photosensitive cells 29, FIG. 1, are input to the virtual pixel interpolation 360b. In response, the virtual pixel interpolation 360b generates, by using surrounding pixel data 44, pixel data of primary color R, G or B for void regions, i.e., virtual photosensitive cells or virtual pixels. The luminance data generation 362b generates luminance data 52 for the virtual pixels in accordance with the pixel data output from the virtual pixel interpolation 360b. More specifically, the virtual pixel interpolation 360b calculates R data 46, G data 48 and B data 50 and interpolates them in the virtual pixels. The luminance data generation 362b outputs luminance data Y (high frequency luminance data $Y_h$)

Figure 3:
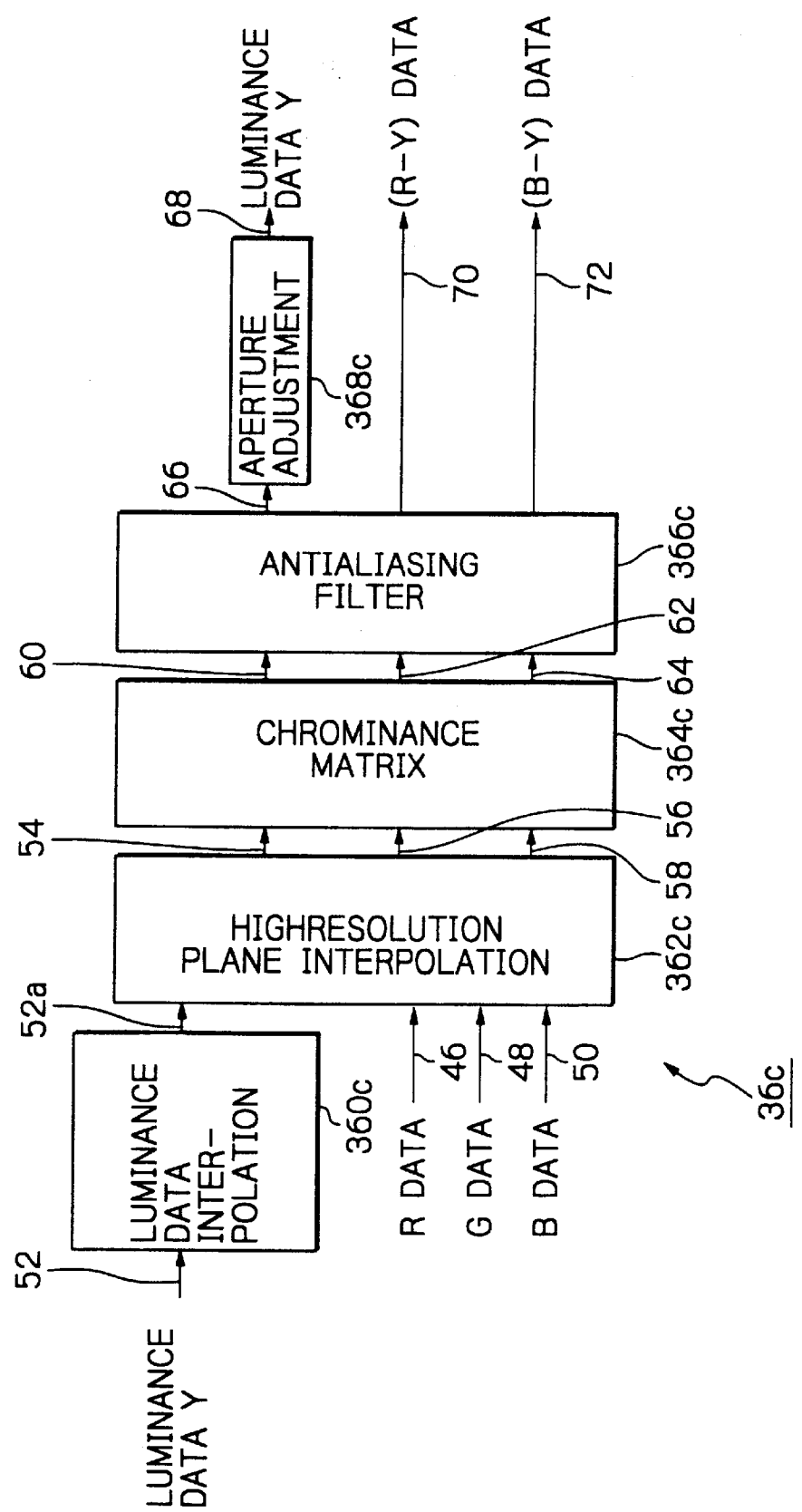
FIG. 3 is a schematic block diagram showing a specific configuration of a broadband signal processing also included in the illustrative embodiment.

Referring again to FIG. 1, the broadband signal processing 36c has signal lines corresponding to the R data 46, G data 48, B data 50 and luminance data Y (52) and connected to the interpolation 36b. As shown in FIG. 3 specifically, the broadband signal processing 36c includes a luminance data interpolation 360c, a high-resolution plane interpolation 362c, a chrominance matrix 364c, an antialiasing filter 366c, and an aperture adjustment 368c. In the illustrative embodiment, by using the luminance data Y (52) generated at the positions of virtual pixels, the luminance data interpolation 360c generates plane luminance data Y (52a) at the positions of the photosensitive cells 29. The luminance data interpolation 360c may be implemented as a circuit for generating the luminance data Y by calculation or as an LPF (Low-Pass Filter) that implements an LPF effect with a product sum using a preselected coefficient. The LPF is constituted by a digital circuit, as will be described specifically later.

Figure 4:
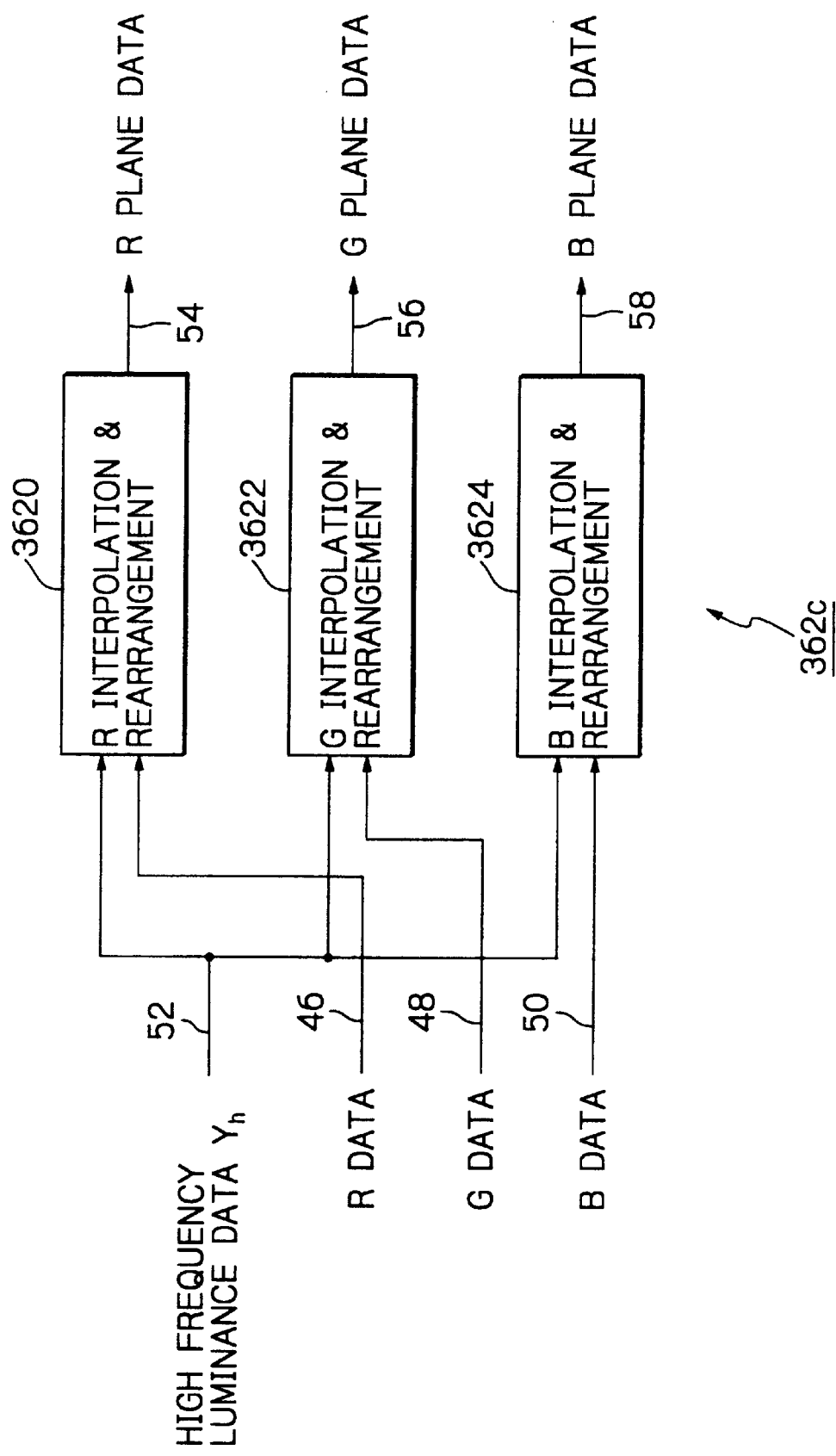
FIG. 4 is a schematic block diagram showing a high-resolution plane interpolation also included in the illustrative embodiment.

The plane luminance data Y (52a) output from the luminance data interpolation 360c are applied to the high-resolution plane interpolation 362c. As shown in FIG. 4 specifically, the high-resolution plane interpolation 362c is made up of an R interpolation and rearrangement 3620, a G interpolation and rearrangement 3622, and a B interpolation and rearrangement 3624. The luminance data Y (high frequency luminance data $Y_h$) are applied to all of the R, G and B interpolation and rearrangements 3620 through 3624. The R data 46, G data 48 and B data 50 are fed to the R, G and B interpolation and arrangements 3620, 3622 and 3624, respectively. The R, G and B interpolation and arrangements 3620 through 3624 respectively execute calculations for interpolation with the R data 46, G data 48 and B data 50 and with the luminance data $Y_h$ to thereby output R plain data 54, G plain data 56, and B plain data 58.

As shown in FIG. 3, the chrominance matrix 364c receives the R plain data 54, G plain data 56 and B plain data 58 from the high-resolution plane interpolating 362c. In response, the chrominance matrix 364c generates luminance data Y (60) and chrominance data (R−Y) (62) and (B−Y) (64) by multiplying each of the plane data 54 through 58 by a particular mixture ratio preselected color by color. Conventional coefficients are used to determine the mixture ratios.

The antialiasing filter 366c is implemented by LPFs each covering the frequency band of preselected one of the luminance data Y (60) and chrominance data (R−Y) (62) and (B−Y) (64). The aperture adjustment 368c is a contour compensator and implemented by, e.g., a transversal filter for compensating for the fall of response in a high frequency band, i.e., the high frequency components of the luminance data (66). In this manner, the signal processing 36 transforms the digital data 34a to luminance data Y (68) and chrominance data 70 and 72 and delivers them to the compression/expansion 38, as shown in FIG. 1.

The compression/expansion 38 is made up of a circuit for compressing an image on the basis of, e.g., the JPEG (Joint Photographic Experts Group) standard using orthogonal transform, and a circuit for expanding the compressed image for restoring original data, although not shown specifically. In the event of recording, the compression 38 delivers compressed data 38a to the record 40 via the system bus 16 under the control of the system controller 18. Also, the compression 38 allows the data output from the signal processing 36 to simply pass through it to the monitor 42 via the system bus 16 under the control of the system controller 18, as needed. In the event of expansion, the expansion 38 receives data 40a read out of the record 40 via the system bus 16 and expands them. The expanded data are also fed to the monitor 42 and displayed thereby.

The record/reproduction 40 has a recording circuit for recording image data in a recording medium and a reproducing circuit for reading image data out of the recording medium, although not shown specifically. The recording medium is available in the form of, e.g., a smart medium or similar semiconductor memory, a magnetic disk or an optical disk. When use is made of a magnetic disk or an optical disk, the record/reproduction 40 additionally includes a modulating circuit for modulating image data and a head for writing the image data in the disk.

The monitor 42 displays, under the control of the system controller 18, the luminance data and chrominance data or the R, G and B data while taking account of the size of its screen and adjusting the timing.

With the above construction, the digital camera 10 broadens the frequency band of color image signals. To better understand the operation of the camera 10, a relation between the color arrangement of the color filter CF and the image pickup 30 will be described hereinafter.

Figure 5:
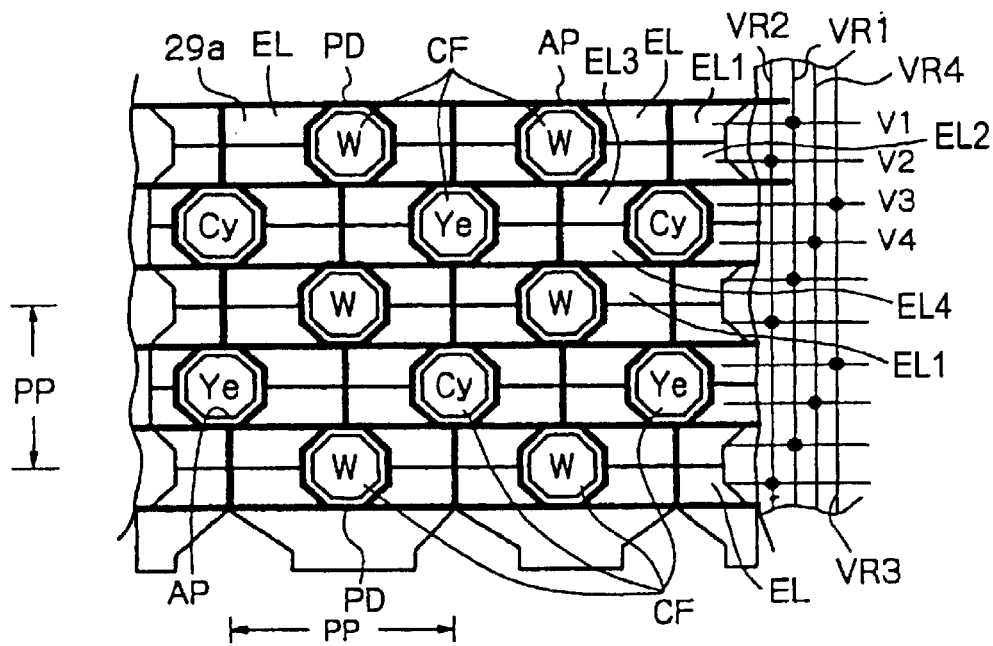
FIG. 5 is a schematic view showing a relation between color filter segments, openings of photosensitive cells and signal transfer paths arranged in the photosensitive array of the illustrative embodiment, as seen from the light input side.

As shown in FIG. 5, the image pickup 30 includes photodiodes PD (photosensitive cells 29, FIG. 1) for transforming light incident thereto to corresponding electric signals. The photodiodes PD are bidimensionally arranged in a photosensitive array 29a such that the photodiodes PD adjoining the photodiodes PD that photoelectrically transform incident light are shifted from the latter in both of the vertical and horizontal directions. The signals output from the photodiodes PD are applied to the electrodes that extend in such a manner as to go around apertures AP formed in the front of the photosensitive array 29a. Each of the vertical columns of photodiodes PD has a vertical transfer path EL formed in its adjoining position in the vertical direction. The electrical signals (electric charges) accumulated in each column of photodiodes PD are read out to the vertical transfer path EL in response to the drive signal applied to its electrodes. Each of the vertical transfer paths EL is formed by units of four packets, each unit being made up of vertical transfer registers (VCCD) EL1 through EL4 arranged in the vertical direction. To supply the vertical transfer registers EL1 through EL4 with the drive signals V1 through V4, respectively, vertical transfer lines VR1 through VR4 are formed and interconnected to the vertical transfer registers EL1 through EL4, as shown in the figure. The vertical transfer registers EL1 through EL4 are adapted to sequentially transfer the signals fed thereto via the electrodes in the vertical direction of the photosensitive array 29a.

The vertical transfer registers EL1 through EL4 transfer the above signals in accordance with vertical transfer drive signals V1 through V4, respectively. More specifically, the registers EL1 through EL4 are arranged in a four electrode structure for a single photosensitive array. The horizontal adjoining regions of a single photosensitive array are arranged in a two electrode structure, implementing the shift of the pixels. In the illustrative embodiment, the apertures AP have an octagonal honeycomb configuration. While the apertures AP are generally implemented as a square lattice, they may be provided with any other suitable configuration so long as they enhance sensitivity and allow the registers VR1 through VR4 to have the same width for efficient transfer. For example, the apertures AP may be even be rhombic, i.e., a square lattice rotated by 45°, and further, hexagonal form.

As shown in FIG. 5, the color filter CF has filer segments, also labeled CF, each covering the respective aperture AP. Each photodiode PD is positioned beneath the respective color filter segment CF. Assume that the photodiodes PD are arranged at a pixel pitch or distance of PP in both of the horizontal and vertical directions. Then, the apertures AP are bidimensionally arranged in rows and columns that are shifted by the pixel pitch PP each, as illustrated. When the apertures AP each are polygonal, e.g., quadrilateral, hexagonal, and octagonal, they may be densely arranged at a small pitch. As for the octagonal apertures AP shown in FIG. 5, dense arrangement is achievable if the apertures AP are shifted by one half of the pixel pitch PP in both of the horizontal and vertical directions. In this manner, dense arrangement depends on the shape of the apertures AP.

Figure 6:
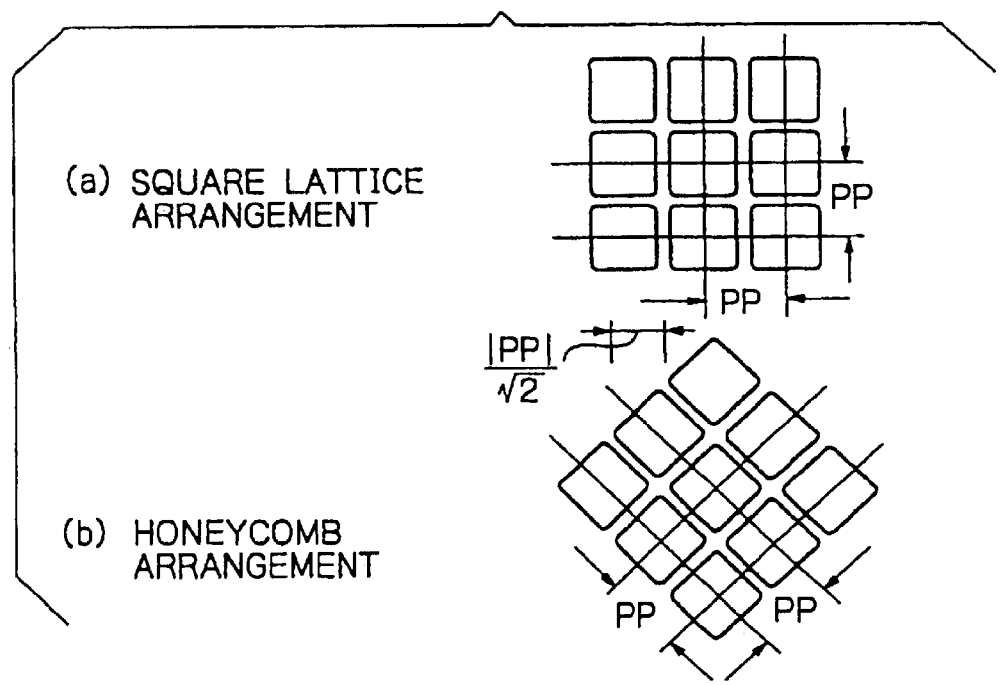
FIG. 6 is a schematic view showing a square lattice pattern and a honeycomb pattern in which the photosensitive cells may be arranged.

Generally, the image pickup 30 has either one of a square lattice configuration and a honeycomb configuration shown in FIGS. 6, (a) and (b), respectively. As shown, the honeycomb configuration is equivalent to the square lattice configuration rotated by 45° and having the pixel pitch PP of N μm. While nearby pixels of the square lattice configuration are spaced by a distance of |PP|=N μm, nearby pixels of the honeycomb configuration are spaced by a distance of $N*(2)^{-1/2}$ that is shorter than the distance |PP|. Therefore, in the honeycomb configuration, pixels are arranged more densely than in the square lattice configuration and implements, in principle, $(2)^{1/2}$ times higher resolution in both of the horizontal and vertical directions. When the honeycomb configuration is rearranged into the square lattice configuration matching with the output format, the signal processing 36 interpolates virtual pixels on the basis of real pixels adjoining them. It will be seen that when pixels of colors and luminance not obtained are interpolated and rearranged while the above interpolation is under way, the resulting resolution is higher than when the photodiodes PD are simply arranged in the square lattice configuration.

Figure 7:
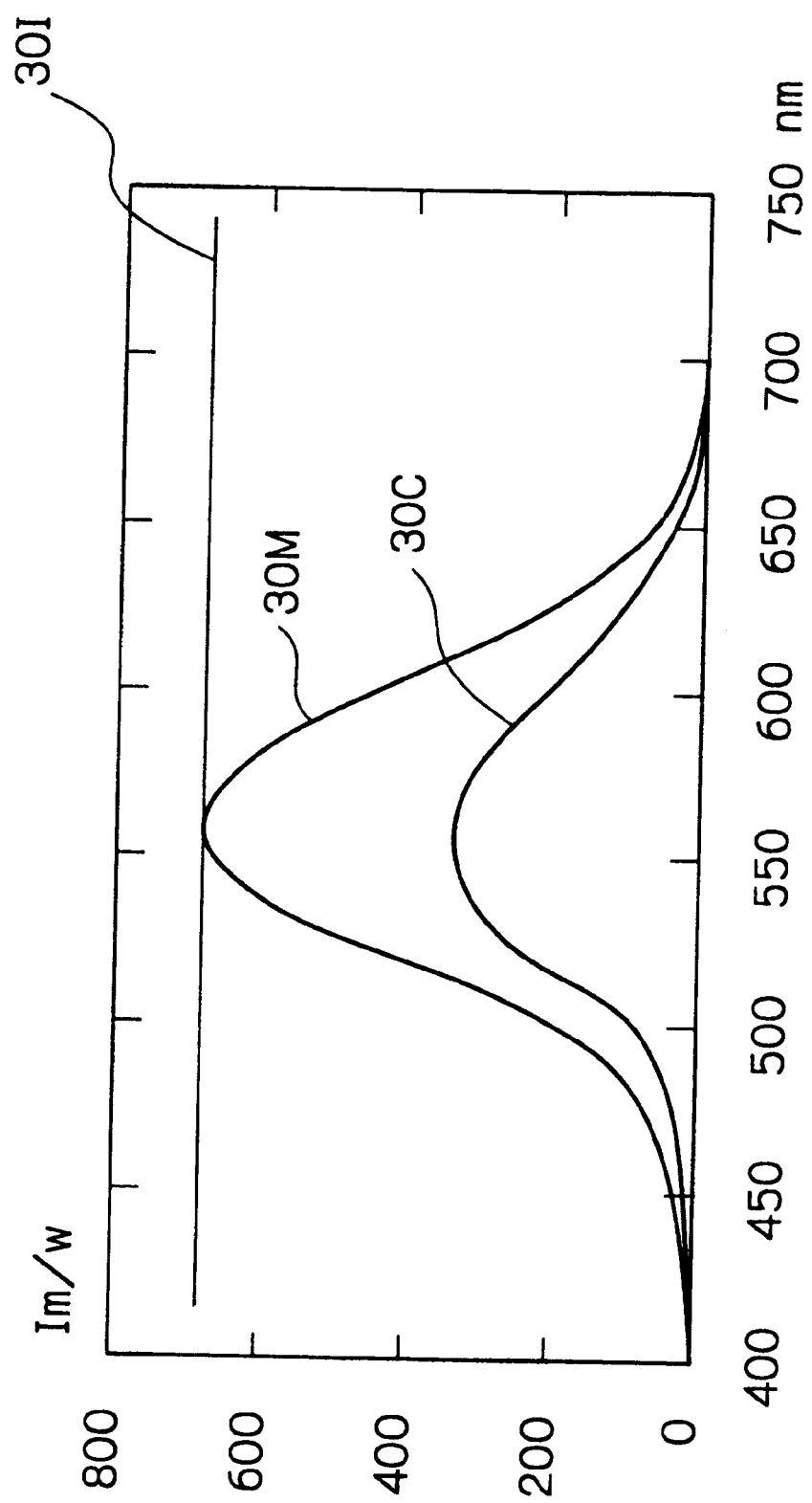
FIG. 7 is a graph indicative of a relation between the spectral energy of light incident to an image pickup section, specific spectral luminous efficacy characteristic, and wavelength-dependent spectral energy occurring at the time of measurement.

In the illustrative embodiment, the color filter CF uses complementary colors, as stated earlier. Why complementary colors are used will be briefly described hereinafter. Today, there is an increasing demand for the effective use of incident light in order to guarantee sensitivity despite the current trend toward a smaller chip size. FIG. 7 shows incident light 30I whose spectral energy remains constant without regard to wavelength, a specific spectral luminous efficacy curve 30C varying along with wavelength, and a photometric spectral curve 30M dependent on wavelength and produced by multiplying specific spectral luminous efficacy by an amplifier gain 30K.

Figure 8A:
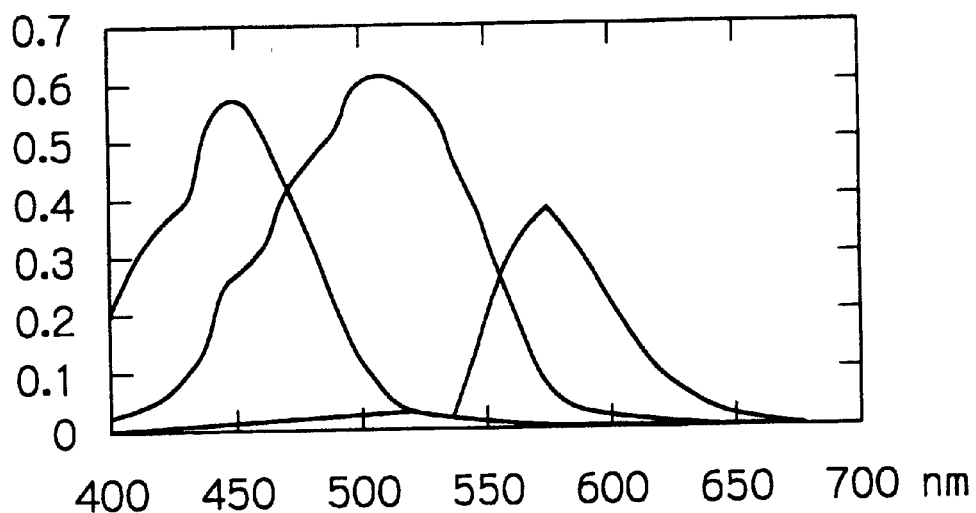
FIG. 8A is a graph showing a relation between wavelength and relative sensitivity derived from incident light picked up in primary colors.
Figure 8B:
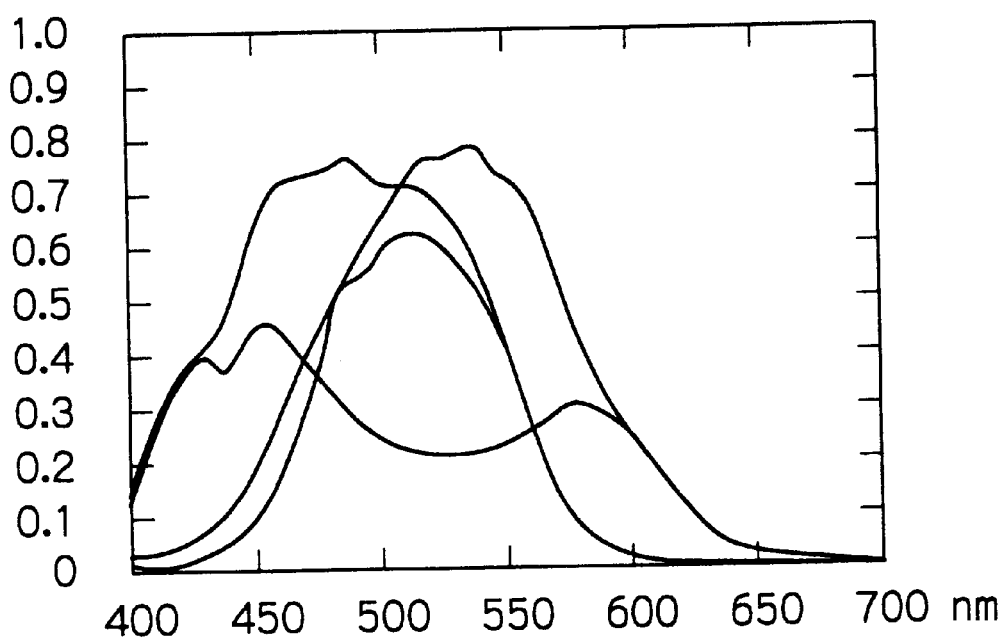
FIG. 8B is a graph showing a relation between wavelength and relative sensitivity derived from incident light picked up in complementary colors.
Figure 9A:
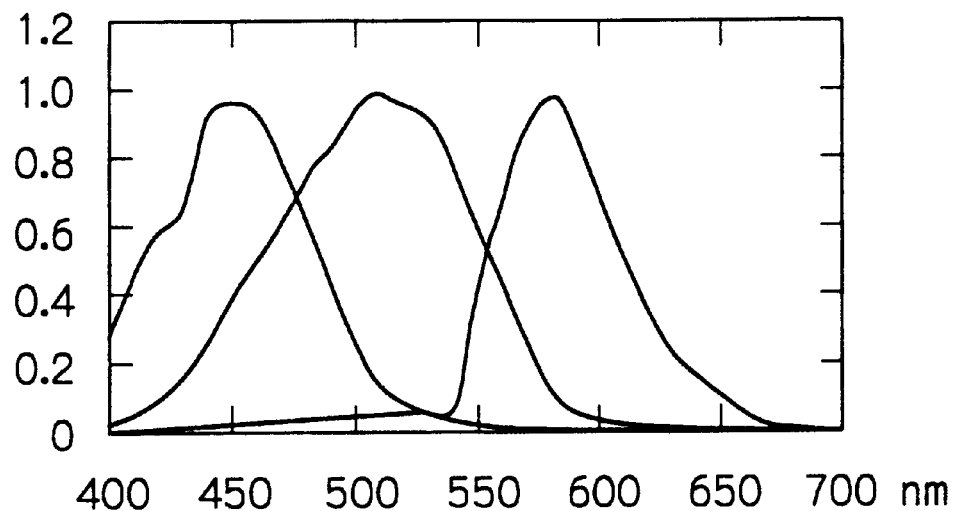
FIG. 9A is a graph showing a relation between wavelength normalized by the maximum sensitivity and relative sensitivity derived from incident light pickup in primary colors.
Figure 9B:
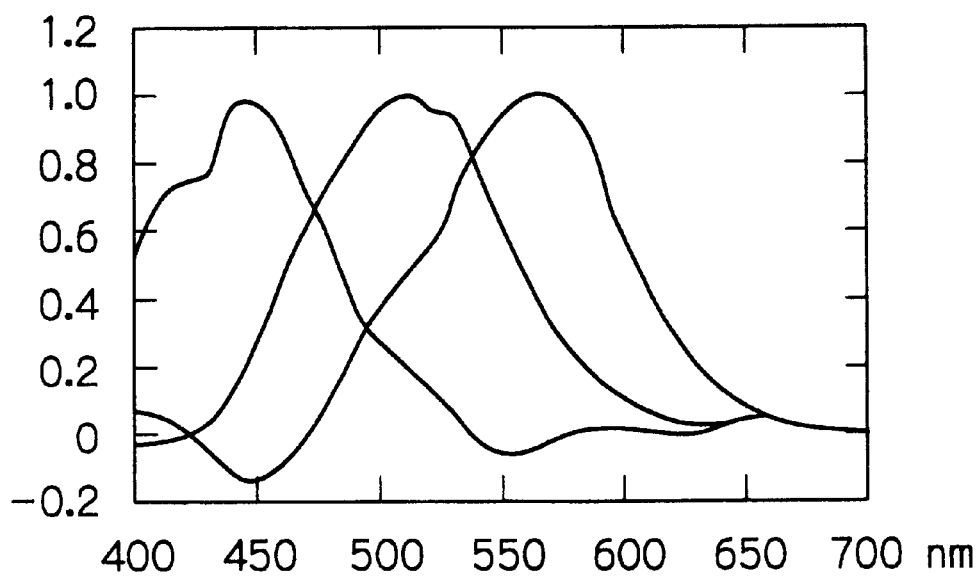
FIG. 9B is a graph showing a relation between wavelength normalized by the maximum sensitivity and relative sensitivity derived from incident light pickup in complementary colors.

FIG. 8A shows relative spectral sensitivity available with primary color filters R, G and B while FIG. 8B shows relative spectral sensitivity available with complementary color filters Mg (magenta), Ye (yellow) G (green) and Cy (cyan). As shown, higher relative sensitivity is achievable with complementary color filters than with primary color filters. FIGS. 9A and 9B respectively correspond to FIGS. 8A and 8B, and each shows curves subjected to RGB normalization with respect to maximum sensitivity. As shown, the RGB normalized curves derived from complementary color filters define greater areas than the RGB normalized curves derived from primary color filters. It will therefore be seen that complementary color filters contribute even to the effective conversion of incident light to signal charges, i.e., the effective use of incident light.

Figure 10A:
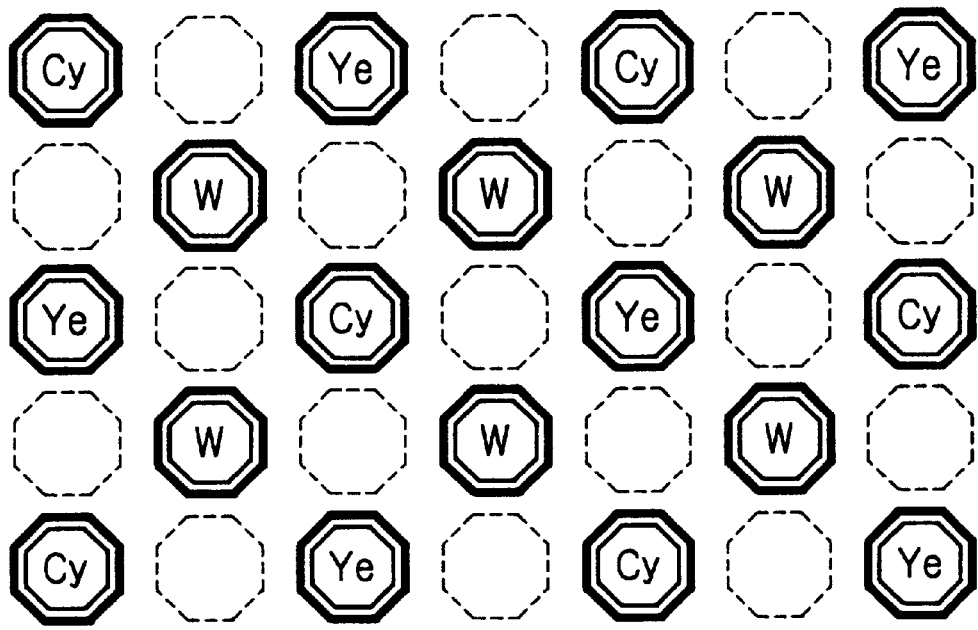
FIGS. 10A and 10B are schematic views respectively showing a W square lattice, CyYe full-checker pattern and a G square lattice, CyYe full-checker pattern applicable to a color filter included in the pickup section of the illustrative embodiment.
Figure 10B:
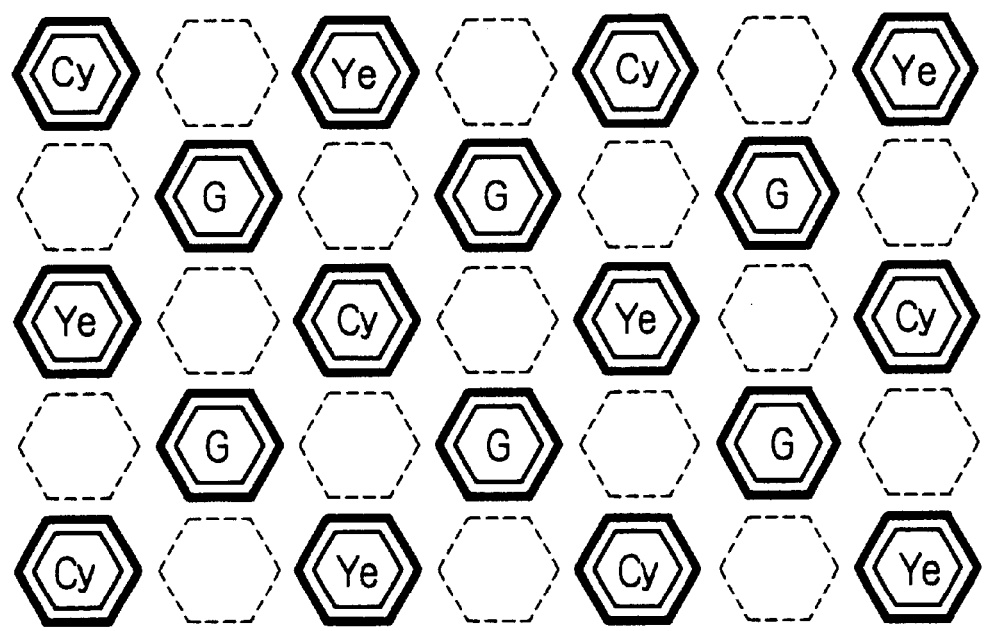
Figure 11:
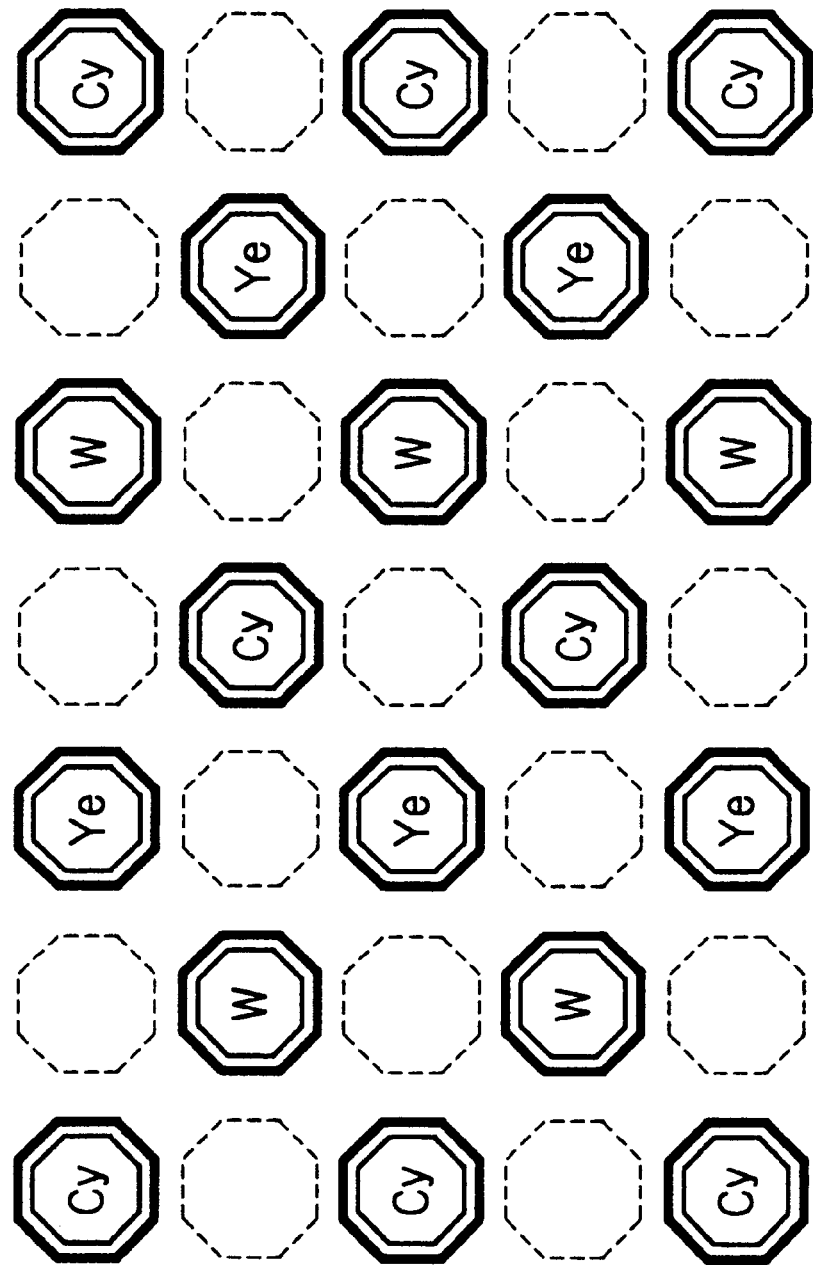
FIG. 11 is a schematic view showing a CyWYe vertical stripe pattern also applicable to the color filter.
Figure 12:
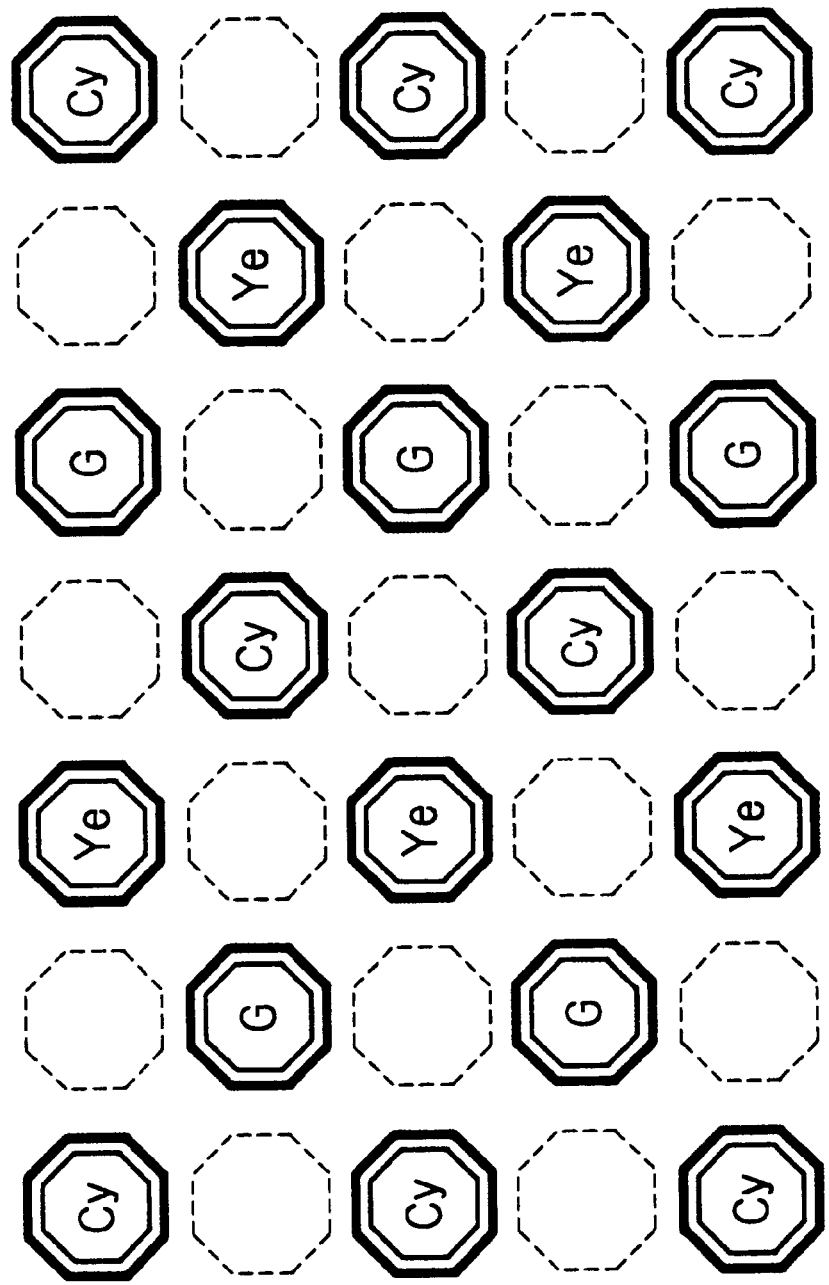
FIG. 12 is a schematic view showing a CyGYe vertical stripe pattern also applicable to the color filter.

FIGS. 10A and 10B each show a particular specific arrangement of complementary color filter segments CF equivalent to the honeycomb arrangement and therefore featuring the above-described advantage. The arrangement of FIG. 10A has filter segments of three complementary colors W, Cy and Ye aligning with the photodiodes that are shifted from each other. The filter segments W are arranged in a square lattice pattern while the filter segments Cy and Ye are arranged in a full-checker pattern. Let this arrangement be referred to as a W square lattice, CyYe full-checker pattern. In FIG. 10A, octagons indicated by dashed lines are representative of virtual pixels where the photodiodes are absent. The filter segments Cy and the filter segments Ye may be replaced with each other. The arrangement of FIG. 10B has filter segments of three complementary colors G, Cy and Ye arranged in a G square lattice, CyYe full-checker pattern; the segments G are substituted for the segments W shown in FIG. 10A; in FIG. 10B, hexagons indicated by solid lines are representative of actual pixels where the photodiodes are present.

Figure 13A:
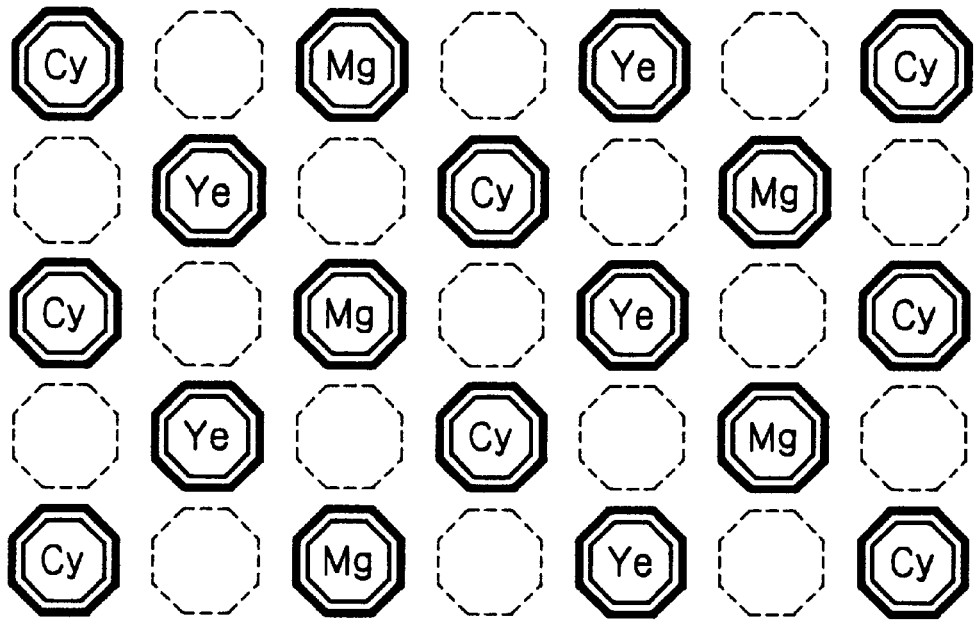
FIGS. 13A and 13B are schematic views respectively showing a CyYeMg vertical stripe pattern and a horizontal stripe pattern also applicable to the color filter.
Figure 13B:
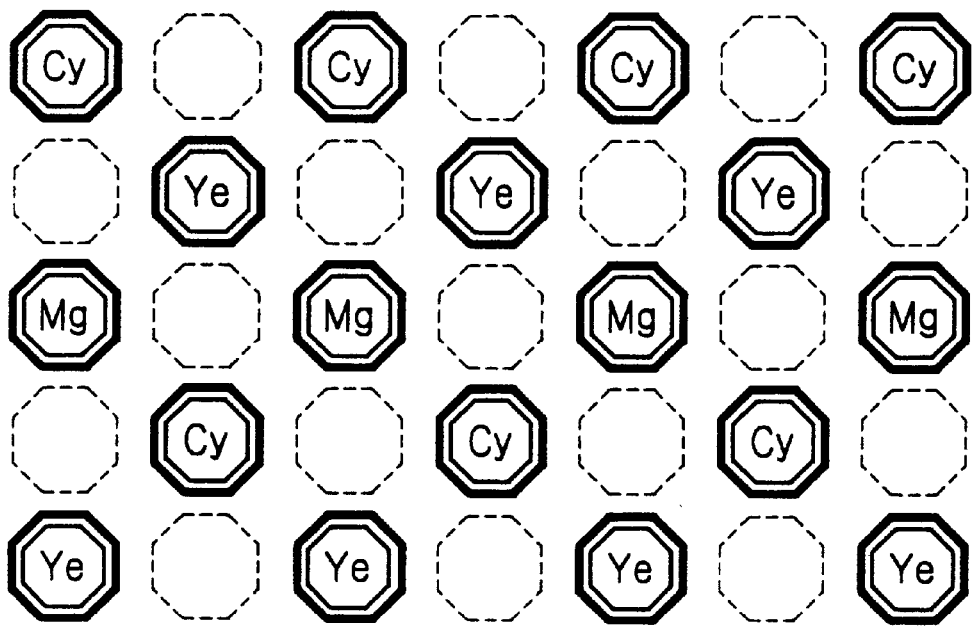

FIGS. 11 through 13B show complementary color filter segments arranged in stripe patterns as distinguished from the W or G square lattice, CyYe full-checker pattern. The stripe pattern of FIG. 11 has filter segments Cy, W and Ye arranged in vertical or horizontal stripes in alignment with the photodiodes. The stripe pattern of FIG. 12 differs from the stripe pattern of FIG. 11 in that color G is substituted for color W. FIG. 13A shows filter segments Cy, Ye and Mg arranged in a vertical stripe pattern while FIG. 13B shows the same filter segments Cy, Ye and Mg arranged in a horizontal stripe pattern.

Figure 14A:
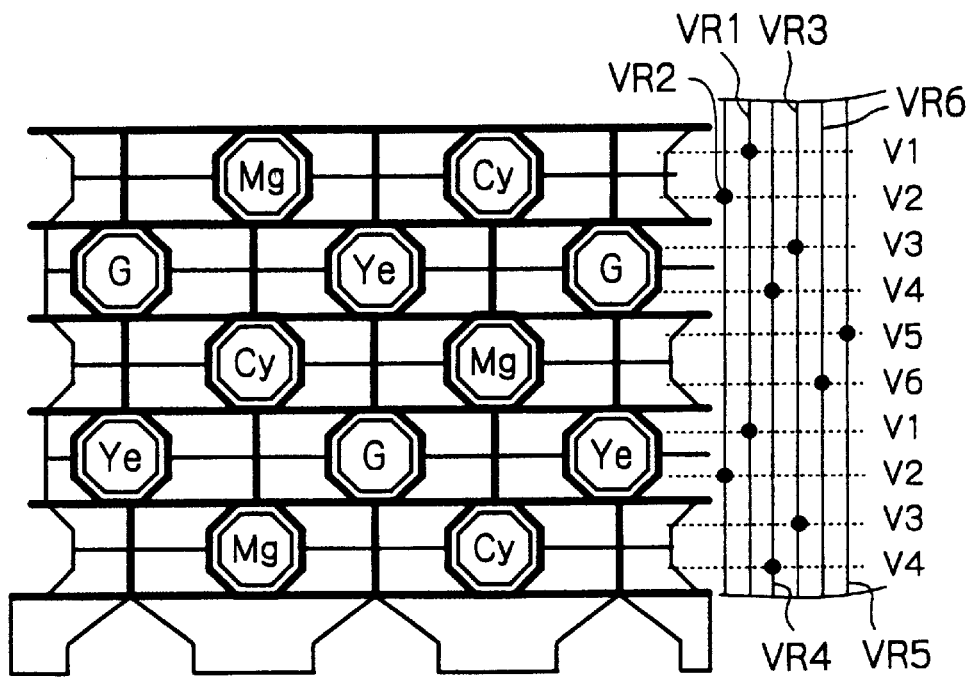
FIGS. 14A and 14B are schematic views respectively showing a CyMgYeG partly overlapping, full-checker pattern and a CyMgYeW partly overlapping, full-checker pattern applicable to the color filter.
Figure 14B:
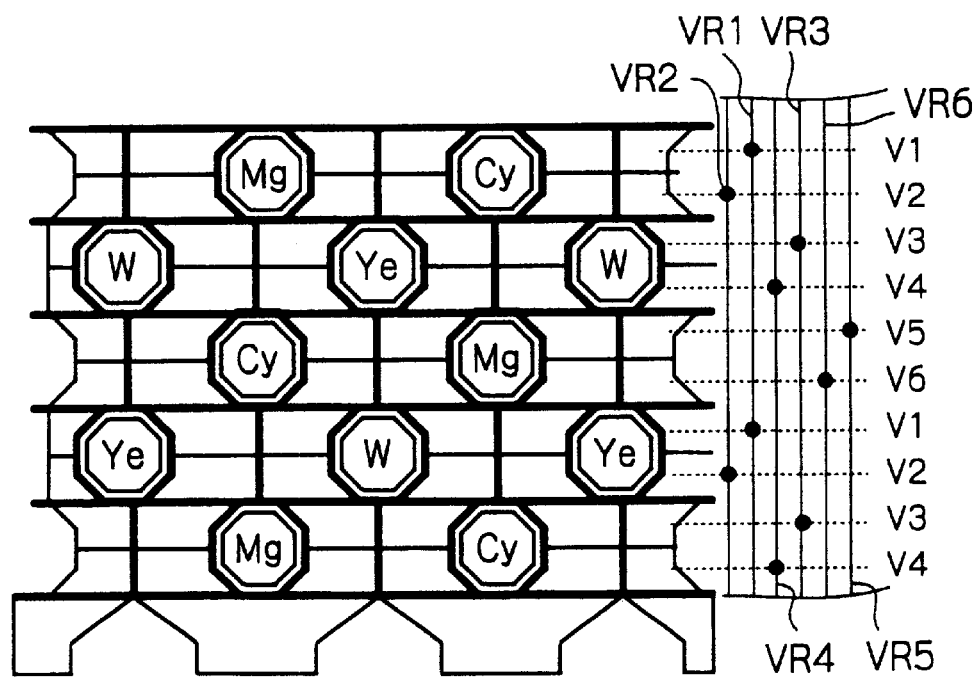
Figure 15A:
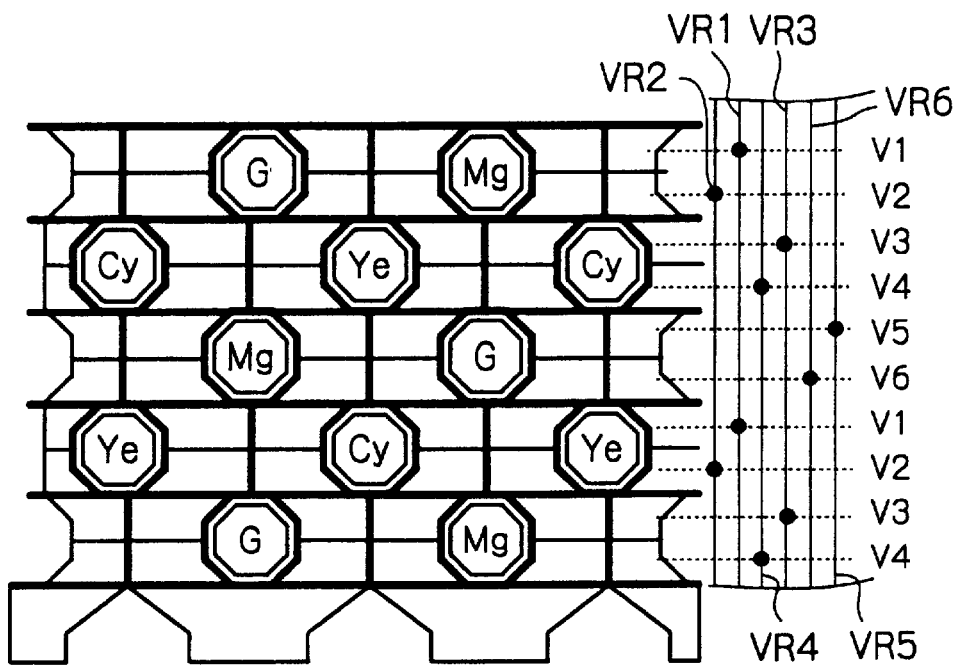
FIGS. 15A and 15B are schematic views respectively showing a CyMgYeG full-checker pattern and a CyMgYeW full-checker pattern applicable to the color filter.
Figure 15B:
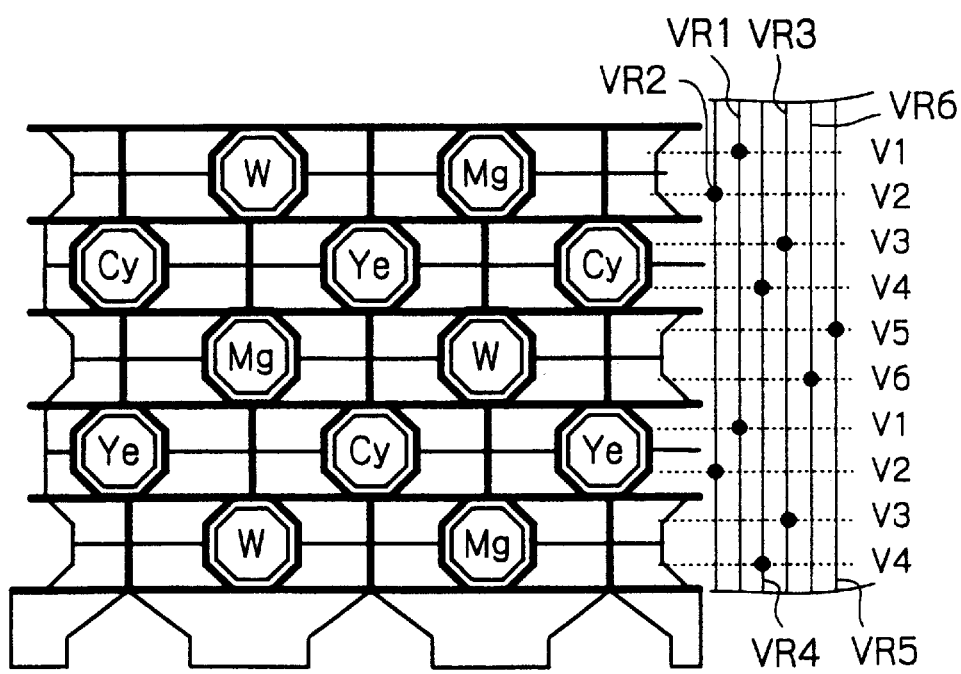

FIG. 14A shows another specific pattern in which two of four complementary color filter segments Cy, Ye, Mg and G are arranged in a full-checker pattern while partly overlapping each other. FIG. 15A shows a four-color full-checker pattern identical with the partly overlapping, full-checker pattern of FIG. 14A except for the replacement of colors. FIGS. 14B and 15B respectively show a partly overlapping, full-checker pattern and a four-color full-checker pattern in which color W is substituted for color G. When any one of the patterns shown in FIGS. 14A through 15B is used, signals are read out of three lines of the image pickup 30 at the same time, as distinguished from the two line, combined read-out scheme. For this purpose, the image pickup 30 has the previously stated two electrode structure in the horizontal direction and has six electrodes assigned to each photosensitive array of each vertical transfer path. When the photosensitive arrays of the image pickup 30 are implemented by, e.g., MOS devices capable of implementing nondestructive read-out, the image pickup 30 is capable of reading signals by three lines while sequentially shifting the lines one by one.

Figure 16:
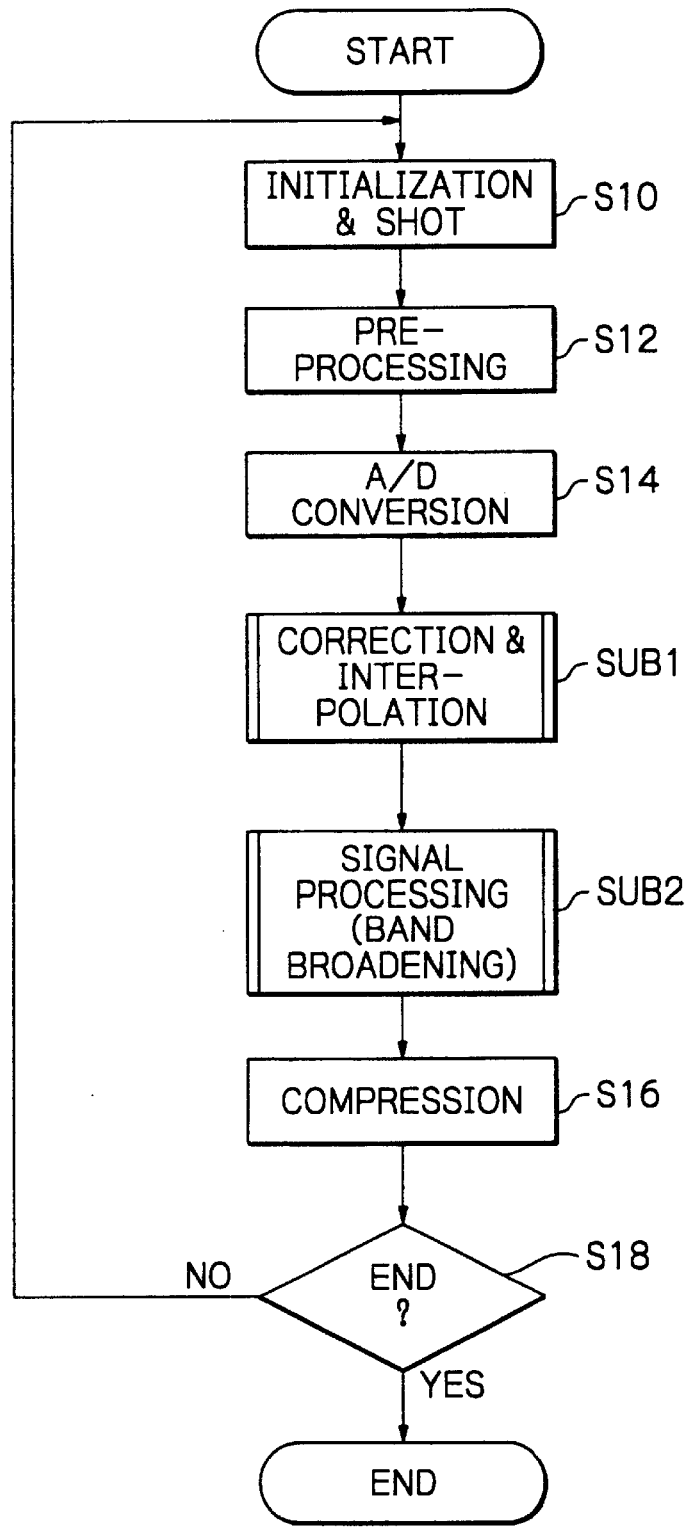
FIG. 16 is a flowchart demonstrating a main routine to be executed by the illustrative embodiment.

A specific operation of the illustrative embodiment will be described hereinafter. FIG. 16 shows a main routine to be executed by the camera 10. When a power switch, not shown, provided on the camera 10 is turned on, the system controller 18 executes various kinds of initialization and causes image signals 30a to be read out of the image pickup 30 by the drive signal 24a (step S10). The following description will concentrate on the color filter CF having the W square lattice, CyYe full-checker pattern by way of example. In this case, signals are read out of the image pickup 30 by the field store, combined two-line read-out scheme.

The signals 30a read out of the image pickup 30 are subjected to preprocessing (step S12). Specifically, the preprocessing 32 executes, e.g., the CDS processing with the image signals 30a in order to remove noise components therefrom.

Subsequently, the A/D 34 converts noise-free signals 32a output from the preprocessing 32 to digital signals 34a (step S14). As a result, the signal charges 30a output from the photodiodes PD are transformed to corresponding pixel data. Therefore, the procedure to follow deals with digital signals. When use is made of a CCD image sensor, it is preferable to use a non-destructive type of buffer memory not shown in FIG. 1, as stated earlier. The buffer memory may precede the signal processing 36 so as to feed the image data of different colors to the signal processing 36 in accordance with control signals output from the system controller 18 and including a read and a write enable signal and an address signal. Alternatively, the buffer memory may be built in the signal processing 36. The step S14 is followed by a subroutine SUB1.

In the subroutine SUB1, the data correction 36a executes, e.g., white balance and gamma correction with the image data 34a. Also, the interpolation 36b performs interpolation by using corrected image data 44 output from the data correction 36a. The interpolation 36b will be described more specifically later. The subroutine SUB1 is followed by a subroutine SUB2.

In the subroutine SUB2, signals 46 through 52 processed by the subroutine SUB1 are used to broaden the frequency band of R, G and B data 54 through 58. In addition, the R, G and B data 54 through 58 with the broadened frequency band are transformed to luminance data Y and chrominance data (R−Y) and (B−Y) (or $C_r$ and $C_b$)

The above luminance data Y (68) and chrominance data (R−Y) (70) and (B−Y) (72) are delivered to the record/reproduction 40 or the monitor 42 via the compression/expansion 38 and system bus 16 (step S16). At this instant, the system controller 18 controls the compression/expansion 38 in a particular manner in each of a display mode, a reproduce mode, and a record mode.

Specifically, in a display mode for displaying the processed data on the monitor 42, the system controller 18 causes the compression/exparsion 38 to simply pass the data therethrough. In the reproduce mode, the system controller 18 causes the compression/expansion 38 to expand, or reproduce, recorded compressed data and deliver the expanded data to the monitor 42. Further, in a record mode, the system controller 18 causes the compression/expansion 38 to compress the processed data in accordance with, e.g., the JPEG standard to thereby reduce the amount of data and then feed them to the record/reproduction 40 including an optical, magnetic or mangetoptical recording medium. The monitor 42 receiving the high quality image data is capable of displaying a display with enhanced quality.

After the step S16, the system controller 18 determines whether or not shooting under way should be ended (step S18) If shooting should be continued (NO, step S18), the operation returns to the step S10. If shooting should be ended (YES, step S18), the operation ends by, e.g., switching off the power switch.

Figure 17:
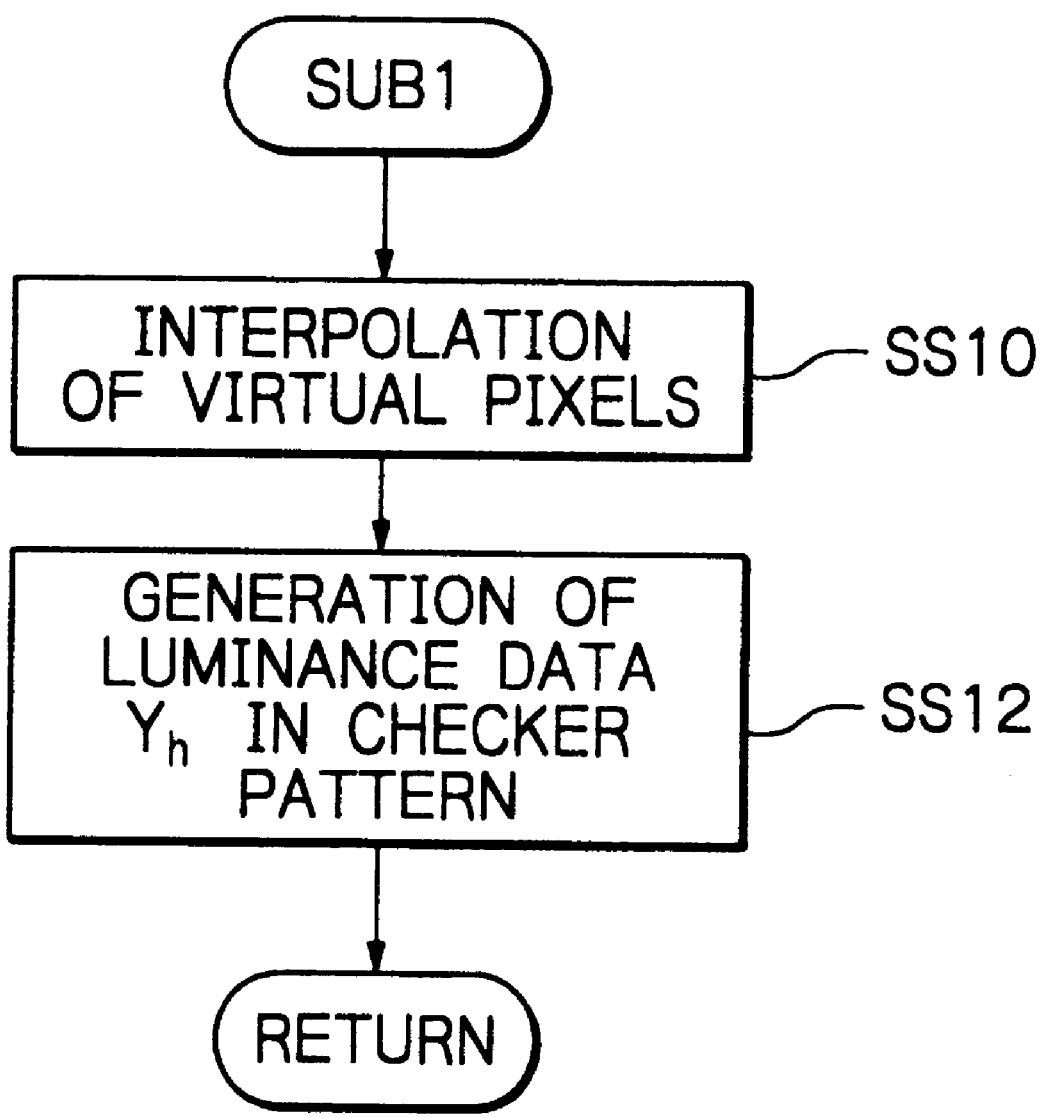
FIG. 17 is a flowchart showing a subroutine SUB1 included in the main routine specifically.

Reference will be made to FIG. 17 for describing the subroutine SUB1 more specifically. As shown, the subroutine SUB1 begins with a substep SS10. In the substep SS10, the interpolation 36b generates pixel data for interpolating virtual pixels, i.e., void regions where the photodiodes are absent due to the shift of pixels. It is to be noted that pixel data for interpolation refer to pixel data of primary colors produced from image data of complementary colors that are fed from the photodiodes actually present in the image pickup 30 via the color filter CF.

Figure 18:
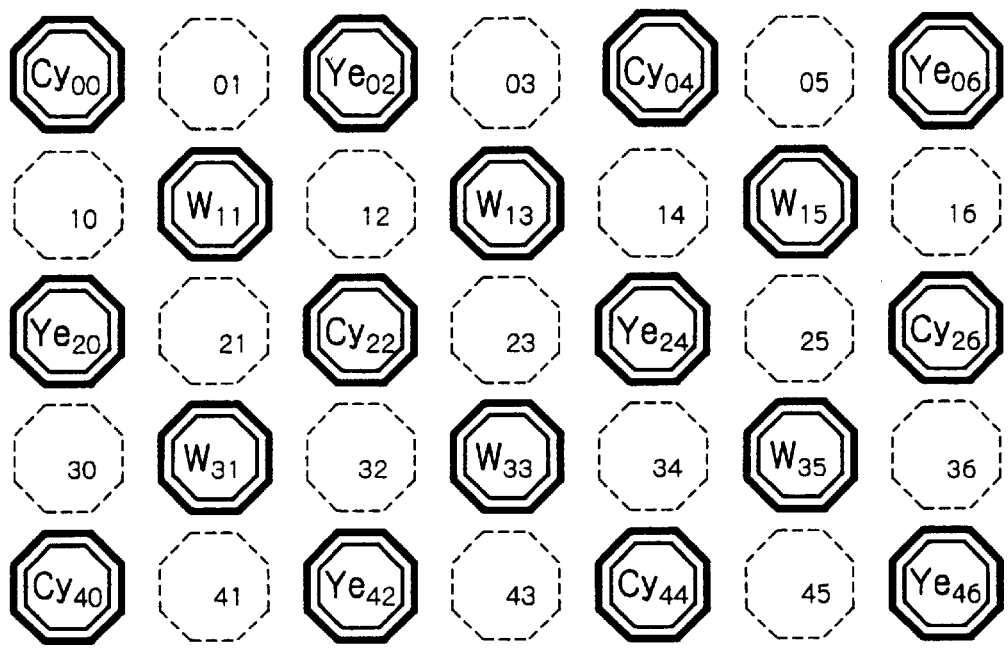
FIG. 18 is a schematic view representative of a positional relation between the photosensitive cells and virtual pixels in terms of rows and columns.

More specifically, only one of pixel data of three primary colors R, G and B is generated. FIG. 18 shows a positional relation between the colors before interpolation and the pixels. In FIG. 18, the photodiodes PD actually present in the image pickup 30 and the virtual pixels are indicated by solid frames and phantom frames, respectively. Labels W, Cy, Ye, R, G and B attached to the frames are representative of colors. Suffixes attached to the labels W through B are representative of the positions of pixels as to rows and columns. The image pickup 30 mixes two lines of signal charges and then outputs them in the form of a single line. Because two vertical lines each include virtual pixels, the signal charge output from the individual photodiode PD is preserved even when two lines are read out together. The following relations holds between the complementary colors and the primary colors, as well known in the art. By using the above labels, the relations are expressed as:

$R = W - Cy$ (1a)

$B = W - Ye$ (1b)

$G = Cy + Ye - W$ (1c)

As for virtual pixels #10, #12 and #01 indicated a cell position in matrix, for example, pixel data of primary colors for interpolation are generated on the basis of pixel data of complementary colors by:

$$R_{10} = W_{11} - Cy_{00} \tag{2a}$$

$$R_{12} = W_{11} - Ye_{02} \tag{2b}$$

$$G_{01} = Cy_{00} + Ye_{02} - W_{11} \tag{2c}$$

Figure 19:
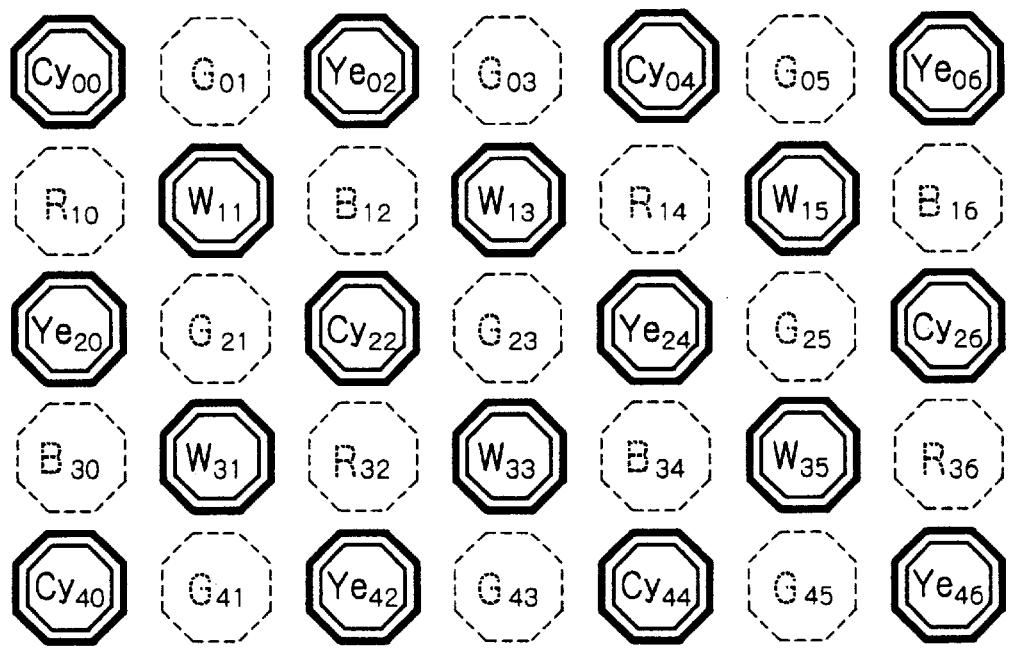
FIG. 19 is a schematic view representative of a positional relation between pixel data of primary colors generated by virtual pixel interpolation in the subroutine SUB1.

FIG. 19 shows pixel data of primary colors produced by the above equations (2a) through (2c) and each interpolating a particular virtual pixel. As shown, R, G and B pixel data are arranged in a G square lattice, RB full-checker pattern, i.e., color G is arranged in a square lattice pattern while colors R and B are arranged in a full-checker pattern.

In a substep SS12 following the substep SS10, luminance data $Y_h$ for the virtual pixels are produced. Specifically, luminance data $Y_h$ for a given virtual pixel is generated on the basis of complementary color pixel data output from three photodiodes PD around the virtual pixel by:

$$Y_h = Cy + Ye + W = (G+B) + (R+G) + (R+G+B) = 2R + 2B + 3G \tag{3}$$

For example, luminance data $Y_{h03}$ for the virtual pixel$_{03}$ surrounded by the filter segments Cy, W and Ye is expressed as:

$$Y_{h03} = Cy_{04} + Ye_{02} + W_{13} \tag{4}$$

When the field store, combined two-line read-out scheme is simply practiced with the above color filter CF, only luminance data for the virtual pixels of the upper line can be generated. In the illustrative embodiment, luminance data for the virtual pixels of the lower line are calculated by use of pixel data read out of upper one of the next two lines. For example, luminance data for virtual pixels #10, #12, #14 and #16 of the lower line are calculated by use of pixel data $Ye_{20}$, $Cy_{22}$, $Ye_{24}$, $Cy_{26}$ and so forth when the next two lines are read, such that colors Cy, W and Ye surround each virtual pixel. More specifically, luminance data $Y_{h12}$ for the virtual pixel$_{12}$ is produced by:

$$Y_{h12} = Cy_{22} + Ye_{02} + W_{13} \tag{5}$$

Figure 21:
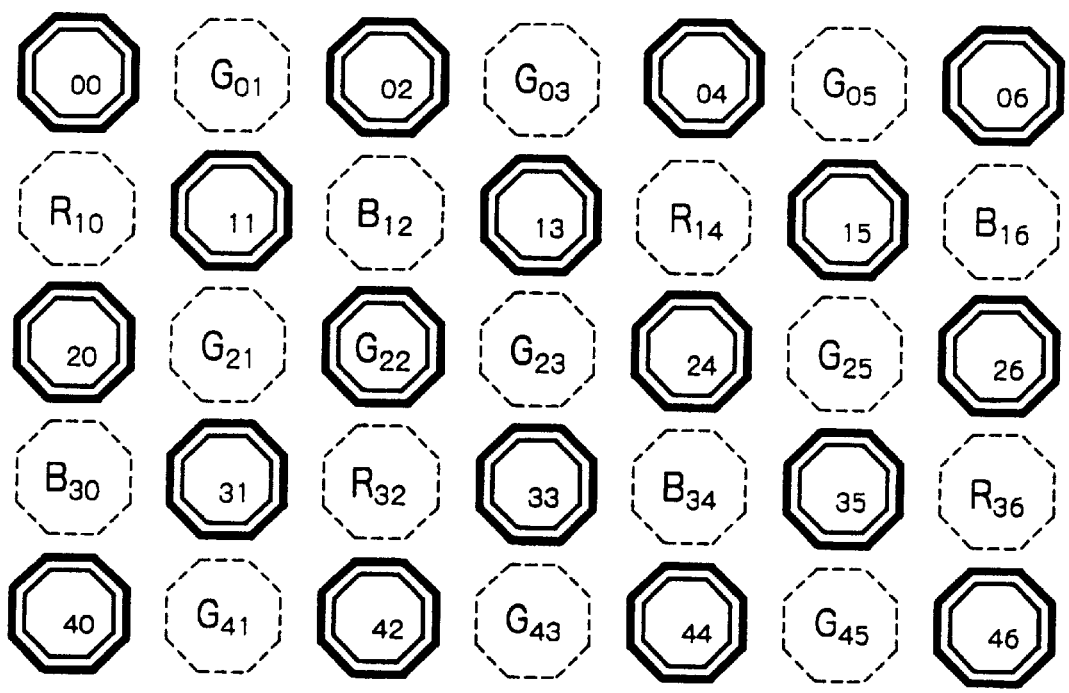
FIG. 21 is a schematic view showing a positional relation between the pixel data of primary colors generated in the subroutine SUB1 and a G square, RB full-checker pattern.

By the above procedure, luminance data $Y_h$ for the virtual pixels are produced in a checker pattern. In this manner, pixel data of primary colors and luminance data $Y_h$ are calculated by using quantities of incident light more effectively than when the color filter CF uses primary colors. Further, paying attention to the pixel data of primary colors calculated for the virtual pixels, the interpolation implements a G square lattice, RB full-checker pattern, as shown in FIG. 21. On completing the substep SS12, i.e., after fully interpolating the virtual pixels of a single frame, the operation returns to the main routine of FIG. 16.

The subroutine SUB2 following the subroutine SUB1 will be described more specifically with reference to FIG. 22. As shown, interpolation is effected on the basis of the luminance data $Y_h$ produced by the subroutine SUB1 in a checker pattern (substep SS20). In this case, interpolation is applied to the positions of the actual photodiodes PD. Specifically, FIGS. 23A and 23B each show pixels corresponding to the calculated primary colors, i.e., virtual pixels $d_{(-3)}$, $d_{(-1)}$, and $d_{(1)}$ and $d_{(3)}$ (solid frames) and pixels $d_{n(-4)}$, $d_{n(-2)}$, $d_{n(0)}$, $d_{n(2)}$ and $d_{n(4)}$ corresponding to the photodiodes PD (phantom frames) As shown, the luminance data interpolation 360c generates luminance data at the positions of the photodiodes PD intervening between four virtual pixels. Considering the correspondence of the pixels $d_{n(-4)}$ through $d_{n(4)}$ to the virtual pixels $d_{(-3)}$ through $d_{(3)}$, the illustrative embodiment assumes that the pixels $d_{n(-4)}$ through $d_{n(4)}$ store no data, i.e., sets ZEROs in the pixels $d_{n(-4)}$ through $d_{n(4)}$ beforehand. For example, assume that the pixel $d_{n(0)}$ shown in FIG. 23A is interpolated in the horizontal direction, and that digital filters have tap coefficients $k_0$, $k_1$, $k_2$, $k_3$, $k_4$, ..., $k_n$. Then, luminance data $Y_{h(0)}$ containing a high frequency component is produced by:

$$Y_{h(0)} = k_0 * d_{n(0)} + k_1 * (d_{(1)} + d_{(-1)}) + k_2 * (d_{n(-2)} + d_{n(2)}) + k_3 * (d_{(-3)} + d_{(3)}) + k_4 * (d_{n(-4)} + d_{n(4)}) + \ldots + k_n * (dn(-n) + dn(n)) \tag{6}$$

Figure 23A:
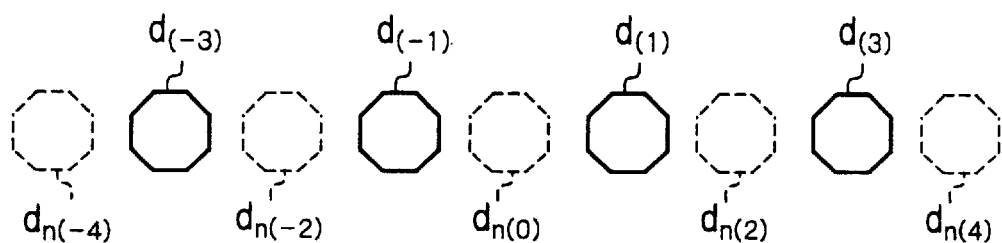
FIGS. 23A and 23B are schematic views showing how luminance data are interpolated by low-pass filter processing in the subroutine SUB2.
Figure 23B:
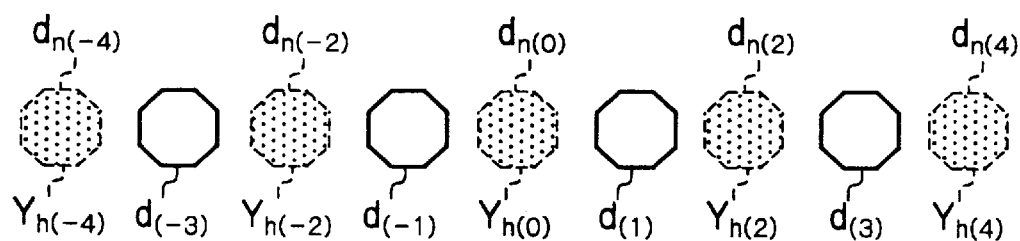

It should be noted that the number of coefficients is doubled because ZERO data alternate with the luminance data. Such a relation also applies to the other pixels $d_{n(-4)}$, $d_{n(-2)}$, $d_{n(2)}$ and $d_{n(4)}$ to be interpolated. FIG. 23B shows the resulting luminance data $Y_{h(-4)}$, $Y_{h(-2)}$, $Y_{h(0)}$, $Y_{h(2)}$ and $Y_{h(4)}$ containing high frequency components.

Further, the luminance data interpolation 360c executes LPF (Low-Pass Filter) processing in the vertical direction with digital filters. At this stage, the pixels are densely packed with data because the pixels corresponding to the photodiodes PD have already been interpolated in the horizontal direction. LPFs are therefore operable with conventional coefficients.

Figure 20:
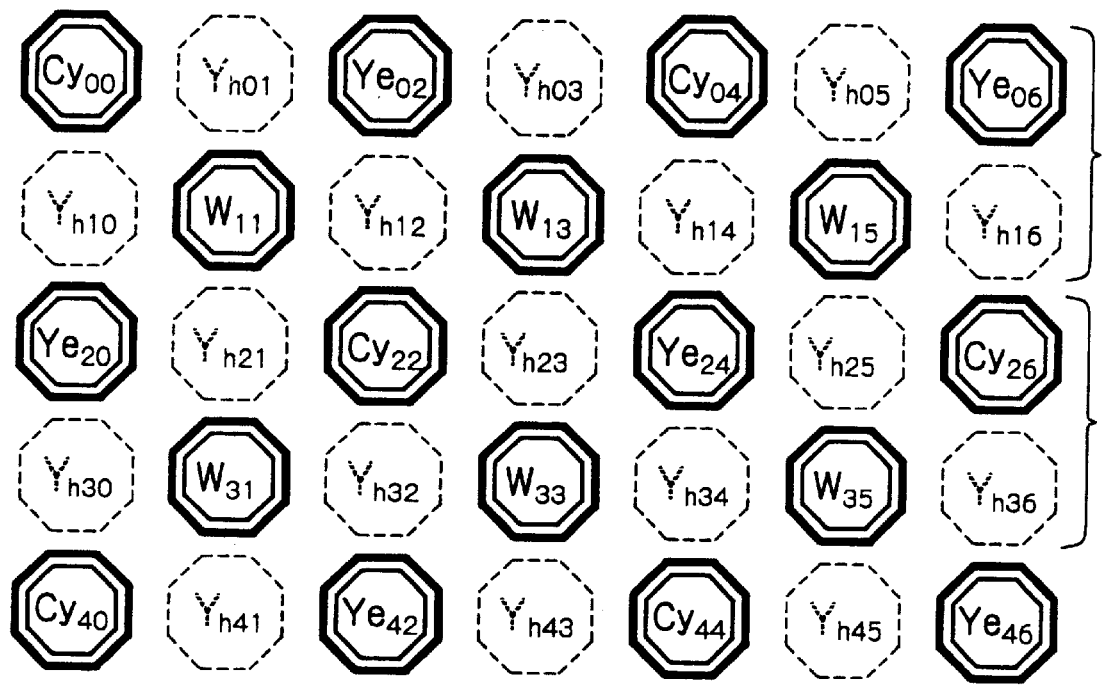
FIG. 20 is a schematic view representative of a positional relation between luminance data produced from the pixel data of FIG. 19.
Figure 24:
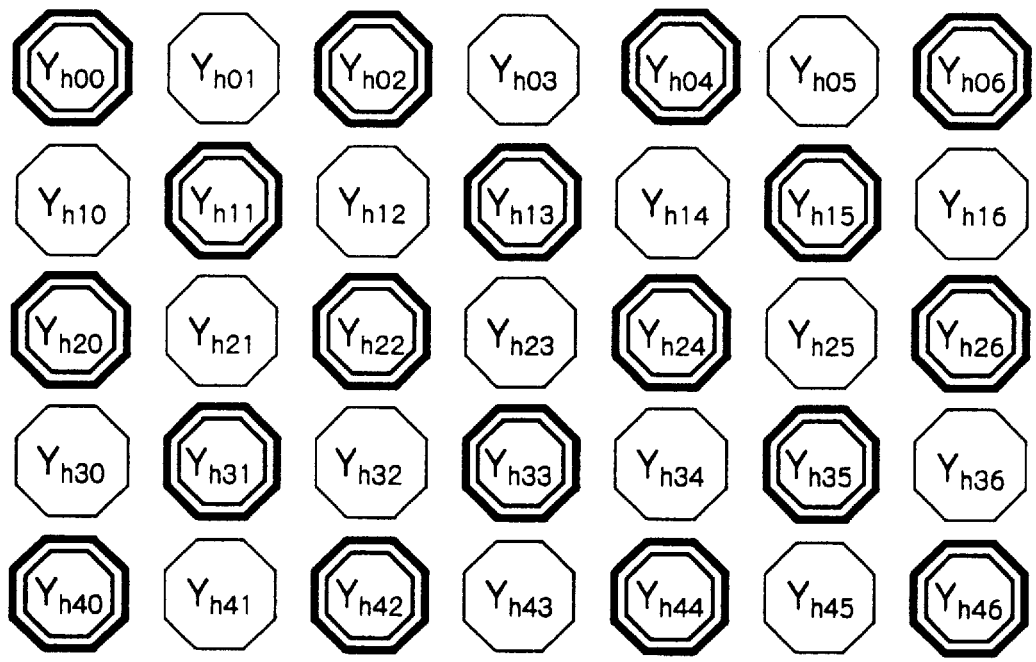
FIG. 24 is a schematic view representative of a relation, on a plane, between high-frequency luminance data generated in the subroutine SUB2 and the luminance data shown in FIG. 20.

FIG. 24, like FIG. 20, the luminance data $Y_h$ containing high frequency components and generated by the luminance data interpolation 360c by rows and columns. Let the luminance data $Y_h$ be referred to as high-frequency luminance data hereinafter. Of course, the LPF processing in the horizontal and vertical directions may be implemented by calculations using software in place of circuitry. The high-frequency luminance data $Y_h$ (52a) are fed to the high-resolution plane interpolation 362c.

Figure 22:
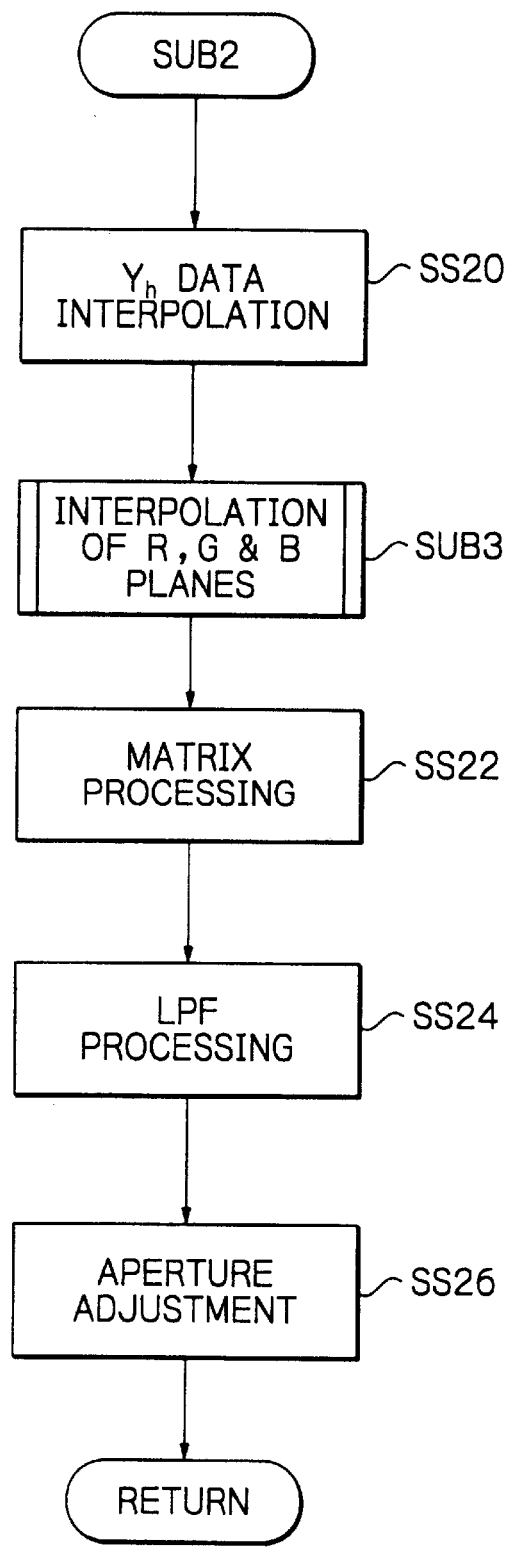
FIG. 22 is a flowchart demonstrating a subroutine SUB2 included in the main routine specifically.

In FIG. 22, the substep SS20 is followed by a subroutine SUB3 for executing plane interpolation with the data of three primary colors R, G and B produced by the subroutine SUB3. This processing is assigned to the R, G and B interpolation and rearrangements 3620, 3622 and 3624 included in the high-resolution plane interpolation 362c, FIG. 4. The R, G and B interpolation and rearrangements 3620 through 3624 receive the high-frequency luminance data $Y_h$ (52a) generated at the positions of all of the virtual pixels and photodiodes PD. In addition, the interpolation and rearrangements 3620 through 3624 respectively receive the R, G and B data 46, 48 and 50 generated at the positions of virtual pixels.

Figure 25:
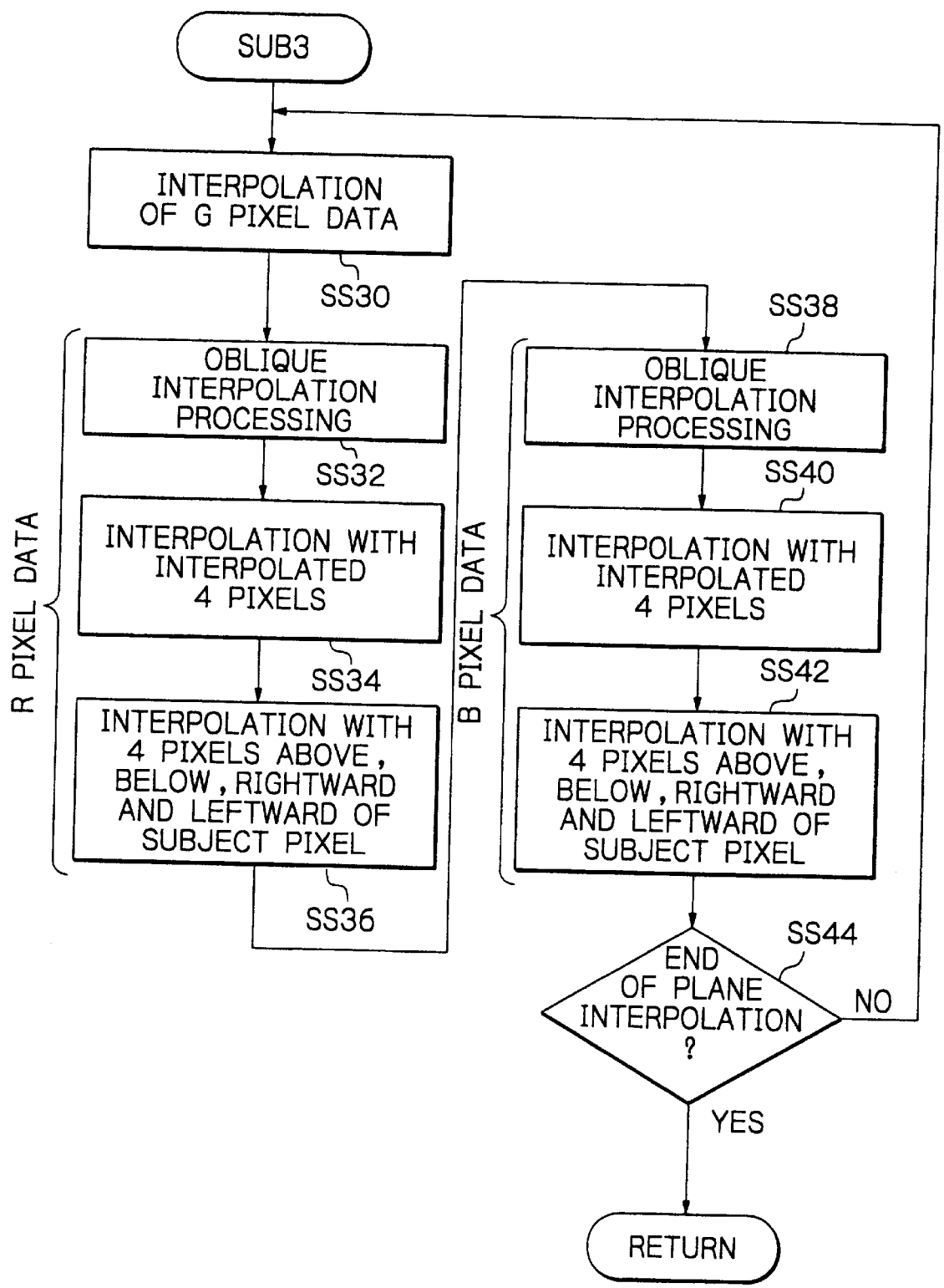
FIG. 25 is a flowchart showing a subroutine SUB3 included in the subroutine SUB2.
Figure 26:
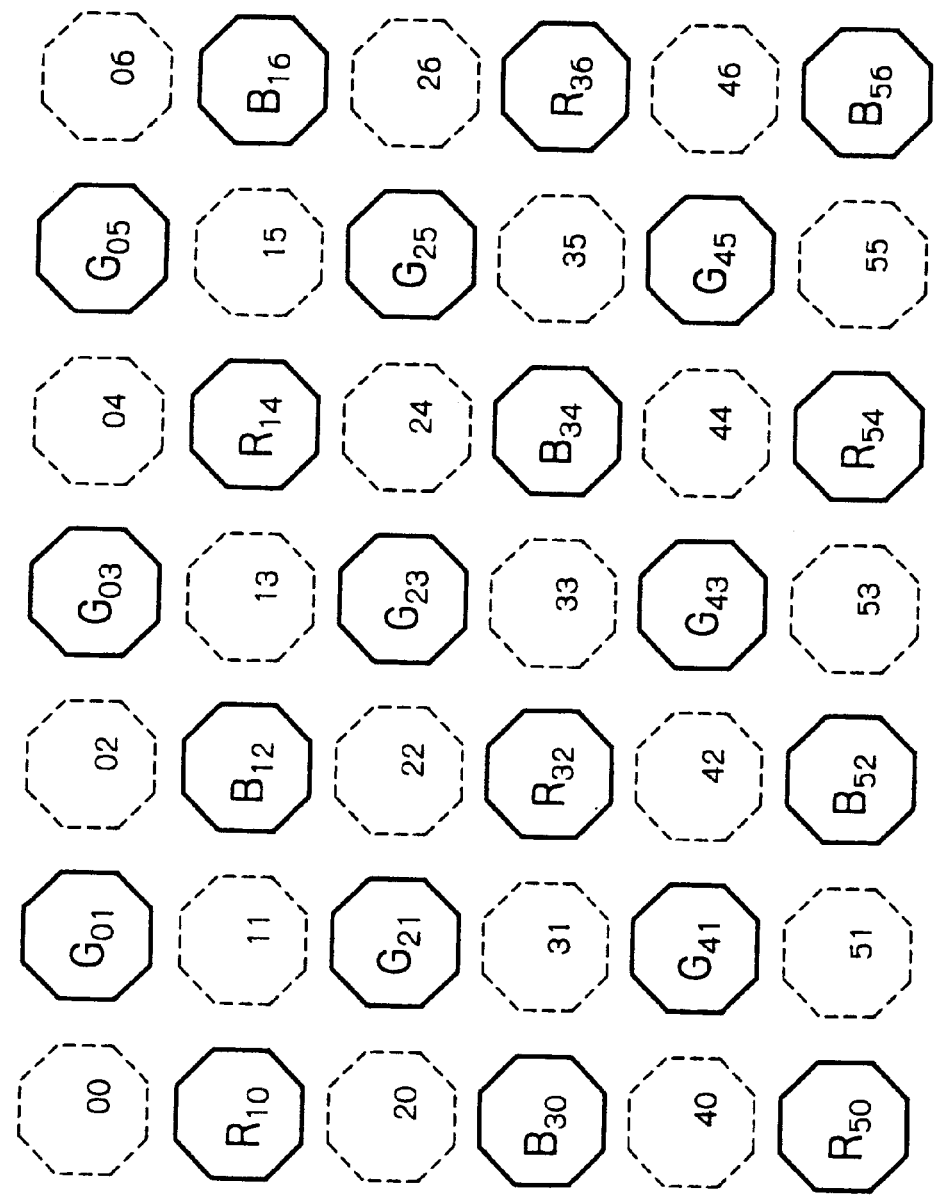
FIG. 26 is a schematic view showing a positional relation between the G square, RB full-checker pattern of primary pixels produced in the subroutine SUB1 and the positions of pixels to be interpolated.
Figure 27:
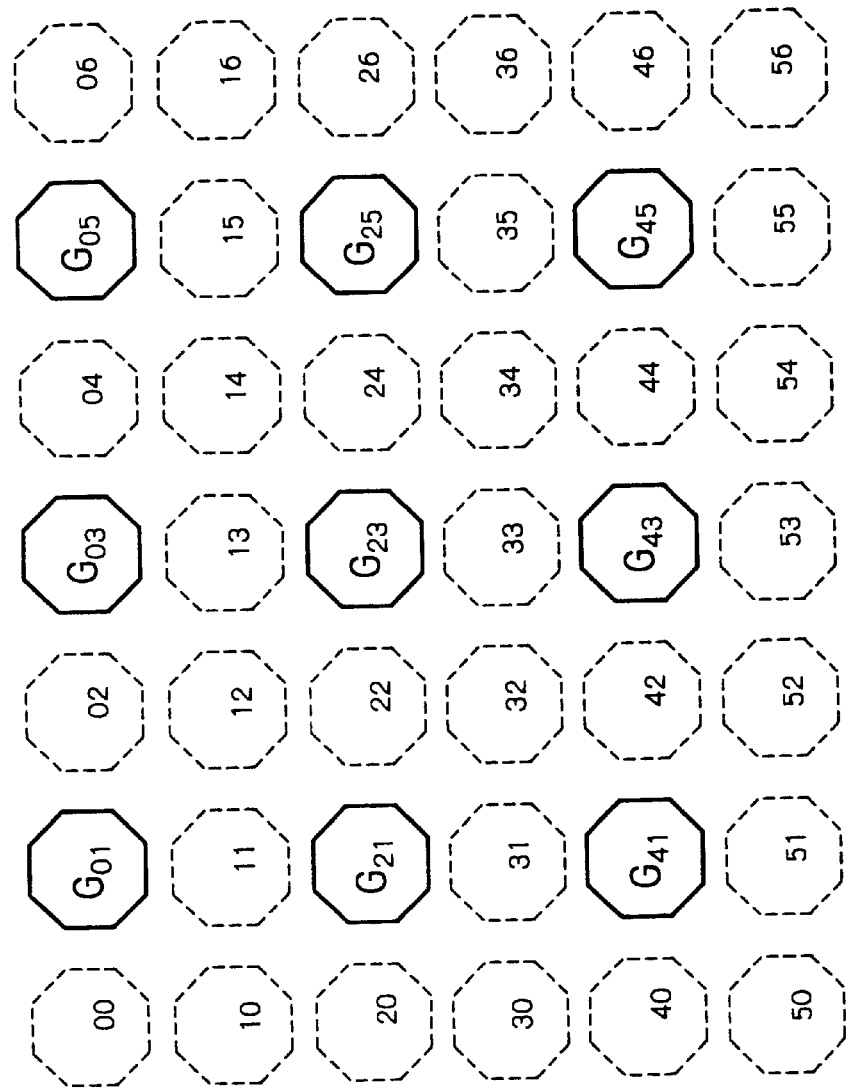
FIG. 27 is a schematic view showing a positional relation between pixels relating to pixel data G and to be interpolated in the subroutine SUB3 and existing pixels.

FIG. 25 shows in detail the subroutine SUB3 in which the R, G and B interpolation and rearrangements 3620 through 3624 interpolate, based on the pixel data input thereto, color-by-color pixel data for the virtual pixels and photodiodes PD which have not been calculated yet. As shown, the subroutine SUB3 begins with a substep SS30 for interpolating G pixel data. FIG. 26 shows the arrangement of R, G and B pixel data generated for the virtual pixels; calculated pixel positions and non-calculated pixel positions are indicated by solid frames and phantom frames, respectively. As shown, the solid frames or pixels are arranged in a single plate, pixel shift type of G square lattice, RB full-checker pattern. Further, when attention is paid only to color G included in the pattern of FIG. 26, a pattern shown in FIG. 27 is obtained. In FIG. 27, phantom frames are representative of pixels without any G pixel data, i.e., pixels corresponding to virtual photodiodes and pixels with obtained pixel data, but of colors different from G. The pixels without pixel data G will be referred to as virtual pixels. The interpolation uses a group of four obtained pixel data at a time.

Specifically, as shown in FIG. 27, assume that virtual pixels $G_{00}$ through $G_{50}$, $G_{02}$ through $G_{52}$, $G_{04}$ through $G_{54}$ and $G_{06}$ through $G_{56}$ arranged in columns and virtual pixels $G_{10}$ through $G_{16}$, $G_{30}$ through $G_{36}$ and $G_{50}$ through $G_{56}$ arranged in rows are interpolated. Then, four pixels adjoining each other, e.g., pixel data $G_{01}$, $G_{03}$, $G_{21}$ and $G_{23}$ or pixel data $G_{03}$, $G_{05}$, $G_{23}$ and $G_{25}$ are used for interpolation at a time. Also used are the high-frequency luminance data $Y_h$ of FIG. 24 corresponding to the pixel data G that are adapted for interpolation. The pixel data $G_{11}$, for example, corresponding to a virtual pixel to be interpolated is produced from the obtained data and high-frequency luminance data corresponding to two pixels adjoining the virtual pixel in the column direction and the high-frequency luminance data of the virtual pixel:

$$G_{11}=(G_{01}+G_{21})/2-(Y_{h01}+Y_{h21})/2+Y_{h11} \qquad (7)$$

With the equation (7), it is possible to interpolate the virtual pixel $G_{13}$ in the same manner as the virtual pixel $G_{11}$. The virtual pixel $G_{02}$ is interpolated on the basis of the obtained data and high-frequency luminance data of two pixels adjoining the pixel $G_{02}$ in the row direction and the high-frequency luminance data of the pixel $G_{02}$:

$$G_{02}=(G_{01}+G_{03})/2-(Y_{h01}+Y_{h03})/2+Y_{h02} \qquad (8)$$

With the equation (8), it is possible to interpolate the virtual pixel $G_{22}$ in the same manner as the virtual pixel $G_{02}$. As for the pixel data $G_{12}$ surrounded by the four pixel data $G_{01}$, $G_{03}$, $G_{21}$ and $G_{23}$, interpolation is executed by using the pixel data and high-frequency luminance data of the four positions:

$$G_{12}=(G_{01}+G_{03}+G_{21}+G_{23})/4-(Y_{h01}+Y_{h03}+Y_{h21}+Y_{h23})/4+Y_{h12} \qquad (9)$$

With the equation (9), it is possible to interpolate the virtual pixel $G_{14}$ in the same manner as the virtual pixel $G_{12}$. When the pixel data $G_{03}$, $G_{05}$, $G_{23}$ and $G_{25}$ are regarded as a group at the time of interpolation, only the pixel data $G_{04}$, $G_{24}$ and $G_{15}$ should only be calculated because the pixel data $G_{13}$ has already been calculated. Such processing is repeated to produce a plane image of G pixel data. As for the outermost edges of the plane image, it is preferable to use a preselected boundary value for precise interpolation because the above-described relation does not hold. Alternatively, data around the outermost edges may not be calculated at all because they do not lie in a valid picture.

Figure 28:
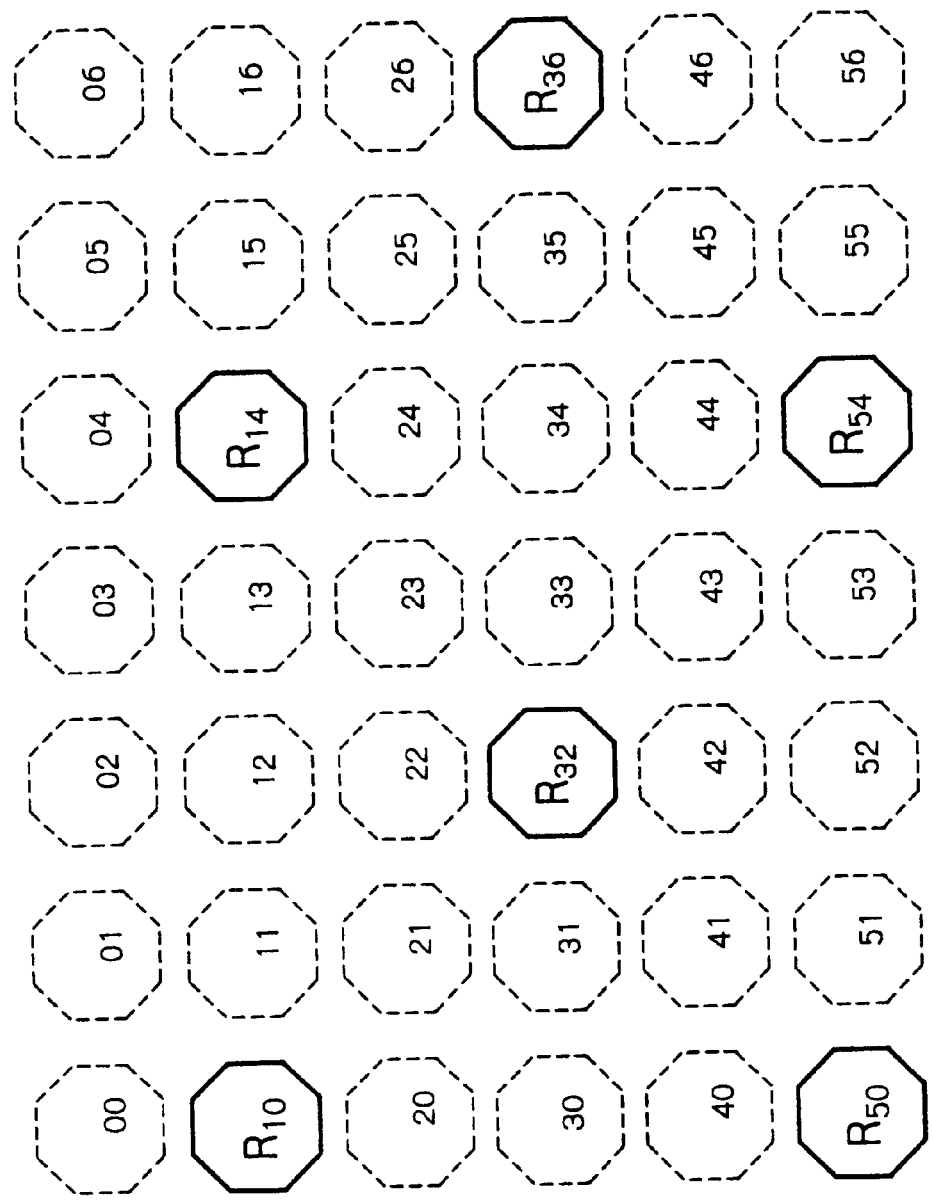
FIG. 28 is a schematic view showing a positional relation between pixels relating to pixel data R and to be interpolated in the subroutine SUB3 and existing pixels.

The substep SS30 shown in FIG. 25 is followed by a substep SS32 for calculating R pixel data. FIG. 28 shows solid frames representative of calculated virtual pixels of color R and phantom frames representative of pixels, whether they may be real or virtual, of colors different from color R. As shown, pixel data of color R are only $R_{10}$, $R_{14}$, $R_{32}$, $R_{36}$, $R_{50}$ and $R_{54}$. To interpolate a given virtual pixel, use is made of pixel data obliquely adjoining the virtual pixel and the high-frequency luminance data of FIG. 24 corresponding to the above pixel data. Pixel data R21, for example, is produced from the pixel data $R_{10}$ and $R_{32}$ and high-frequency luminance data $Y_{h10}$, $Y_{h32}$ and $Y_{h21}$:

$$R_{21}=(R_{10}+R_{32})/2-(Y_{h10}+Y_{h32})/2+Y_{h21} \qquad (10)$$

Figure 29:
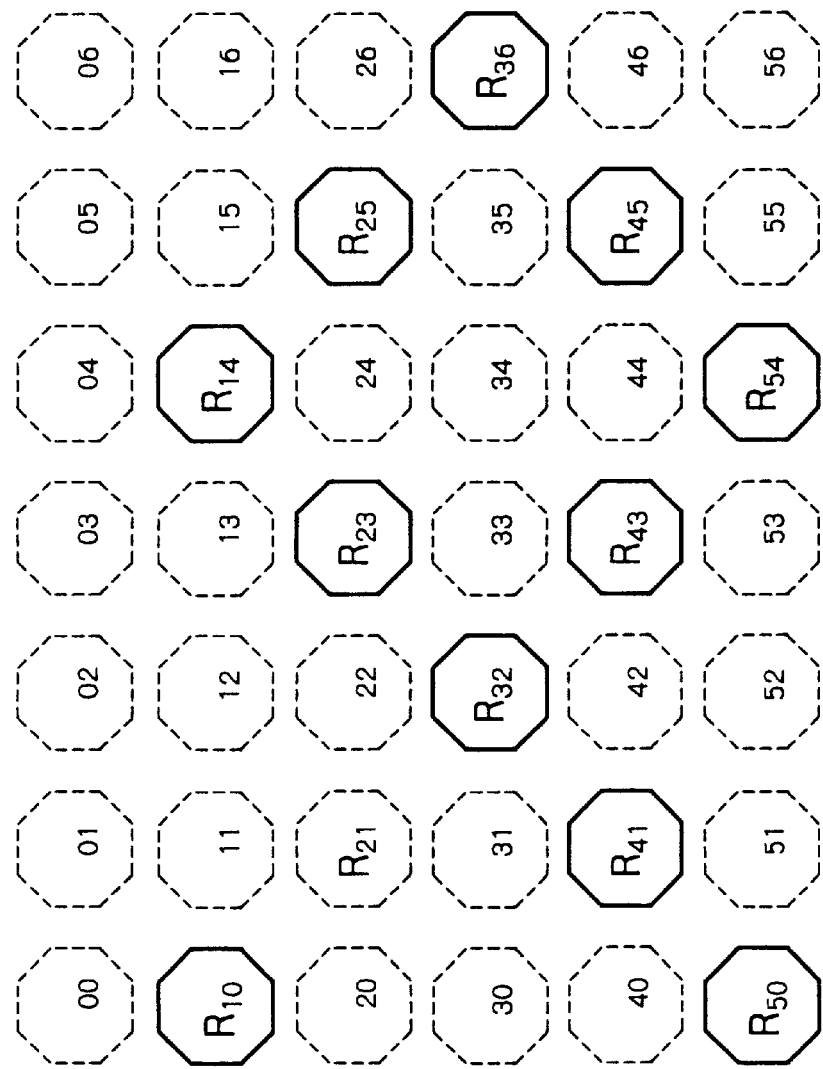
FIG. 29 is a schematic view showing a positional relation derived from oblique adjoining interpolation applied to the relation shown in FIG. 28.

Likewise, virtual pixels $R_{23}$, $R_{41}$ and $R_{43}$ are respectively produced from the pixel data $R_{14}$ and $R_{32}$, pixel data $R_{50}$ and $R_{32}$ and pixel data $R_{54}$ and $R_{32}$ also having the relation represented by the equation (10). Taking account of the pixel $R_{36}$, too, it is also possible to generate virtual pixels $R_{25}$ and $R_{45}$ by the interpolation using obliquely adjoining each other. The resulting pixels are shown in FIG. 29.

In a substep SS34 shown in FIG. 25, the pixel data of four pixels calculated in the preceding substep SS32 and high-frequency luminance data $Y_h$ associated therewith are used to interpolate a pixel surrounded by the four pixels. As shown in FIG. 29, pixel data $R_{34}$, for example, is interpolated by use of pixel data $R_{23}$, $R_{25}$, $R_{43}$ and $R_{45}$ surrounding the pixel data $R_{34}$:

$$R_{34}=(R_{23}+R_{25}+R_{43}+R_{45})/4-(Y_{h23}+Y_{h25}+Y_{h43}+Y_{h45})/4+Y_{h34} \qquad (11)$$

Figure 30:
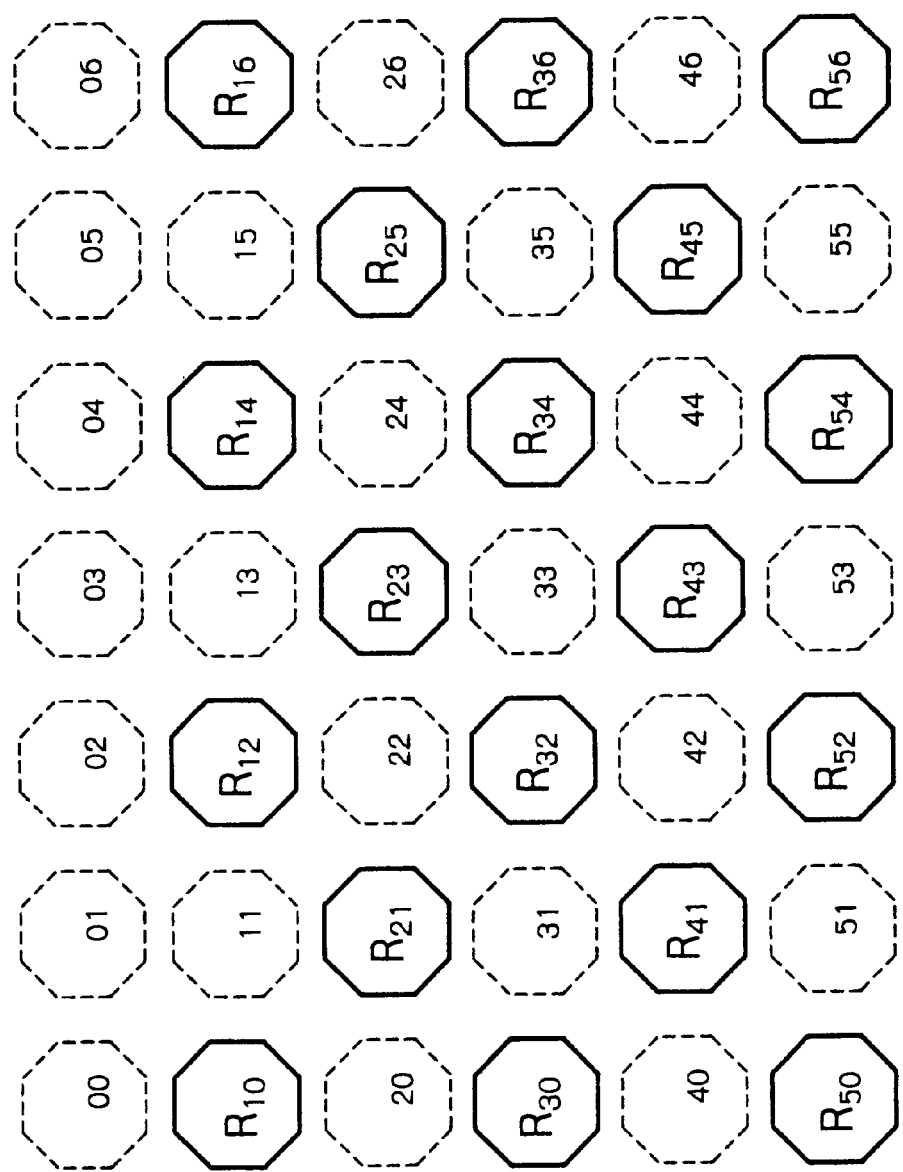
FIG. 30 is a schematic view showing a positional relation derived from interpolation applied to the relation of FIG. 29 and using four pixel data produced by oblique adjoining interpolation.

Such interpolation is also applied to pixel data $R_{12}$, $R_{30}$, $R_{52}$ and so forth on the basis of the positional relation represented by the equation (11). FIG. 30 shows the resulting interpolated pixel data. Stated another way, all the pixel data used to interpolate pixels adjoin the pixels in the oblique direction.

In a substep SS36 shown in FIG. 25, interpolation is effected by using the pixel data available at this stage of operation and pixel data positioned above, below, rightward and leftward of a pixel to be interpolated. Pixel data $R_{22}$, for example, is calculated by use of the four pixel data $R_{12}$, $R_{21}$, $R_{23}$ and $R_{32}$ adjoining it and high-frequency luminance data associated therewith:

$$R_{22}=(R_{12}+R_{21}+R_{23}+R_{32})/4-(Y_{h12}+Y_{h21}+Y_{h23}+Y_{h32})/4+Y_{h22} \qquad (12)$$

Pixel data $R_{24}$, $R_{42}$, $R_{44}$ and so forth to which the above positional relation also applies can be calculated if data having the positional relation represented by the equation (12) are substituted for. Further, if other pixels follow the rightmost pixels shown in FIG. 30, pixel data $R_{26}$ and $R_{46}$ can also be calculated.

Figure 31:
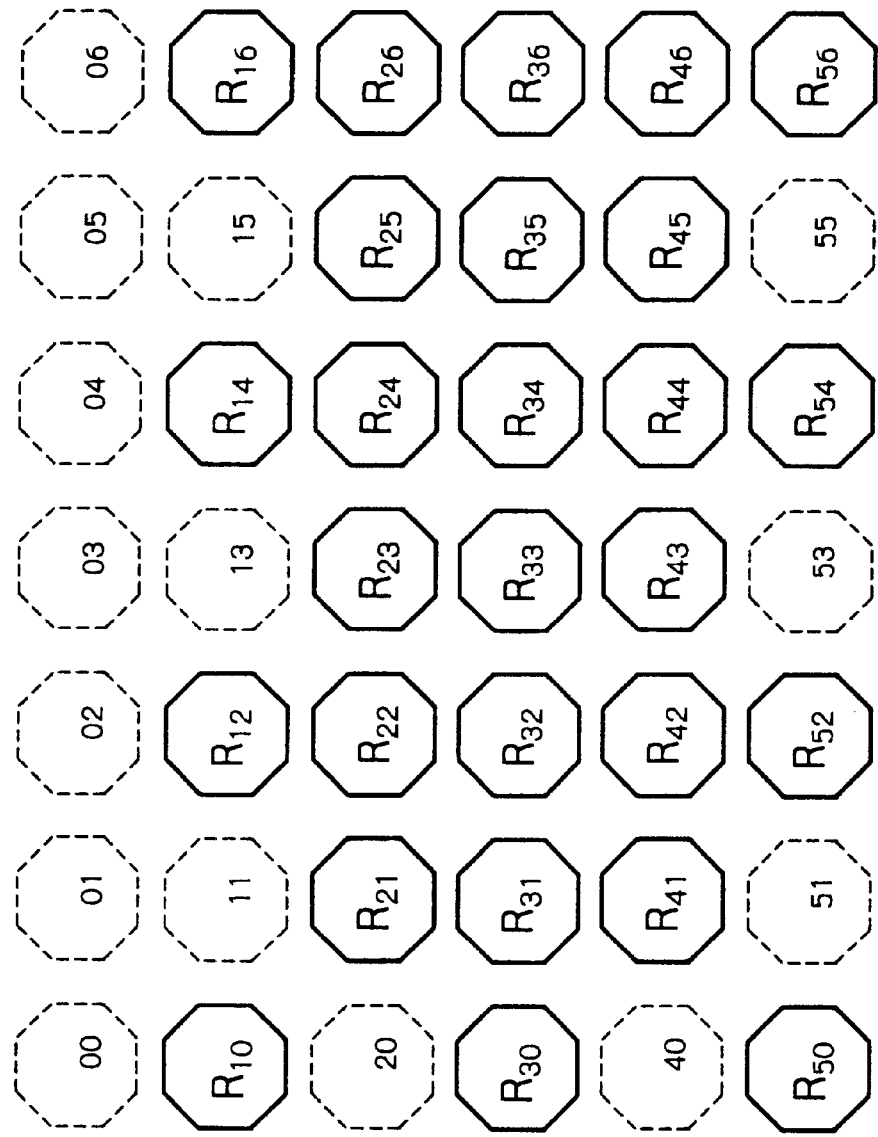
FIG. 31 is a schematic view showing a positional relation derived from interpolation applied to the relation of FIG. 29 and using pixel data above, below, rightward and leftward of a pixel to be interpolated.

As shown in FIG. 31, pixels at the peripheral portions are left non-interpolated. Such pixels may each be interpolated on the basis of three pixels adjoining it by using the previously stated interpolation scheme. Pixel data $R_{11}$, for example, is calculated by:

$$R_{11}=(R_{10}+R_{12}+R_{21})/3-(Y_{h10}+Y_{h12}+Y_{h21})/3+Y_{h11} \qquad (13)$$

Pixels $R_{13}$, $R_{15}$, $R_{20}$, $R_{40}$, $R_{51}$, $R_{53}$ and $R_{55}$ are interpolated in the same manner as the pixel $R_{11}$. Consequently, the entire plane frame except for the zeroth row is interpolated on the basis of the pixel data R.

Figure 32:
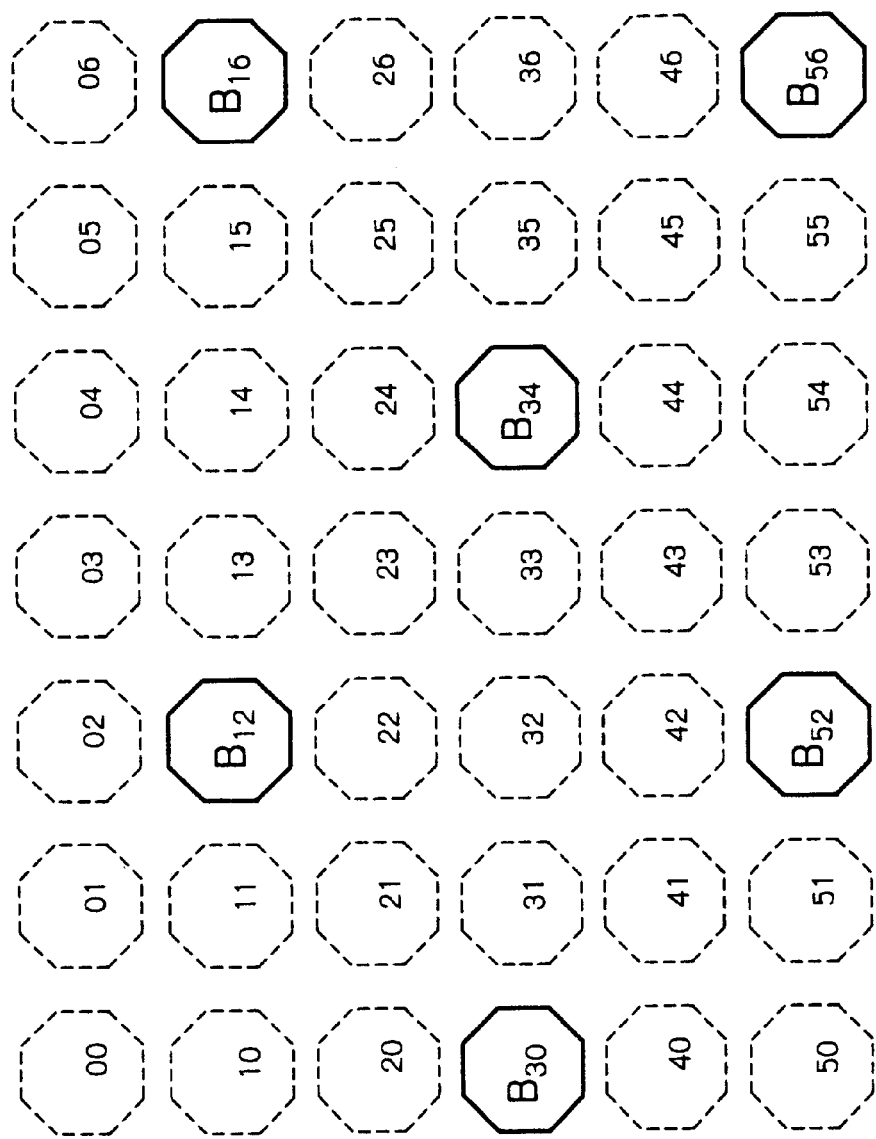
FIG. 32 is a schematic view showing a positional relation between pixels relating to pixel data B and to be interpolated in the subroutine SUB3 and existing.pixels.

The substep SS36 is followed by a sequence of substeps SS38, SS40 and SS42 for executing interpolation for the B pixel data. The substeps SS38 through SS42 are respectively identical with the substeps SS32 through SS36 except that color B is substituted for color R. Specifically, the substeps SS38 through SS 42 respectively execute oblique interpolation using obliquely adjoining pixel data, center interpolation using four interpolated data, and center interpolation using four pixels above, below, rightward and leftward of a pixel to be interpolated. This will be seen when the R pixel data of FIG. 28 and the B pixel data of FIG. 32 are compared. Specifically, as suffixes representative of rows and columns indicate, the arrangement of pixel data B shown in FIG. 32 is shifted from the arrangement of pixel data R shown in FIG. 28 by two columns in the horizontal direction or row direction. Therefore, to interpolate the virtual pixels with the equations (10) through (13), it suffices to add "2" to the numerals of the suffixes of pixel data representative of the second column and successive columns. Pixel data B23 and B43, for example, are produced by substituting color B for color R of the equation (10) and substituting pixel data B12 and B34 for the pixel data R10 and R32:

$$B_{21+2}=(B_{10+2}+B_{32+2})/2-(Y_{h10+2}+Y_{h32+2})/2+Y_{21+2}$$

$$B_{23}=(B_{12}+B_{34})/2-(Y_{h12}+Y_{h34})/4+Y_{h23} \quad (14a)$$

$$B_{41+2}=(B_{32+2}+B_{50+2})/2-(Y_{h32+2}+Y_{h50+2})/4+Y_{41+2}$$

$$B_{43}=(B_{34}+B_{52})/2-(Y_{h34}+Y_{h52})/4+Y_{h43} \quad (14b)$$

To interpolate pixel data on the zeroth and first columns of the matrix, "2" is subtracted from the suffixes to color R by using the relation between the pixel data $R_{23}$ and the pixel data $R_{14}$ and $R_{32}$ used to calculate the pixel data $R_{23}$. Pixel data $B_{21}$, for example, is produced by:

$$B_{23-2}=(B_{14-2}+B_{32-2})/2-(Y_{h14-2}+Y_{h32-2})/2+Y_{h23-2}$$

$$B_{21}=(B_{12}+B_{30})/2-(Y_{h12}+Y_{h30})/4+Y_{h21} \quad (15)$$

The above relation also holds in the other equations (11) through (13). Paying attention to this relation, the substeps SS40 and SS42 interpolate and rearrange the pixel data B on a plane.

In a substep SS44 following the substep SS42, whether or not the interpolation and plane rearrangement have been fully executed with all of colors G, R and B is determined. If the answer of the substep SS44 is negative (NO), the operation returns to the substep SS30. If desired, this decision may be executed color by color. If the answer of the substep SS44 is positive (YES), the operation returns to the subroutine SUB2, FIG. 22.

Figure 33:
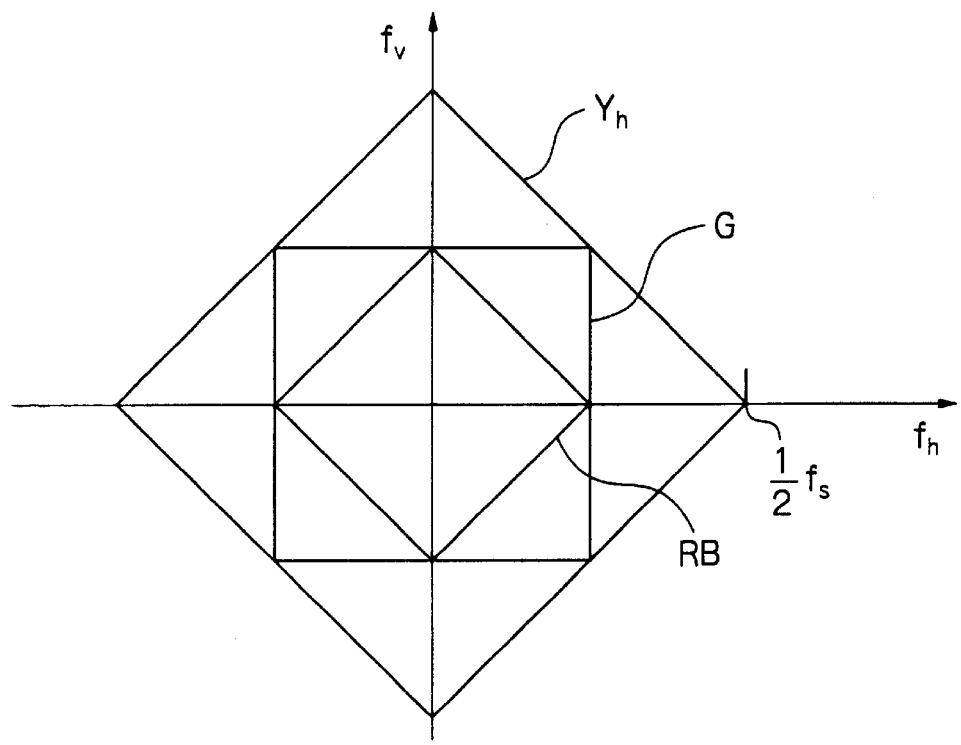
FIG. 33 is a schematic view showing a relation between the spatial frequencies of different colors derived from the arrangement of primary color pixel data generated in the illustrative embodiment.

FIG. 33 shows, in terms of frequency bands of signals, the various data produced by the subroutine SUB3 and including the R, G and B data. In FIG. 33, the ordinate and abscissa indicate the vertical frequency axis ($f_v$) and horizontal frequency axis ($f_h$), respectively. A solid line RB is representative of the spatial frequency distribution of a honeycomb arrangement on the basis of a checker pattern in which R and B pixels fully alternate with each other. As for G pixels, four pixels are arranged in a stripe pattern with pixel shift, so that the frequency is high enough to contain the frequencies of the R and B pixels. The spatial frequency of the G pixels is substantially $f_s/4$ and extends through the vertical and horizontal frequency axes. The high frequency signals $Y_h$ produced by interpolation contain the G, R and B pixels and have a frequency band extended to $f_s/2$.

Figure 34A:
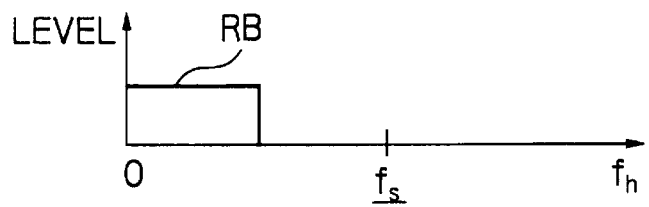
FIGS. 34 through 34C are graphs each showing a particular relation between a horizontal spatial frequency band and a signal level derived from broad-band processing included in the subroutine SUB2.
Figure 34B:
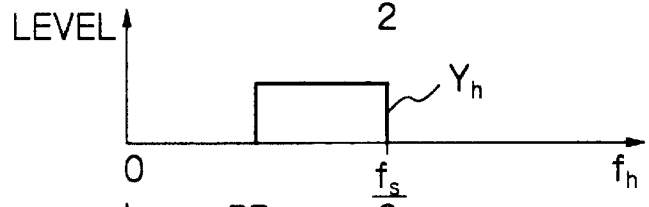
Figure 34C:
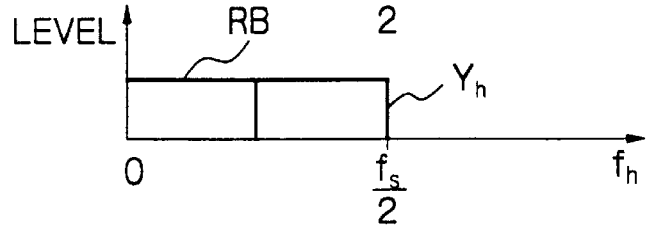

FIGS. 34A, 34B and 34C show color-by-color frequency bands derived from the consecutive processing; the ordinates and abscissas indicate signal levels and horizontal spatial frequency axes, respectively. In FIG. 34A, a signal RB is representative of a frequency band derived from the digitization of the image signals of R and B pixels. In FIG. 34B, assuming the data output from the luminance data generation 362b to be a signal, a high-frequency luminance signal $Y_h$ is representative of the frequency band of the signal. As shown, the signal $Y_h$ has a cut-off frequency close to $f_s/2$ at its high frequency side. The high-resolution plane interpolation 362c executes interpolation in such a manner as to combine the frequency bands of FIGS. 34A and 34B, implementing a horizontal spatial frequency band shown in FIG. 34C. The resulting R, G and B plane images each are transformed to high frequency component data.

Referring again to FIG. 22, in a substep SS22 following the subroutine SUB3, matrix processing using the R, G and B data is executed for generating luminance data Y (60) and chrominance data (R–Y) (62) and (B–Y) (64). This function is assigned to the chrominance matrix 364c. Subsequently, LPF processing is executed over a broad band in order to obviate aliasing distortions (substep SS24). The LPF processing is assigned to the antialiasing filter 366c. As a result, chrominance data signals (R–Y)=$C_r$ and (B–Y)=$C_b$ are produced. The luminance data Y (66) are subjected to aperture adjustment in order to output luminance data Y (68) (substep SS26). This function is assigned to the aperture adjustment 368c, FIG. 3. After the substep SS26, the operation returns to the main routine shown in FIG. 16.

As stated above, in the illustrative embodiment, image signals are output via the color filter CF of complementary colors. This is successful to use the quantity of incident light more effectively than when a color filter of primary colors is used, and therefore to increase the sensitivity of the individual pixel. It follows that even if the sensitivity range of the photodiodes PD is narrow, it is possible to prevent the sensitivity from decreasing and to broaden the frequency band of the resulting signals.

Figure 35:
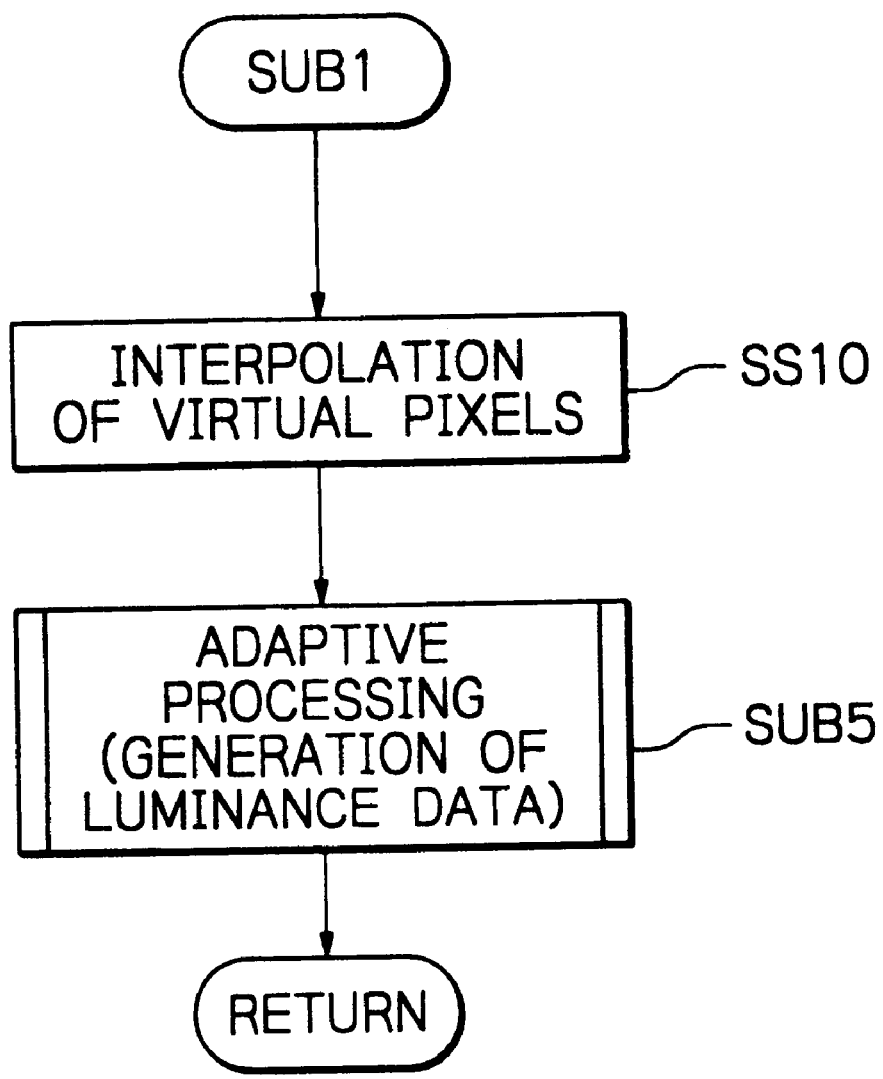
FIG. 35 is a flowchart demonstrating the generation of luminance data effected in the subroutine SUB1 by applying adaptive processing to the pixel data generated by the interpolation of virtual pixels.

Another specific procedure for generating luminance data by interpolation will be described with reference to FIG. 35. Briefly, this procedure executes adaptive processing in accordance with a correlation between pixel data used to generate checker-pattern, luminance data $Y_h$. As shown, in a subroutine SUB5, the pixel data of primary colors produced in the substep SS10 at the positions of virtual pixels are selectively used to generate the luminance data $Y_h$. This allows the luminance data $Y_h$ to be generated on the basis of the optimal combination of pixel data.

The adaptive selection executed in the subroutine SUB5 will be described in detail with reference to FIGS. 36A through 38. As shown in FIG. 36, whether or not an adaptive process mode should be executed is determined (substep SS500). If the answer of the substep SS500 is YES, a substep SS502 is executed; if otherwise (NO, step SS500), the operation jumps to a substep SS504 shown in FIG. 38 via a connector A. In the substep SS502, whether or not oblique correlation processing should be executed is determined (step SS502). If the answer of the substep SS502 is YES, a substep SS506 is executed; if otherwise (NO, step SS502) the operation jumps to a substep SS508 shown in FIG. 37B.

In the substep SS504, luminance data are calculated without regard to the adaptive process mode. Specifically, as shown in FIG. 26, the CCD image pickup 30 outputs pixel data of primary colors for the virtual pixels. In FIG. 26, suffixes indicate the positions of the photodiodes or pixels in terms of the row and column. The solid frames and phantom frames are representative of the positions of pixels defined by the actual photodiodes and the positions of pixels defined by the virtual photodiodes, as stated earlier. Basically, luminance data Y can be calculated by (0.5*R+0.5B) using G virtual pixel data and R and B pixel data, as well known in the art. In this case, too, G pixel data are dealt with as luminance data (G pixel data=luminance data). As for luminance data based on R or B pixel data, assume that a color corresponding to the position of the actual photodiode is R or B as distinguished from G. Then, luminance data $Y_{32}$, for example, corresponding to the position of the pixel data $R_{32}$ shown in FIG. 26 is calculated by use of the pixel data $R_{32}$ and four pixel data $B_{12}$, $B_{30}$, $B_{34}$ and $B_{52}$ of color B surrounding it:

$$Y_{32}R_{32}/2+(B_{12}+B_{30}+B_{34}+B_{52})/8 \quad (16)$$

Luminance data $Y_{34}$ corresponding to the position of the pixel data $B_{34}$ is calculated by use of the pixel data $B_{34}$ and four pixels data $R_{14}$, $R_{32}$, $R_{36}$ and $R_{54}$ of color R surrounding it:

$$Y_{34}=B_{34}/2+(R_{14}+R_{32}+R_{36}+R_{54})/8 \quad (17)$$

In this manner, to produce an amount of correction, the sum of four pixels surrounding the subject pixel data is divided by the double of the number of pixels (4×2=8), and the resulting quotient is added to the half-value of the subject pixel data. This is equivalent to multiplying a mean value by a coefficient of 0.5 and is repeated with each pixel in order to produce luminance data Y. As a result, the luminance data shown in FIG. 20 are output in a checker pattern. Such calculations are effected even when a correlation does not hold in the oblique, vertical or horizontal direction.

Figure 36B:
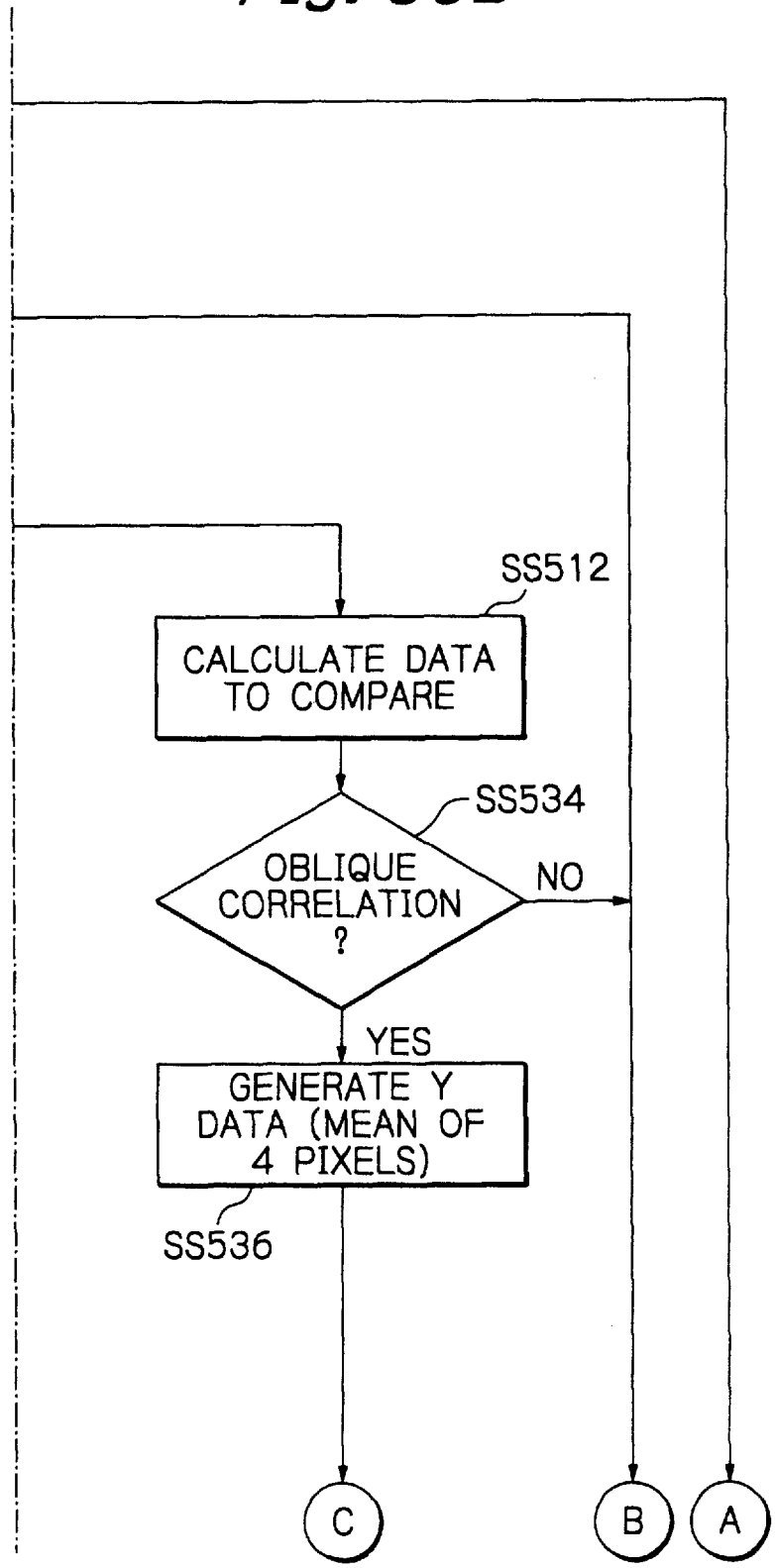

In the substep SS506, whether or not the oblique correlation processing should be executed in a plurality of steps is determined. If the answer of the substep SS506 is YES, a substep SS510 is executed (FIG. 36A); if otherwise (NO, substep SS506), a substep SS512 is executed (FIG. 36B).

In the substep SS510, data ARS for comparison are calculated. For the calculation, use is made of pixel data of the same color as pixel data to be generated. As for pixel data $R_{32}$ by way of example, data ARS for comparison are calculated by using pixel data $R_{10}$, $R_{54}$, $R_{14}$ and $R_{50}$ surrounding the pixel data $R_{32}$:

$$ARS_L = |R_{10} - R_{54}| \tag{18a}$$

$$ARS_R = |R_{14} - R_{50}| \tag{18b}$$

where suffices L and R denote leftward slant (S) and rightward slant, respectively. When the arrangement shown in FIG. 26 is rotated counterclockwise by 45°, the slants L and R correspond to the horizontal direction and vertical direction, respectively. The data $ARS_L$ and $ARS_R$ calculated are used to produce correlation values ($ARS_L - ARS_R$) and ($ARS_R - ARS_L$).

Assume that the correlation value ($ARS_L - ARS_R$) is greater than a preselected reference value J0 newly set. Then, the data $ARS_R$ is determined to be small, i.e., the values of the pixel data used are close to each other. Consequently, it is determined that a correlation holds in the rightward oblique direction (YES, substep SS514; FIG. 36A). The substep SS514 is followed by a substep SS516. If the correlation value ($ARS_L - ARS_R$) is smaller than the reference value J0, it is determined that a correlation does not hold in the rightward oblique direction (NO, substep SS514). The substep SS514 is followed by a substep SS518 (FIG. 36A).

In the substep SS516, luminance data $Y_{32}$ associated with the pixel data $R_{32}$ is produced by:

$$Y_{32} = R_{32}/2 + (R_{10} + R_{54})/4 \tag{19}$$

In the substep SS518, whether or not the other correlation value ($ARS_R - ARS_L$) is greater than the reference value J0. If the answer of the substep SS518 is YES, it is determined that a correlation holds in the leftward oblique direction, and a substep SS520 is executed (FIG. 36A). If the answer of the substep SS518 is NO, it is determined that a correlation does not hold in the leftward oblique direction, and a substep SS522 is executed (FIG. 36A).

In the substep SS520, luminance data $Y_{32}$ is produced by:

$$Y_{32} = R_{32}/2 + (R_{14} + R_{50})/4 \tag{20}$$

Figure 38:
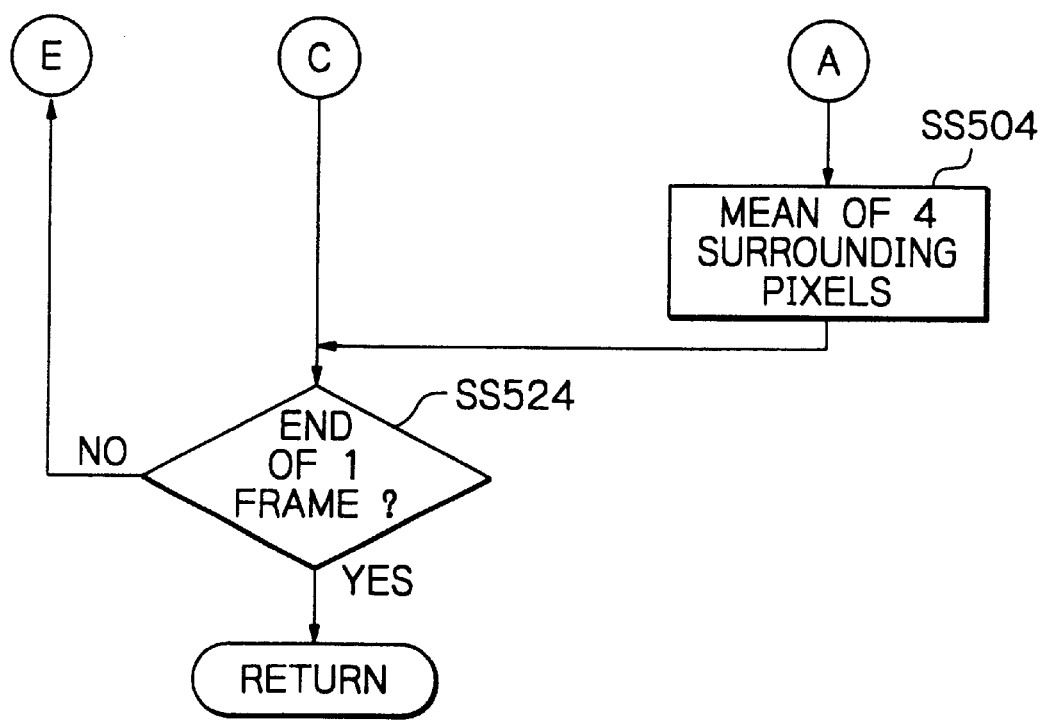
FIG. 38 is a flowchart showing processing to follow the processing shown in FIG. 37A and 37B.
Figure 39A:
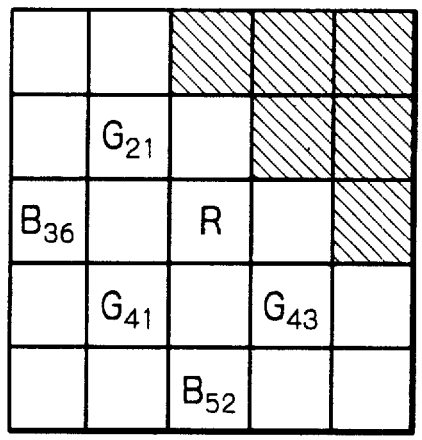
FIGS. 39A through 39F are schematic views each showing a particular color boundary pattern with which decision on oblique correlation is practicable in the subroutine SUB5.
Figure 39B:
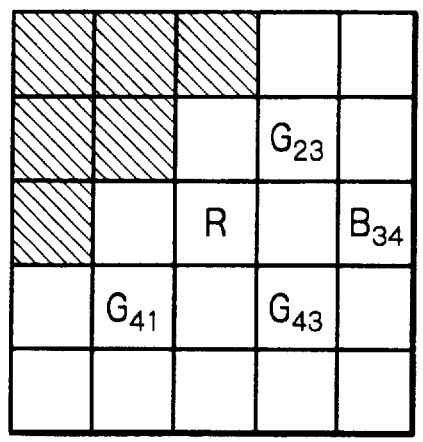
Figure 39C:
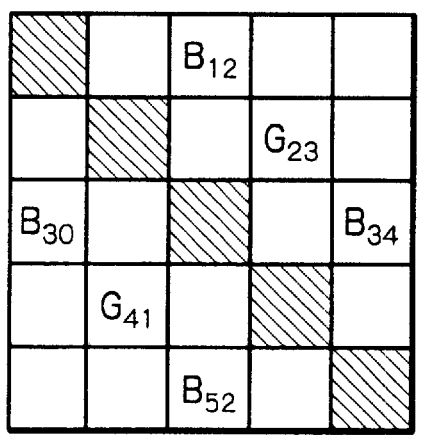
Figure 39D:
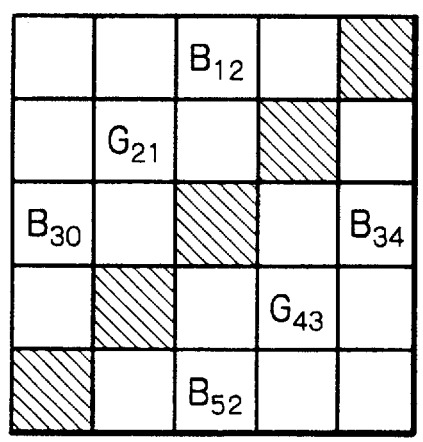
Figure 39E:
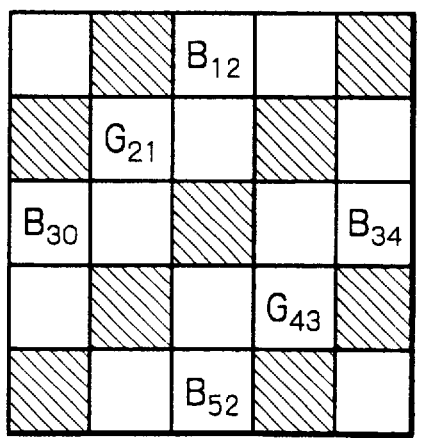
Figure 39F:
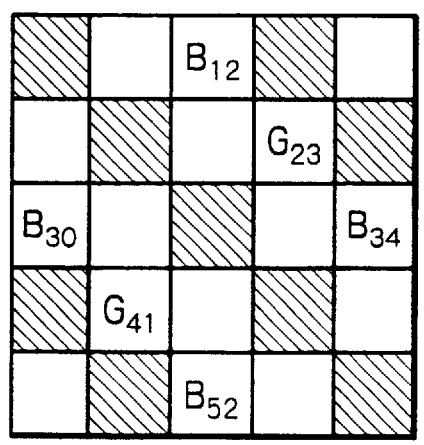

After the calculation of luminance data in the substep SS516 or SS520, the operation advances to a substep SS524 shown in FIG. 38 via a connector C.

In the substep SS522, new data for comparison are calculated. For the calculation, use is made of pixel data different in color from pixel data to be generated, e.g., pixel data of color G. As for pixel data $R_{32}$ by way of example, data AGS for comparison are calculated by using pixel data $G_{21}$, $G_{43}$, $G_{23}$ and $G_{41}$ surrounding the pixel data $R_{32}$:

$$AGS_L = |G_{21} - G_{43}| \tag{21a}$$

$$AGS_R = |G_{23} - G_{41}| \tag{21b}$$

Further, the data $AGS_L$ and $AGS_R$ are used to calculate correlation values ($AGS_L - AGS_R$) and ($AGS_R - AGS_L$). Subsequently, the operation is transferred to a substep SS526 shown in FIG. 37A via a connector D.

Assume that the correlation value ($AGS_L - AGS_R$) is greater than another preselected reference value J0a. Then, it is determined that the data $AGS_R$ is small, and therefore the values of the pixel data used are close to each other. Consequently, a correlation is determined to hold in the rightward oblique direction (YES, substep SS526), and a substep SS528 is executed. If the correlation value ($AGS_L - AGS_R$) is smaller than the reference value J0a (NO, substep SS526), then it is determined that a correlation does not hold in the rightward oblique direction, and a substep SS530 is executed.

In the substep SS528, luminance data $Y_{32}$ is produced by:

$$Y_{32} = R_{32}/2 + (G_{21} + G_{43})/4 \tag{22}$$

The luminance data $Y_{32}$ may be calculated by using the equation (19), if desired.

Figure 37B:
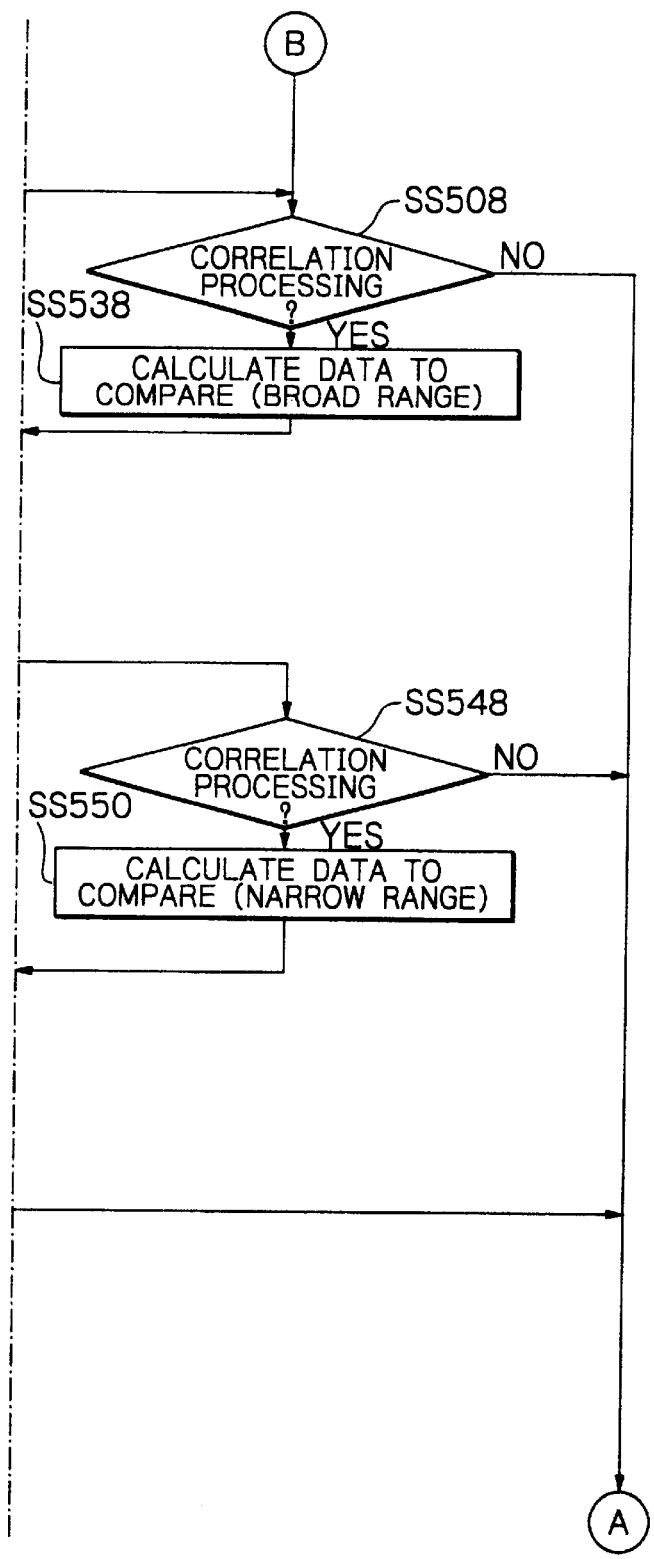

Assume that the other correlation value ($AGS_R - AGS_L$) is greater than the reference value J0a. Then, a correlation is determined to hold in the leftward oblique direction (YES, substep SS530), and a substep SS532 is executed (FIG. 37A). If a correlation does not hold in the above direction (NO, substep SS530), it is determined that a correlation does not hold in the leftward oblique direction, and a substep SS508 is executed (FIG. 37B).

In the substep SS532, luminance data $Y_{32}$ is produced by:

$$Y_{32} = R_{32}/2 + (G_{23} + G_{41})/4 \tag{23}$$

The luminance data $Y_{32}$ may be calculated by using the equation (20), if desired. The substep SS528 or SS532 is followed by a substep SS524 shown in FIG. 38 via a connector C.

When simple oblique processing is selected (NO, substep SS506), the substep SS512 is executed, as stated earlier. In the substep SS512, data for comparison are calculated. The calculated data are used to determine a direction in which pixel data around pixel data to be subjected to adaptive processing are correlated. As for pixel data $R_{32}$ by way of example, data AG for comparison is calculated by using pixel data $G_{21}$, $G_{23}$, $G_{41}$, and $G_{43}$ surrounding the pixel data $R_{32}$:

$$AG = |G_{21} + G_{43} - (G_{23} + G_{41})| \tag{24}$$

It is to be noted that pixel data of color B are also calculated by using G pixel data surrounding them.

By the equation (24), a value aslant rightward or leftward and greater than the other value is produced as the data AG for comparison.

Subsequently, whether or not pixel data obliquely sandwiching the subject pixel data are correlated (oblique correlation) is determined (substep SS534; FIG. 36B). For this decision, a reference value J1 is newly set. If the data AG is greater than the reference value J1, it is determined that an oblique correlation holds (YES, step SS534), and a substep SS536 is executed (FIG. 36B). If the answer of the step SS534 is NO, the operation is transferred to a substep SS508 shown in FIG. 37B via a connector B.

In the substep SS536, four pixel data G used to calculate the data AG are averaged in order to produce luminance data Y. As shown in FIGS. 39A through 39F, at least six different patterns are determined for, e.g., the pixel data R=$R_{32}$ by the decision using a plurality of steps or the simple decision. Generally, a false color is apt to appear at the boundary between the hatched portion and the non-hatched portion in each of FIGS. 39A through 39F. The false color can be desirably reduced in the entire image if the luminance data Y associated with the R pixel data adjoining the boundary is calculated by the above-described procedure. As for the pixel data B=$B_{34}$, too, the substeps SS514 through SS520, substeps SS522 through SS532 and substeps SS534 and SS536 are executed to produce adaptive luminance data Y, although not described specifically in order to avoid redundancy.

The substep SS536 is followed by a substep SS524 shown in FIG. 38 via the connector C. This is the end of the sequence of oblique processing steps. If the answer of the substep SS534 is NO, meaning that oblique processing is not to be executed, the operation is transferred to the substep SS508 via a connector B. The substep SS508 and successive substeps process data on the basis of correlations that may hold in the horizontal and vertical directions. Specifically, in the substep SS508, whether or not to execute correlation processing in the other directions, i.e., vertical and horizontal directions over the broad range of photodiodes (or color filters) is determined. If the answer of the substep SS508 is YES, a substep SS538 is executed; if otherwise (NO, step SS508), the operation is transferred to the substep SS504 via the connector A.

In the substep SS538, data for comparison are calculated. Again, assume the pixel data R=$R_{32}$ by way of example. Data $ABR_V$ in the vertical direction and data $ABR_H$ in the horizontal direction for the pixel data $R_{32}$ are calculated by using pixel data of the other color, i.e., B pixel data surrounding the pixel data $R_{32}$:

$$ABR_V = |B_{12} - B_{52}| \tag{25a}$$

$$ABR_H = |B_{30} - B_{34}| \tag{25b}$$

Further, the calculated data $ABR_V$ and $ABR_H$ are used to produce correlation values ($ABR_H$–$ABR_V$) and ($ABR_V$–$ABR_H$). How these correlation values are compared with a preselected reference value J2 in the horizontal and vertical directions in order to determine a correlation will be described hereinafter.

First, whether or not pixel data vertically sandwiching subject pixel data are correlated to each other (vertical correlation) is determined (substep SS540; FIG. 37A). For this decision, a preselected reference value J2a is used. If a difference between the two data $ABR_H$ and $ABR_V$ is greater than the reference value J2a, it is determined that a vertical correlation holds (YES, substep SS540), and a substep SS542 is executed. If the answer of the step SS540 is NO, it is determined that a vertical correlation does not hold, and a substep SS544 is executed.

In the substep SS542, pixel data $B_{12}$ and $B_{52}$ are used to calculate luminance data Y because a correlation means that the values of the two pixel data are close to each other. Luminance data $Y_{32}$, for example, is produced by:

$$Y_{32} = R_{32}/2 + (B_{12} + B_{52})/4 \tag{26}$$

After the substep SS542, the operation is transferred to the substep SS524, FIG. 38 via the connector C.

Subsequently, whether or not pixel data horizontally sandwiching the subject pixel data are correlated to each other (horizontal correlation) is determined (substep SS544). For this decision, a preselected reference value J2b is used. If the difference between the two data $ABR_V$ and $ABR_H$ is greater than the reference value J2b, it is determined that a horizontal correlation holds (YES, substep SS544), and a substep SS546 is executed (FIG. 37A). If the answer of the step SS544 is NO, it is determined that a horizontal correlation does not hold, and a substep SS548 is executed (FIG. 37B).

In the substep SS546, pixel data $B_{30}$ and $B_{34}$ are used to calculate luminance data Y because a correlation means that the values of the two pixel data are close to each other. Luminance data $Y_{32}$ is produced by:

$$Y_{32} = R_{32}/2 + (B_{30} + B_{34})/4 \tag{27}$$

After the substep SS546, the operation is transferred to the Substep SS524, FIG. 38 via the connector C.

In the substep SS548, whether or not to determine a correlation between, e.g., pixels of color B around a pixel of color R to be generated is determined. Because the subject R pixel is located at the center of the surrounding B pixels, the distance between the pixels in the substep SS540 or SS544 is short. For example, in the vertical direction, the distance between the pixels $R_{32}$ and $B_{12}$ and the distance between the pixels $R_{32}$ and $B_{52}$ is one half of the distance between the pixels $B_{12}$ and $B_{52}$. This relation is also true with pixels sandwiching the subject pixel in the horizontal direction. This indicates that the subsequent processing executes decision on a correlation over a narrow range of the photodiodes (or color filters) than the previously stated processing assigned to the vertical and horizontal directions. If the answer of the step SS548 is YES, a substep SS550 is executed; if otherwise (NO, step SS548), the operation is transferred to the substep SS504 via the connector A. In this case, it is determined that either one of the reference values J2a and J2b different from the previous reference value J2 is not satisfied. The subsequent processing may not be executed, if desired.

In the substep SS550 (FIG. 37B), data for comparison are again calculated. Specifically, correlations between subject pixel data and pixel data surrounding it in the vertical and horizontal directions are determined and then added. Again, as for luminance data Y associated with the pixel data $R_{32}$, vertical data $ACR_V$ and horizontal data $ACR_H$ for comparison are calculated by using pixel data of the other color, i.e., pixel data G around the pixel data $R_{32}$:

$$ACR_V = |G_{21} - G_{41}| + |G_{23} - G_{43}| \tag{28a}$$

$$ACR_H = |G_{21} - G_{23}| + |G_{41} - G_{43}| \tag{28b}$$

The substep SS550 is followed by a substep SS552 in FIG. 37A. By using the data $ACR_V$ and $ACR_H$, it is possible to further reduce the distances between the subject pixel data and the surrounding pixel data in determining the correlation values. Therefore, whether or not a correlation holds can be determined over a range narrower than the range available with the substeps SS540 through SS546. Thereafter, the operation is transferred to the substep SS552.

In the substep SS552, whether or not pixel data vertically sandwiching the subject pixel data are correlated (vertical correlation) is determined. For this decision, use is made of a preselected reference value J3 or, if desired, reference values J3a and J3b respectively assigned to the horizontal direction and vertical direction. If a difference between the data $ACR_H$ and $ACR_V$ is greater than the reference value J3, it is determined that a vertical correlation holds (YES, substep SS552), and a substep SS554 is executed. If the above difference is smaller than the reference value J3 (NO, substep SS552), a substep SS556 is executed, determining that a vertical correlation does not hold.

In the substep SS554, processing identical with the processing of the substep SS542 is executed by using the equation (26). In the substep SS556, whether or not pixel data horizontally sandwiching the subject pixel data are correlated (horizontal correlation) is determined by again using the reference value J3.

In the substep, if the difference ($ACR_V$–$ACR_H$) is greater than the reference value J3 (YES), a substep SS558 is executed for producing luminance data Y. At this instant, use is made of pixel data and the equation (27) as in the substep SS546. This is followed by the substep SS524, FIG. 38, via the connector C. If the answer of the substep SS556 is NO, it is determined that a horizontal correlation does not hold, and the operation is transferred to the substep SS504, FIG. 38, via the connector A. In the substep SS504, the equation (16) is used to produce a mean value of the sum of the subject pixel data and surrounding pixel data of the other color (B in this case) and then multiply the mean value by 0.5, thereby producing luminance data Y. This is followed by the substep SS524.

In the substep SS524, whether or not one frame of luminance data have been fully generated in a checker pattern is determined. This can be easily done by, e.g., counting the luminance data Y and determining whether the count is equal to the number of the photodiodes. If the answer of the step SS524 is NO, it is determined that the processing has not been completed yet. The operation is then returned to the substep SS500, FIG. 36A, via a connector E. If the answer of the step SS524 is YES, the operation is returned to the subroutine SUB1. Consequently, data are generated at the positions of the virtual pixels arranged in a checker pattern, as shown in FIG. 20.

Figure 41A:
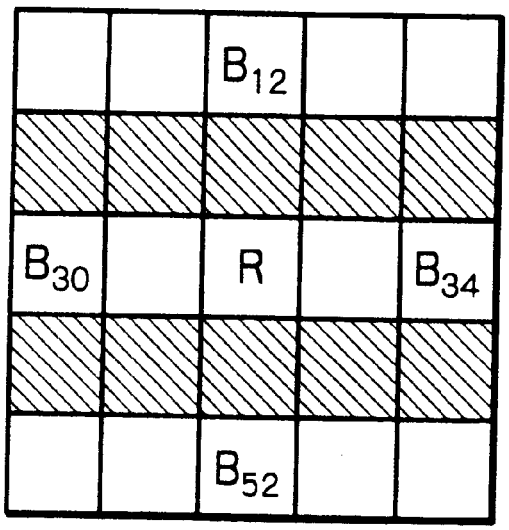
FIGS. 41A and 41B are schematic views each showing a particular color boundary pattern with which the decision is not practicable in the subroutine SUB5 of FIGS. 36 through 38.
Figure 41B:
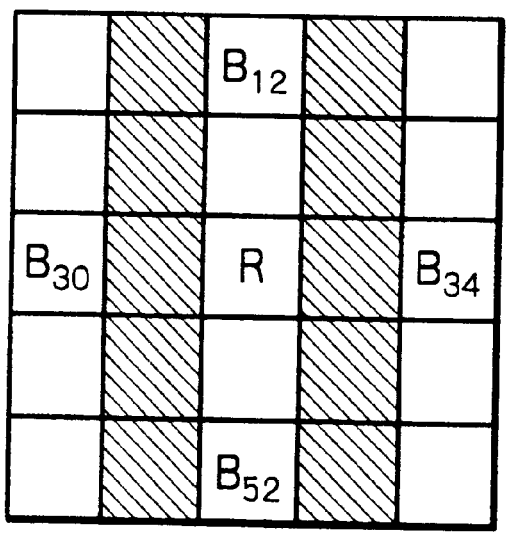

As stated above, as for images having color boundaries shown in FIGS. 39A through 39F or FIGS. 40A through 40D, the directions of the color boundaries can be estimated on the basis of the directions of correlations. On the other hand, when pixel data $B_{12}$, $B_{30}$, $B_{34}$ and $B_{52}$ around subject pixel (=$R_{32}$) are used for calculation, a correlation in the horizontal or vertical direction cannot be specified (FIGS. 41A and 41B). However, the above-described adaptive processing for generating luminance data insures a high quality image free from false colors.

Figure 43:
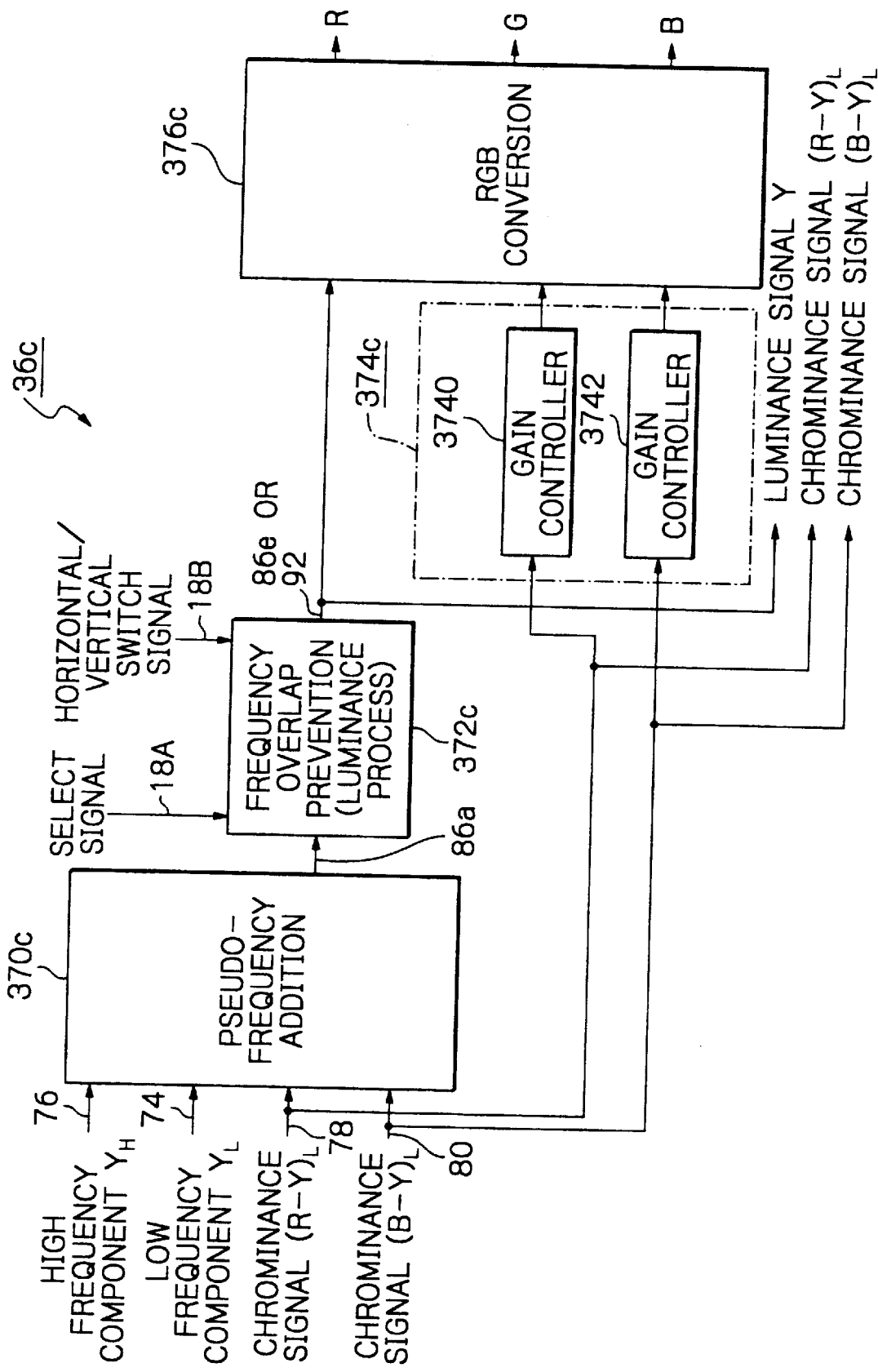
FIG. 43 is a schematic block diagram showing a broadband signal processing included in the modification.

Reference will be made to FIGS. 42 and 43 for describing a modification of the signal processing 36 of the illustrative embodiment. In the modification, structural elements identical with the previously stated structural elements are designated by identical reference numerals and will not be described in order to avoid redundancy. As shown, the signal processing 36 includes a component-by-component generating section 364b, a pseudo-frequency addition 370c, a frequency overlap prevention (luminance process) 372c, a signal controller 374c and an RGB conversion 376c as well as the data correction 36a and virtual pixel interpolation 360b.

In the modification, the interpolation 36b includes the virtual pixel interpolation 360b and component-by-component generating section 364b. The interpolation 36b produces pixel data of primary colors from the image data of complementary colors 44 and effects classification on the basis of the fact that luminance data and chrominance data are produced from the above image data 44.

The component-by-component generating section 364b, which is one of characteristic features of the modification, will be described specifically hereinafter. This section 364b attached importance to faithful color reproduction and to resolution in the horizontal and/or vertical direction. For this purpose, the section 364b performs a particular operation with each signal component and each frequency band. For example, the section 364b includes a high-frequency component generation 3640, a low-frequency component generation 3642, and low-frequency chrominance component generations 3644 and 3646.

A component signal ($Y_L$) 74 attaching importance to color reproducibility is lower in frequency than a component signal ($Y_H$) 76 that attaches importance to resolution. Using, e.g., a $Y_h \cdot Y_{low}$ generating method, the component-by-component generation 364b produces data $Y_h$ and $Y_{low}$ from the raw pixel data 44 pixel by pixel. At the same time, the generation 364b shifts and rearranges the pixels in a square lattice pattern to thereby interpolate virtual pixels void of input data. Further, the generation 364b calculates chrominance signals (R–Y)$_H$ (78) and (B–Y)$_L$ (80) with the low-frequency component generations 3644 and 3646. The resulting data are input to the pseudo-frequency addition 370c as the above two component signals ($Y_H$, $Y_L$) and low-frequency chrominance signals (R–Y)$_L$ and (B–Y)$_L$. The operation of the generation 364b will be described more specifically later.

As shown in FIG. 43, the broadband signal processing 36c is made up of the pseudo-frequency addition 370c, frequency overlap prevention 372c, signal controller 374c, and RGB conversion 376c. The broadband signal processing 36c processes the luminance signal to thereby output luminance signals Y (76) and chrominance signals (R–Y)$_L$ (78) and (B–Y)$_L$ (80). Further, the processing 36c adjusts, e.g., the amplitude of the chrominance signals with the signal controller 374c and converts the adjusted signals to R, G and B data on the basis of the signal components input to the RGB conversion 376c. The configuration of the broadband signal processing 36c will be described more specifically hereinafter.

As shown in FIG. 44, the quasi-frequency addition 370c includes an adder 3700, an antialiasing filter circuit 3702, and an adder 3704. The component signals ($Y_H$) (76) and ($Y_L$) (74) output from the component-by-component generation 364b are respectively input to the "–" terminal and "+" terminal of the adder 3700. The adder 3700 adds the components signals ($Y_H$) and ($Y_L$) and feeds the resulting sum 74a to the antialiasing filter circuit 3702. Also fed to the antialiasing filter circuit 3702 are the high-frequency component signal ($Y_H$) (76) and the low-frequency chrominance signals (R–Y)$_L$ (78) and (B–Y)$_L$ (80) respectively output from the low-frequency chrominance signal generations 3644 and 3646.

The antialiasing filter circuit 3702 performs LPF processing with digital filters in order to free the component signals 74a and 76 through 80 from aliasing distortions. In addition, the circuit 3702 executes LPF processing even with the low-frequency chrominance signals (R–Y)$_L$ (78) and (B–Y)$_L$ (80) by using digital filters, thereby outputting chrominance signals (R–Y)$_L$ (82) and (B–Y)$_L$ (84). A high-frequency component signal ($Y_H$) 86 and a low-frequency component signal ($Y_L$) 88 subjected to the LPF processing are fed from the filter circuit 3702 to the adder 3704.

FIGS. 45A through 45C show frequency allocation particular to the pseudo-frequency addition 370c. As shown, the adder 3704 adds the output ($Y_L$–$Y_H$)low (74a) of the adder 3700 (FIG. 45A) and high-frequency component signal ($Y_H$) 86 (FIG. 45B) and outputs ($Y_L$–$Y_H$)$_{low}$+$Y_H$ (86a) (FIG. 45C). It is to be noted that the suffix "low" attached to ($Y_L$–$Y_H$) indicates that the signal has been passed through an LPF. The pseudo-frequency addition 370c adds the component signals ($Y_L$) 74 and ($Y_H$) 76 in terms of pseudo-frequency. This addition successfully broadens the frequency band of luminance signals. The component signals input to the pseudo-frequency addition 364b are distinguished from each other with respect to the horizontal and vertical directions of an image.

Figure 46:
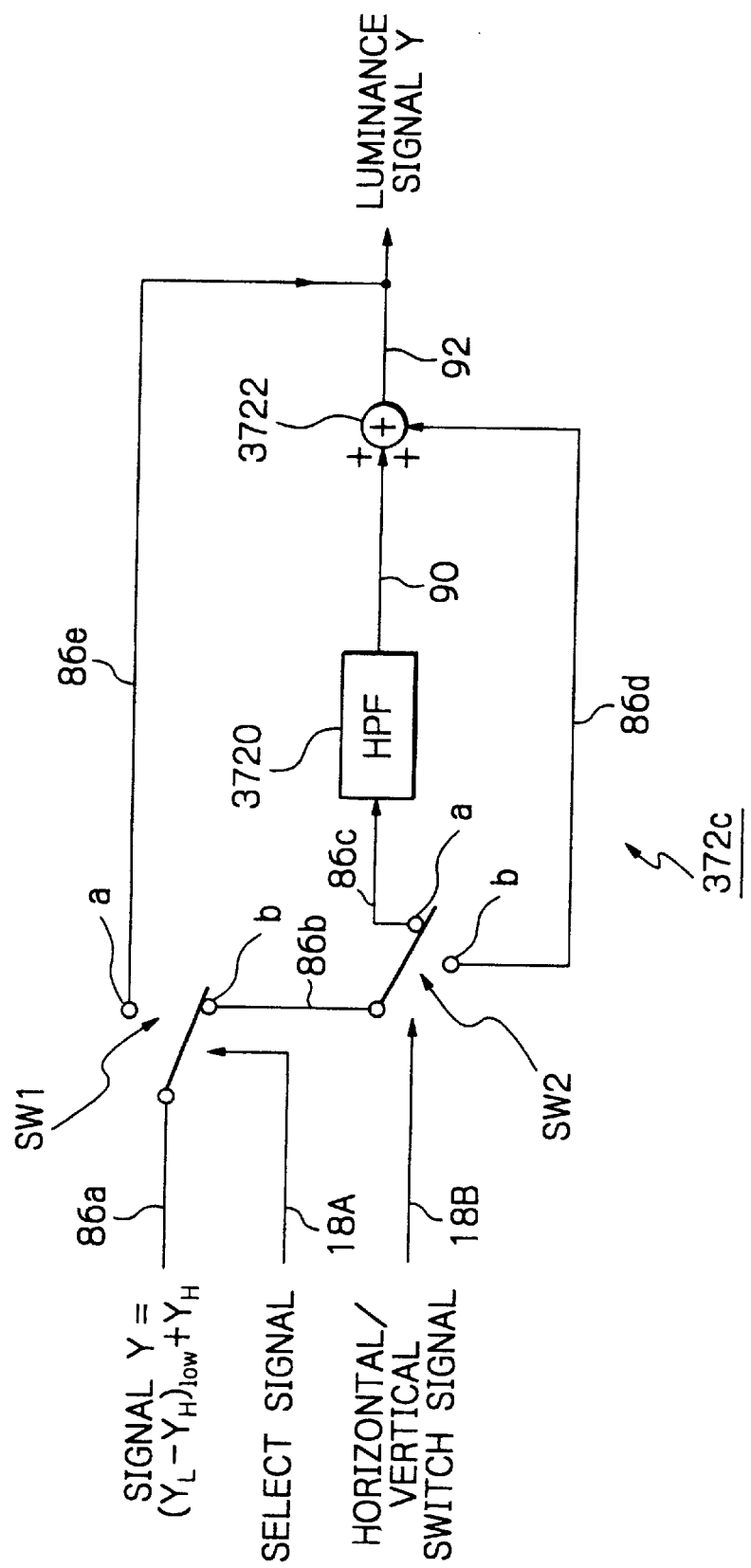
FIG. 46 is a schematic block diagram showing a frequency overlap prevention included in the broadband signal processing of FIG. 43.

As shown in FIG. 46 specifically, the frequency overlap prevention (luminance process) 372c includes a switch or selector SW1, a switch SW2, a high-pass filter (HPF) 3720, and an adder 3722. Assume that the component signals output from the component-by-component generation 364b and respectively attaching importance to resolution in the horizontal and vertical directions include the same frequency band. Then, the frequency overlap prevention 372c limits the common frequency band of one of the horizontal and vertical component signals in the luminance signal $(Y_L-Y_H)_{low}+Y_H$ (86a) and adds the limited component signal and the other component signal. This successfully avoids the overlap of the frequency bands included in both of the two component signals.

In the frequency overlap prevention 372c, the switch SW1 operates in accordance with whether the luminance signal $(Y_L-Y_H)_{low}+Y_H$ output from the pseudo-frequency addition 370c attaches importance to resolution in both directions or in one direction. If importance is attached to resolution in both directions, the switch SW1 delivers the luminance signal to the switch SW2 via its terminal b as a signal 86b. The switch SW2 selects either one of the signals respectively attaching importance to horizontal resolution and vertical resolution.

For example, the switch SW2 selects the signal attaching importance to vertical resolution and feeds it to the HPF 3720 via its terminal a as a signal 86c. The HPF 3720 filters out a frequency band included in, e.g., the signal attaching importance to vertical resolution and identical with a frequency band included in the signal 86d attaching importance to horizontal resolution. The adder 3722 adds the output 90 of the HPF 3720 and, e.g., the signal 86d attaching importance to horizontal resolution and received via the terminal b of the switch SW2.

The system controller 18 including a CPU delivers a select signal 18A to the switch SW1. When importance is attached only to horizontal resolution or vertical resolution, the select signal 18A causes the switch SW1 to select the other terminal a. As a result, the input luminance signal is output from the frequency overlap prevention 372c as a signal 86e, bypassing the HPF 3720 and adder 3722. The system controller 18 operates the switch SW2 by sending a horizontal/vertical switch signal 18B to the switch SW2.

With the above-described luminance process, the frequency overlap prevention 372c transforms the luminance signal $(Y_L-Y_H)_{low}+Y_H$ (86a) to a luminance signal (Y) 92 that will not bring about an error even when the horizontal and vertical signals are combined. The luminance signal (Y) 92 is input to the RGB conversion 376c.

The signal controller 374c, FIG. 43, includes gain controllers 3740 and 3742 to which the low-frequency chrominance signals $(R-Y)_L$ (78) and $(B-Y)_L$ (80) are respectively input. The gain controllers 3740 and 3742 each control the gain of the respective chrominance signal and feed the gain-controlled chrominance signal to the RGB conversion 376c. In response, the RGB conversion 376c outputs, based on the input signal 86e or 92, primary colors R, G and B having improved color reproducibility and resolution.

Figure 47:
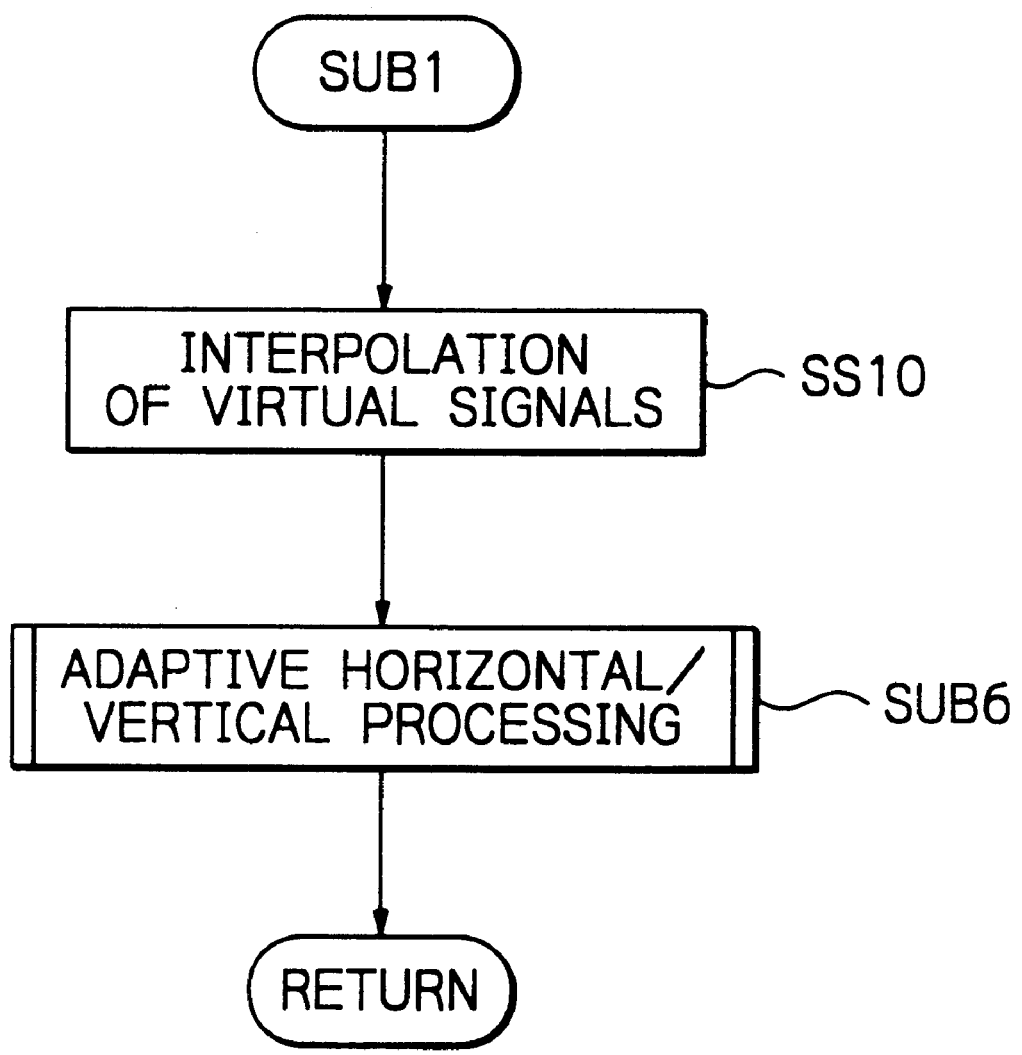
FIG. 47 is a flowchart demonstrating the generation of luminance data particular to the modification and executed by horizontal and vertical adaptive processing using the pixel data generated by the interpolation of virtual pixels in the subroutine SUB1.

A specific operation of the modification will be described with reference to FIGS. 47 and 48. In FIG. 47, a subroutine SUB6 taking account of importance attached to horizontal resolution and vertical resolution is applied to the subroutine SUB1, FIG. 16. As shown in FIG. 47, pixel data of primary colors are generated at the positions of virtual pixels (substep SS10), as stated earlier. The subroutine SUB6 is then executed with the above pixel data. At this stage of operation, the pixel data of the virtual pixels are arranged in a G square lattice, RB full-checker pattern.

Figures 48, 48A:
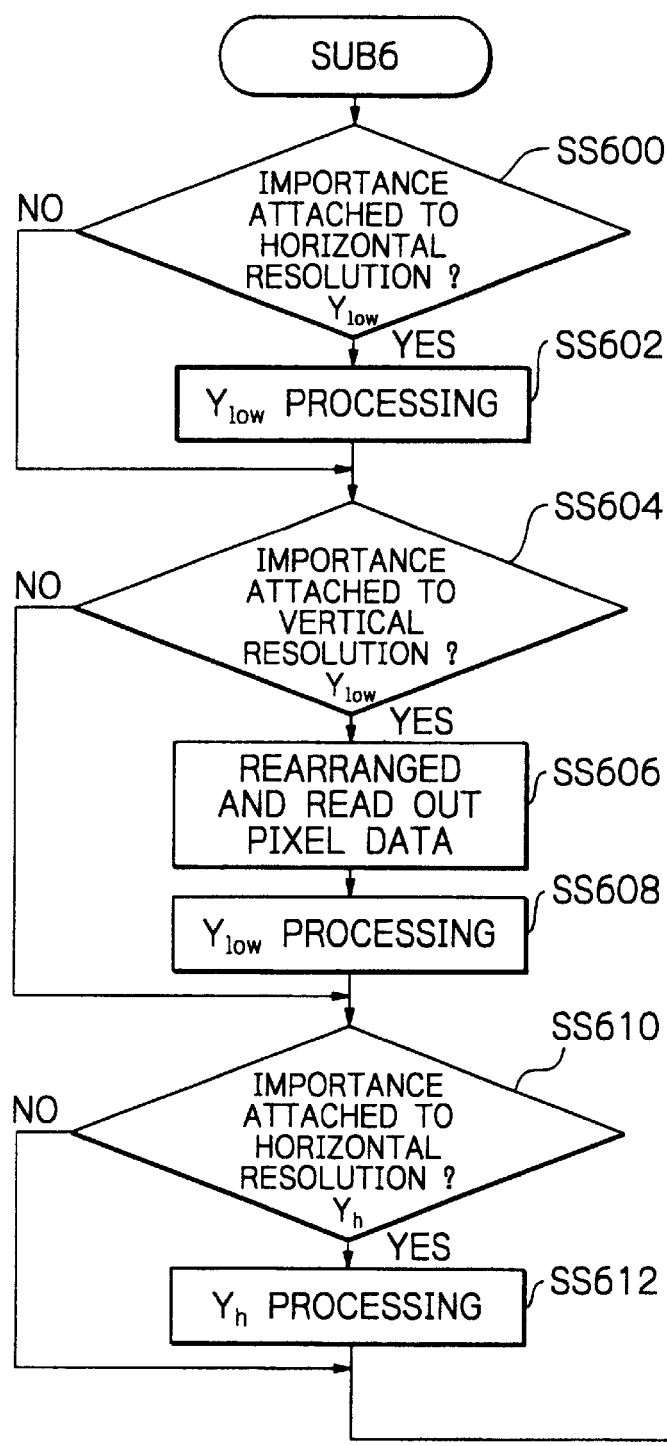
FIG. 48 shows how to combine FIGS. 48A and 48B.
FIG. 48A and 48B are, when combined as shown in FIG. 48, a flowchart showing a subroutine SUB6 of FIG. 47 specifically.

In the subroutine SUB6, FIG. 48, the $Y_h \cdot Y_{low}$ generating method is executed with the pixel data output by the substep SS10 in order to generate two different kinds of pixel data. One kind of pixel data are derived from the pixel data output from the low-frequency component generation 3642, FIG. 42, and relate to the generation of low-frequency component signals attaching importance to color reproducibility. This kind of pixel data are produced by $Y_{low}$ processing corresponding to the colors of the color filter segments. The other kind of pixel data relate to the generation of high-frequency component signals attaching importance to resolution and are produced by the high-frequency component generation 3640, FIG. 42, using $Y_h$ processing.

The subroutine SUB6 will be described with reference also made to FIGS. 49A through 49E. As shown, assume that pixels are bidimensionally arranged in a basic five-row four-column matrix. In FIG. 49A, letters R, G and B are representative of the colors of the filter segments constituting the color filter CF; suffixes each are representative of the position of the respective pixel with respect to the rows and columns of the matrix. Solid squares and phantom squares are respectively indicative of virtual pixels and actual photodiodes as in FIG. 26. The values $Y_h$ and $Y_{low}$ are calculated at each of the positions of the real pixels and virtual pixels (suffixes 10 through 53), i.e., at twenty positions in total. The calculation will be described specifically, taking some pixels as an example.

As shown in FIG. 48A, whether or not importance should be attached to horizontal resolution in $Y_{low}$ processing is determined (substep SS600). If the answer of the substep SS600 is YES, a substep SS602 is executed; if otherwise (NO, substep SS600), a substep SS604 is executed. FIG. 49B shows a three-row two-column area lowG3 indicated by a dash-and-dot line, a three-low two-column area lowRB3 indicated by a dash-and-dots line, and a five-row two-column area lowRB5 indicated by a dashed line. In the substep SS602, by using the pixel data lying in the areas lowG3 and lowRG3, $Y_{low}$ processing interpolates pixel data of primary colors at the positions of complementary color photodiodes between R and G or between G and G. Also, by using the pixel data of the virtual pixels lying in the area lowRB5, $Y_{low}$ processing calculates pixel data of color R or B at the positions of the complementary color photodiodes. As for G pixels, the existing pixel data are used. In this manner, $Y_{low}$ processing generates low-frequency component signals.

Let the positions of the photodiodes be referred to as virtual pixels for the sake of description. For example, a virtual pixel $Y_{low20}$ on the G row is produced on the basis of pixel data $R_{10}$, $G_{21}$ and $B_{30}$ by:

$$Y_{low20}=0.3*R_{10}+0.59*G_{21}+0.11*B_{30} \qquad (29)$$

Likewise, pixel data $Y_{low32}$ on the R or B row is produced by:

$$Y_{low32}=0.3*R_{32}+0.295*(G_{23}+G_{43})+0.055*(B_{12}+B_{52}) \qquad (30)$$

The pixel data produced by such a procedure are written to, e.g., a memory.

In the substep SS604, whether or not importance should be attached to vertical resolution in $Y_{low}$ processing is determined. If the answer of the substep SS604 is YES, a substep SS606 is executed; if otherwise (NO, substep SS604), a substep SS610 is executed. In the substep SS606, the pixel data of the basic matrix, FIG. 49A are read out in a rearranged condition (rearranged reading). For example, pixel data may be read out of pixel positions rotated by 90° from the positions of the basic matrix. The substep SS606 is followed by a substep SS608.

In the substep SS608, a relation between the pixel data identical with the relation of the substep SS602 is determined, and the same calculations as in the substep SS602 are effected. The resulting data are also stored together with their positions. When the pixel positions are rotated by 90°, as stated above, the calculated pixel data may be rotated in the reverse direction (−90°) to the original matrix positions and then written to the memory.

Figure 48B:
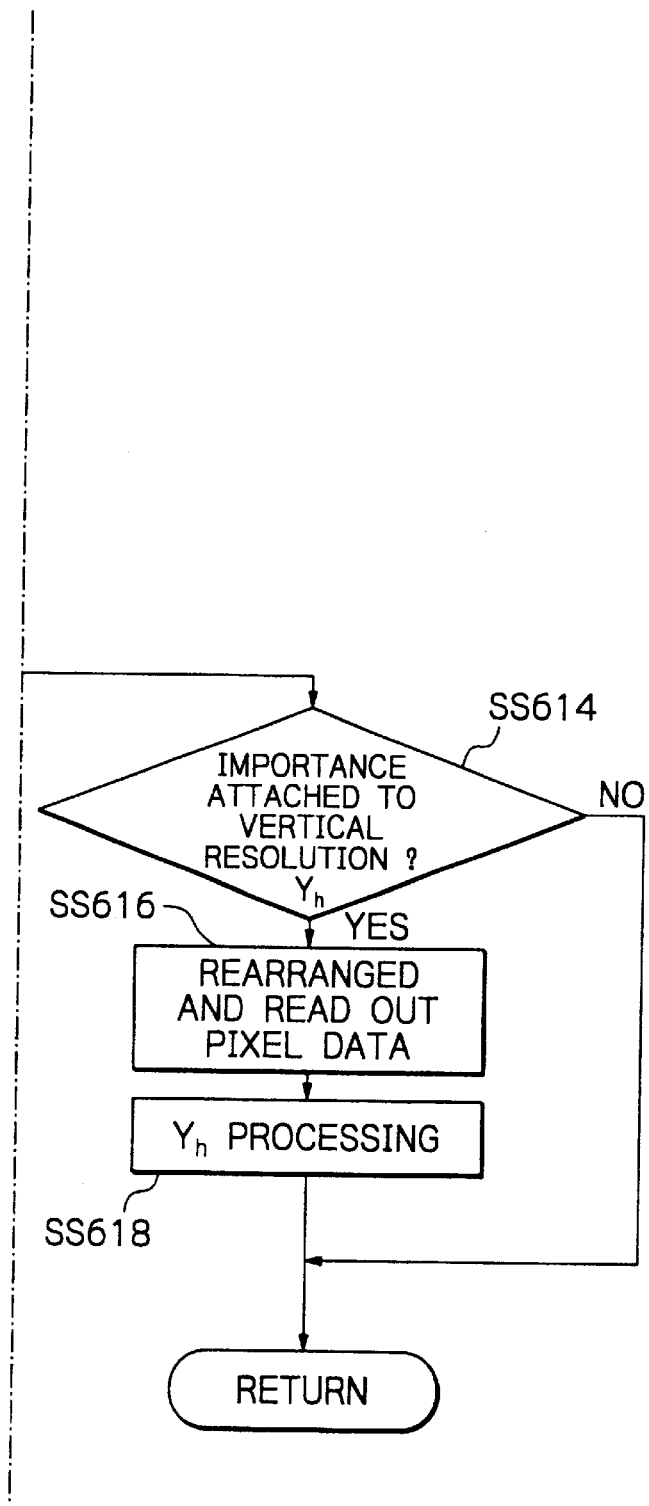

In the substep SS610, whether or not importance should be attached to horizontal resolution in $Y_h$ processing is determined. If the answer of the substep SS610 is YES, a substep SS612 is executed; if otherwise (NO, substep SS610) a substep SS614 (FIG. 48B) is executed.

FIG. 49C shows five-row one-column areas hRB5 indicated by a dash-and-dot lines and three-row one-column areas hG3 and hRB3 indicated by dashed lines. In the substep SS612, i.e., when importance is attached to horizontal resolution, pixel data lying in each area hRB5 are weighted to calculate pixel data located at the center of the area hRB5. Also, pixel data lying in each of the areas hG3 and hRB3 are processed to interpolate pixel data at the position of the center virtual pixel. As for color G, existing pixel data are used. In this manner, high-frequency components in the horizontal direction are generated. For example, to determine a solitary pixel $Y_{h30}$ by use of colors R and B, pixel data $Y_{h30}$ is produced from pixel data $R_{10}$, $B_{30}$ and $R_{50}$ on five lines in the vertical direction by:

$$Y_{h30}=0.5*B_{30}+0.25*(R_{10}+R_{50}) \quad (31)$$

Likewise, a virtual pixel $Y_{20}$ is produced from pixel data $R_{10}$ and $B_{30}$ on the R and B rows adjoining the pixel $Y_{20}$ by:

$$Y_{h20}=0.5*(R_{10}+R_{30}) \quad (32)$$

Further, a virtual pixel $Y_{31}$ is produced from pixel data $G_{21}$, and $G_{41}$ above and below the pixel $Y_{31}$ by:

$$Y_{h31}=0.5*(G_{21}+G_{41}) \quad (33)$$

As for pixel data in which color G is present alone, the existing data are used. For example, as for pixel data $Y_{21}$, $G_{21}$ is used. Such processing is repeated over the entire frame in order to produce pixel data and virtual pixel data. This is followed by a substep SS614.

In the substep SS614, whether or not importance should be attached to vertical resolution in $Y_h$ processing is determined. If the answer of the substep SS614 is YES, a substep SS616 is executed; if otherwise (NO, substep SS614), the operation returns.

In the substep SS616, the pixel data of the previously stated basic matrix are rearranged and then read out, as in the substep SS606. Again, the basic matrix may be rotated by 90°. This is followed by a step SS618. In the substep SS618, a relation between pixel positions identical with the relation of the substep SS612 is determined on the basis of the pixel data rotated in the substep SS618. Subsequently, the same calculations as in the substep SS612 are effected. Further, the resulting pixel data are rotated by 90° to the original arrangement and then written to the memory. Generally, to attach importance to horizontal or vertical resolution, positions or areas for reading out pixel data are rearranged, as shown in FIGS. 49D and 49E.

The flowchart has concentrated on calculations to be effected with a single basic matrix. As for the entire frame output from the image pickup 30, FIG. 1, the area of the basic matrix is shifted little by little in the horizontal and/or vertical direction while coincidence thereof with the previously stated areas is checked. For the peripheral portions of the frame, calculations may be effected by using a preselected boundary condition. After the substep SS618, the operation returns from the subroutine SUB6 to the main routine. In the subroutine SUB1, signal processing attaching importance to colors and black/white (luminance) in the horizontal and vertical directions is executed. As a result, component signals $Y_L$ and $Y_H$ respectively lying in the low-frequency and high-frequency bands in the horizontal and vertical directions are generated. Because the above processing interpolates the virtual pixels (positions of the photodiodes) at the same time, the pixel data are rearranged in a square lattice pattern and therefore constitute plane data.

Figure 50:
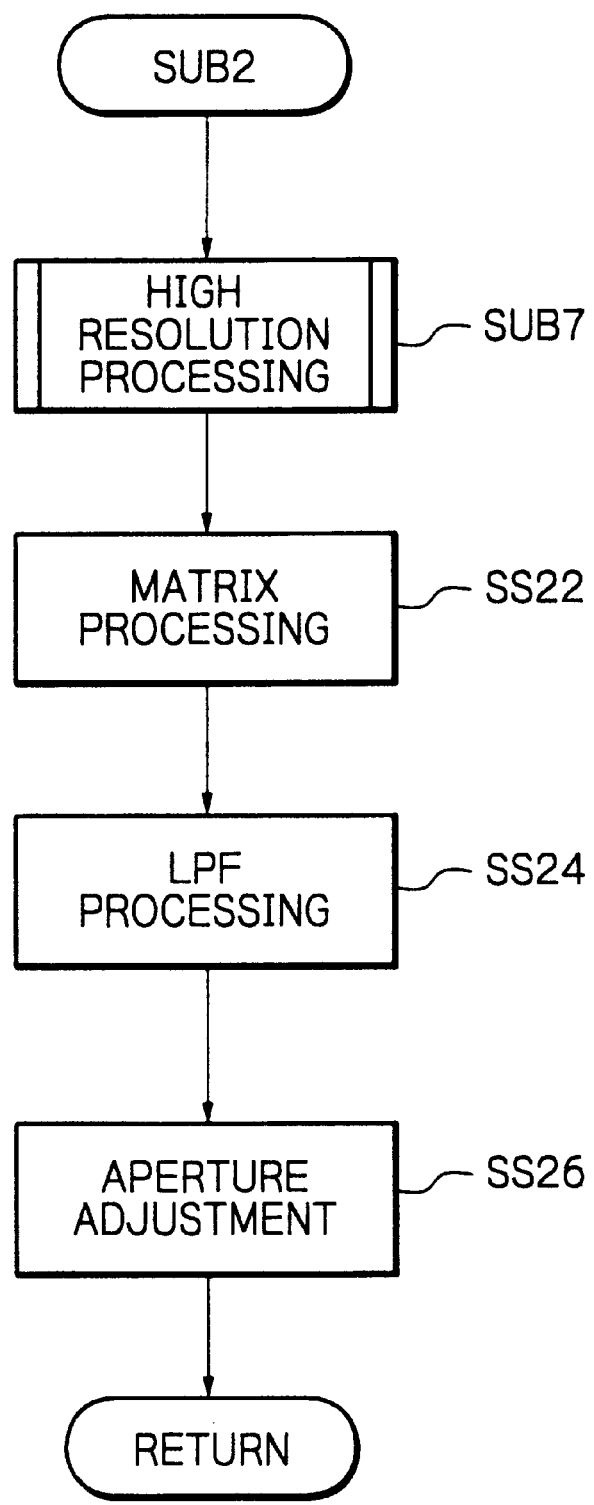
FIG. 50 is a flowchart showing the subroutine SUB2 particular to the modification.

FIG. 50 shows the subroutine SUB2 particular to this modification of the illustrative embodiment. As shown, the subroutine SUB2 begins with a subroutine SUB7 for enhancing the resolution of pixel data. The subroutine SUB7 is also followed by the substeps SS22 through SS26. To broaden the frequency band by using pixel data, i.e., to enhance resolution, the frequency band of the luminance signals are broadened in a subroutine SUB7 (see FIG. 51) on the basis of the low-frequency and high-frequency component signals 74 and 76 produced in the subroutine SUB6. The subroutine SUB7 includes a pseudo-addition step and a band overlap prevention step.

Figure 51:
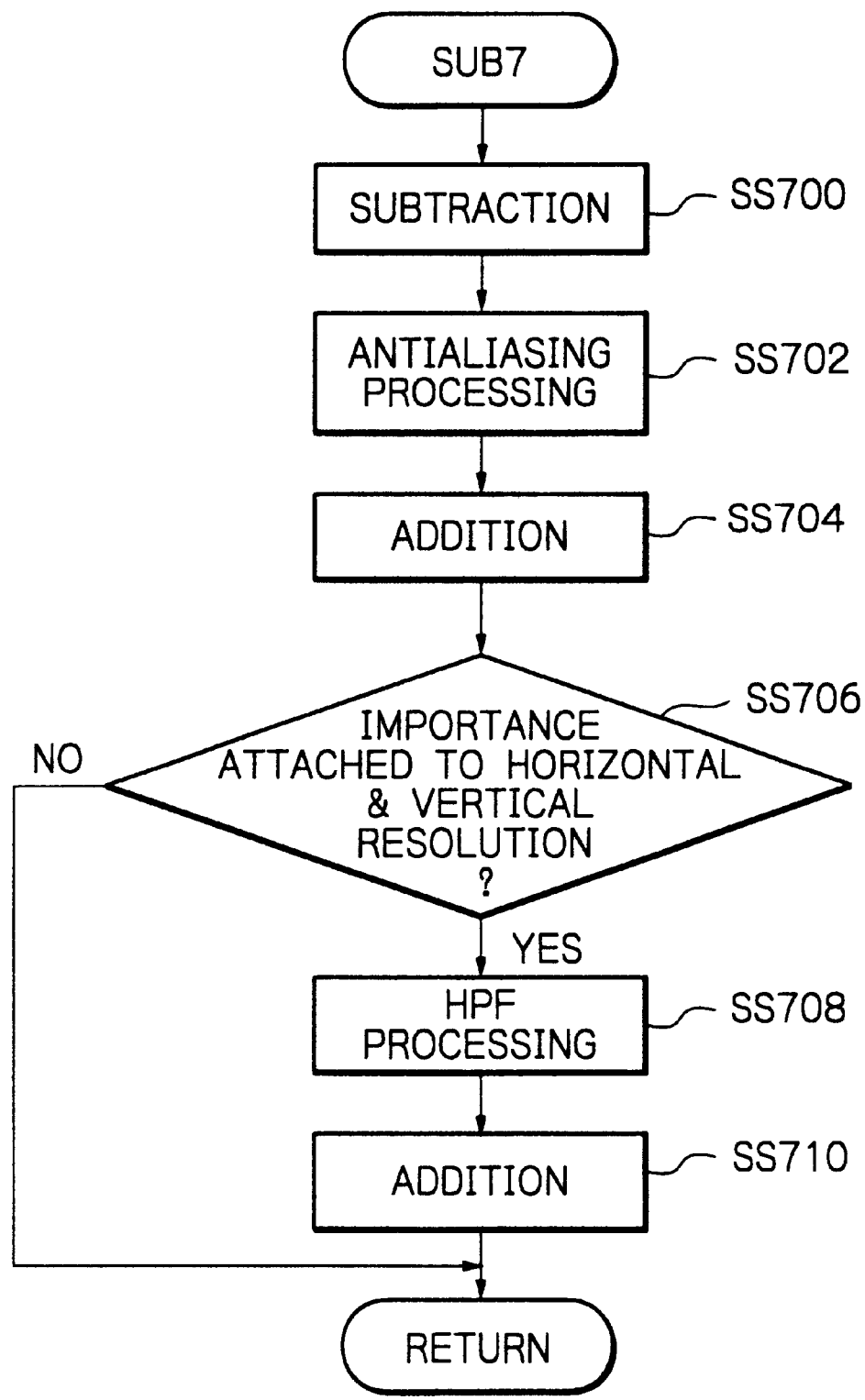
FIG. 51 is a flowchart representative of high frequency processing to be executed in a subroutine SUB7 of FIG. 50.

As shown in FIG. 51, the subroutine SUB7 begins with a substep SS700 for subtracting the high-frequency component signal $Y_H$ attaching importance to resolution from the low-frequency component signal $Y_L$, which has been produced in the subroutine SUB6, to thereby output $(Y_L-Y_H)_{low}$ (74a) (subtraction step). This subtraction step is assigned to the adder 3700, FIG. 44.

After the substep SS700, the antialiasing filter circuit 3702 frees the output $(Y_L-Y_H)_{low}$ of the adder 3700 (74a) and the high-frequency component signal $(Y_H)$ 76 from aliasing distortions (substep SS702; anti-distortion step). Further, the filter circuit 3702 processes the low-frequency chrominance signals $(R-Y)_L$ (78) and $(B-Y)_L$ (80) in the same manner as the above signals.

Subsequently, the output $(Y_L-Y_H)_{low}$ and high-frequency component signal $(Y_H)$ are added (substep SS704; second addition step). This is the pseudo-frequency addition. As a result, the frequency band of the luminance signal 86a $(Y=(Y_L-Y_H)_{low}+Y_H)$ is broadened, as indicated by the frequency allocation of FIG. 45. In this sense, the pseudo-addition step may be considered to correspond to the substeps SS700 through SS704.

After the substep SS704, whether or not the processing attaching importance to resolution has been executed in both of the horizontal and vertical directions is determined (subroutine SS706). If the answer of the step SS706 is YES, a substep SS708 is executed; if otherwise (NO, substep SS706), the operation returns. This selecting function is assigned to the switch or selector SW1.

Figure 52A:
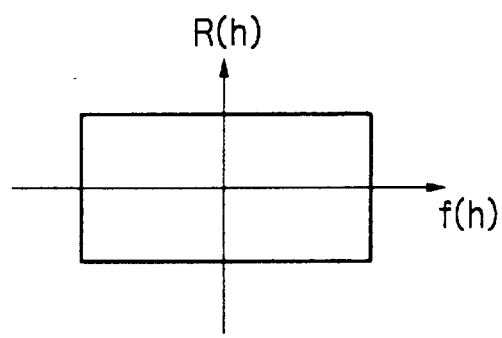
FIGS. 52A through 52D are views each showing a particular frequency distribution relating to frequency overlap prevention executed in the subroutine SUB7.
Figure 52B:
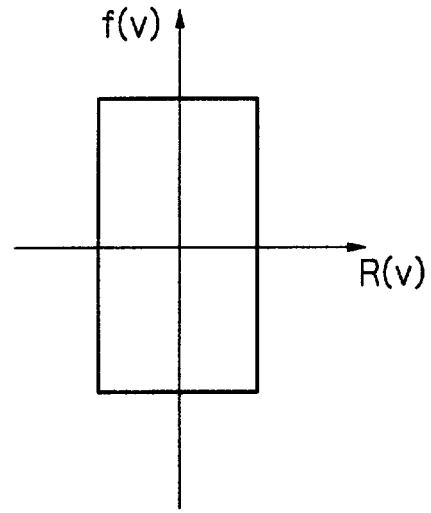
Figure 52C:
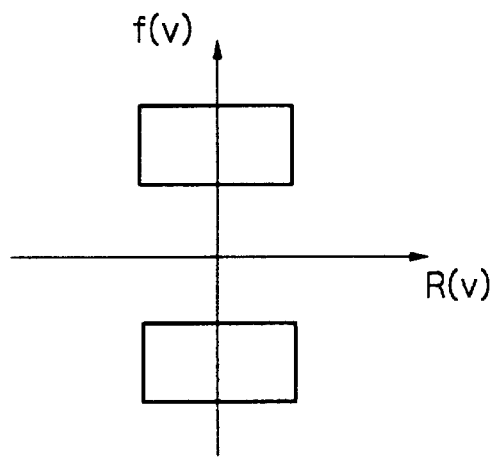

Assume that the signals produced in the subslep SS704 and attaching importance to both of horizontal resolution and vertical resolution include an identical frequency band. Then, in the step SS708, the identical frequency band of the signal attaching importance to vertical resolution is filtered out. For example, as shown in FIG. 46, when such band limitation is applied to the vertical high-frequency component signal, the switch SW2 switches the horizontal and vertical signals such that the vertical component signal is input to the HPF 3720. The HPF 3720 passes only the frequencies of the signal attaching importance to vertical resolution other than the frequency band identical with the frequency band of the other signal that attaches importance to horizontal resolution. FIGS. 52A and 52B respectively show specific signals attaching importance to horizontal resolution and vertical resolution. FIG. 52C shows a frequency distribution of the signal attaching importance to vertical resolution and passed through the HPF 3720. In FIGS. 52A through 52C, the abscissas indicate frequency axes f(h) and f(v) while the ordinates indicate response levels R(h) and R(v)

Figure 52D:
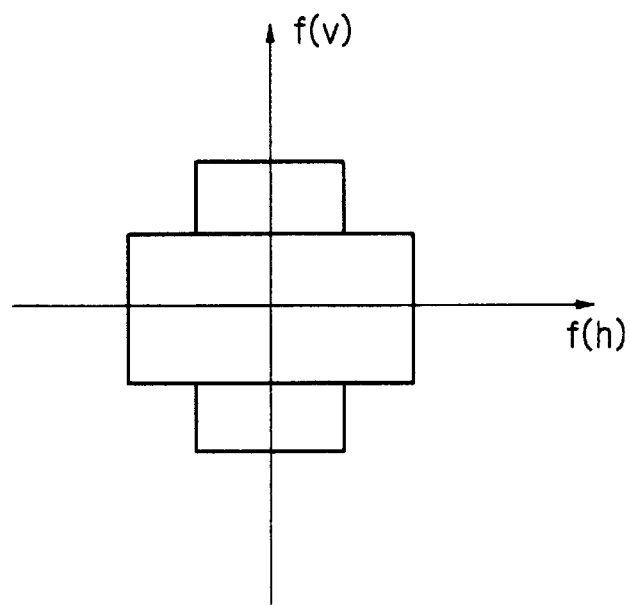

Subsequently, the output of the HPF 3720 (FIG. 52C) and the high-frequency signal of the other direction, i.e., horizontal direction (FIG. 52A) are added (substep SS710; addition step). This function is assigned to the adder 3722. FIG. 52D shows the frequency distribution of the resulting sum signal on the horizontal and vertical frequency axes ($f_h$, $f_v$). As FIG. 52 indicates, even when the horizontal and vertical image signals are superposed to broaden the frequency band, the resulting image is free from abnormality and achieves high resolution. After the substep SS710, the operation is returned to the main routine.

The band overlap prevention step described above corresponds to the substeps SS708 and SS710. The increase in the frequency band of pixel-by-pixel component signals can be checked on the basis of the horizontal and vertical frequency distributions. For comparison, FIGS. 53A, 53C, 53E and 53G each show a particular frequency distribution derived from a G square, RB full-checker filter pattern of single plate, pixel shift type in which R and B pixels are shifted from G pixels by half a pitch. FIGS. 53B, 53D, 53F and 53H show frequency distributions appearing when high-frequency component signals are produced from the frequency distributions of FIGS. 53A, 53D, 53F and 53H, respectively.

Figure 53A:
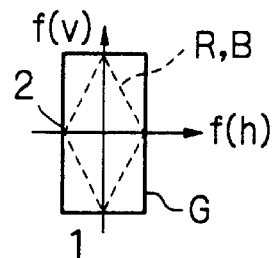
FIGS. 53A through 53H are views frequency distributions for comparing high-frequency component signals derived from a conventional square lattice arrangement and a G stripe, full-checker pattern with pixel shift in accordance with the present invention.
Figure 53B:
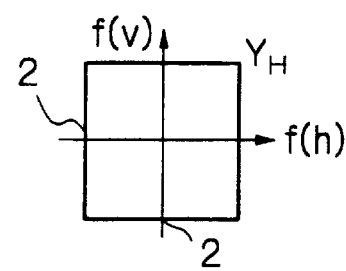
Figure 53C:
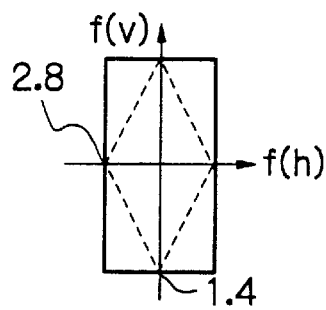
Figure 53D:
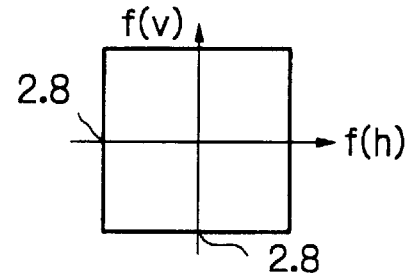

Specifically, assume that a G stripe, RB checker pattern is applied to conventional 1,500,000 photodiodes in a square lattice configuration (reference for comparison). Then, as shown in FIG. 53A, the R, G and B pattern is represented by a frequency distribution that is "2" on the horizontal frequency axis $f_h$ and "1" on the vertical frequency axis $f_v$. As shown in FIG. 53B, the frequency distribution of high-frequency component signals ($Y_H$) derived from the pattern of FIG. 52A is "2" on both of the horizontal frequency axis $f_h$ and vertical frequency axis $f_v$ and therefore square. FIG. 53C shows a frequency distribution occurring when the number of pixels is doubled to 3,000,000 pixels. As shown, the frequency distribution is $(2)^{1/2}$ times as great as the reference distribution of FIG. 53A, i.e., it is "1.4" on the horizontal frequency axis $f_h$ and "2.8" on the vertical frequency axis $f_v$. FIG. 53D shows the frequency distribution of high-frequency component signals derived from the pattern of FIG. 53C.

Figure 53E:
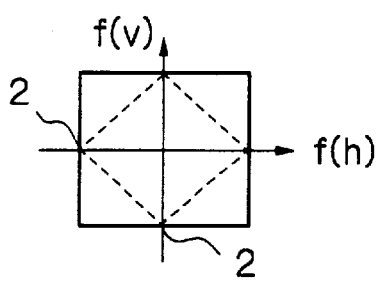
Figure 53F:
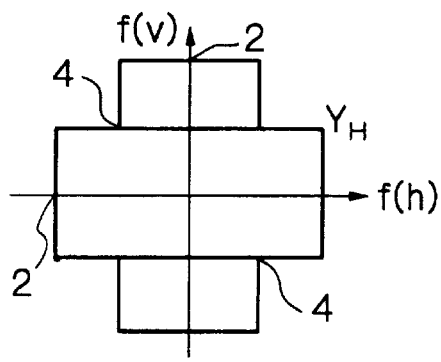
Figure 53G:
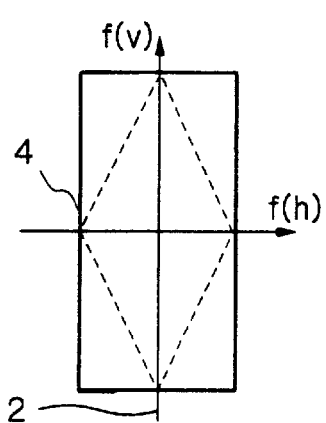
Figure 53H:
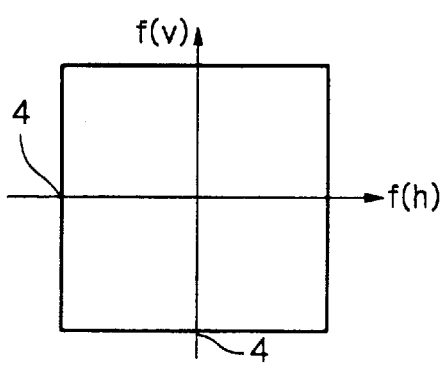

Further, assume that pixel data of primary colors for virtual pixels are produced from the photodiodes aligning with the filter segments of complementary colors that are shifted by half a pitch in both of the horizontal and vertical directions. Also, assume that the pixel data of primary colors are arranged in a G square, RB full-checker pattern of single plate, pixel shift type, and that the number of pixels is 3,000,000. Then, a frequency distribution shown in FIG. 53E occurs which is "2" on both of the horizontal frequency axis $f_h$ and vertical frequency axis $f_v$. As shown in FIG. 53F, the frequency distribution of high-frequency component signals ($Y_H$) derived from the pattern of FIG. 53E is "4" at points where the horizontal and vertical components intersect each other due to the pseudo-addition processing. Such a frequency characteristic corresponds to the frequency distribution of high-frequency component signals ($Y_H$) available when the number of pixels is increased to 6,000,000 and when the values on the horizontal frequency axis $f_h$ and vertical frequency axis $f_v$ are "4" and "2", respectively (see FIGS. 53G and 53H).

As stated above, the digital camera 10 uses color filters of complementary colors. Therefore, despite the limited number of pixels, the camera 10 outputs a high quality image by broadening the frequency band of component signals that are derived from pixel data of primary colors. These pixel data are based on the arrangement of pixels and raw pixel data output from the photodiodes.

The $Y_h \cdot Y_{low}$ generating method applied to the subroutine SUB6 is only illustrative and may be replaced with any other suitable method. For example, $Y_h$ pixel data attaching importance to horizontal resolution and vertical resolution may be directly implemented by generated pixel data corresponding to colors R and B. In such a case, pixel data for virtual pixels (positions of the photodiodes) will be interpolated by weighting pixel data on adjoining rows (above and below) or on adjoining columns (right and left). Specifically, in the basic pattern shown in FIG. 49, the pixel data of colors R and B are directly used while the virtual pixels are interpolated by pixel data above and below the virtual pixels. As a result, data $Y_h$ for the real and virtual pixels are expressed as:

$$Y_{h10} = R_{10},$$

$$Y_{h11} = 0.5*G_{21} + 0.5*G_{21}*Y_{h12},$$

$$Y_{h12} = B_{12},$$

$$Y_{h13} = 0.5*G_{23} + 0.5*G_{23},$$

$$Y_{h20} = 0.5*R_{10} + 0.5*B_{30},$$

$$Y_{h21} = G_{21},$$

$$Y_{h22} = 0.5*B_{12} + 0.5*R_{32},$$

$$Y_{h23} = G_{23}, \ldots \tag{34}$$

Assume that the pixel data of colors R and B are directly used, but the virtual pixels are interpolated by pixel data positioned at the right and left of the virtual pixels. Then, while the data $Y_{h10}$ through $Y_{h13}$, $Y_{h21}$ and $Y_{h23}$ are determined by the above calculations, the data $Y_{h20}$ and $Y_{h22}$ are produced by $Y_{h20} = 0.5*G_{21} + 0.5*G_{21}$ and $Y_{h22} = 0.5*G_{21} + 0.5*G_{23}$.

As for pixel data $Y_{h32}$ by way of example, only four pixel data $G_{21}$, $G_{23}$, $G_{41}$, and $G_{43}$ corresponding color filters G, which obliquely adjoin the pixel data $Y_{h32}$, are used to detect a correlation and produce correlation values $|G_{21} - G_{43}|$ and $|G_{23} - G_{41}|$. Subsequently, linear interpolation is effected by use of the pixel data whose correlation value is greater than the correlation value of the other pixel data. This procedure is repeated with other pixel data having the above positional relation.

Further, the pixel data $Y_h$ so determined is used for the calculation of another pixel. At this instant, a correlation is determined such that pixel data at the position of a virtual pixel surrounded by three pixel data including the initially interpolated pixel data is obtained. Interpolation is effected in accordance with the resulting correlation values. Such a sequence of steps is repeated until the pixel data $Y_h$ of real and virtual pixels have been calculated over the entire pattern.

If desired, linear interpolation may be replaced with the calculation of the weighted mean of four pixels data for pixel data located at the position of a virtual pixel surrounded by three pixel data that include the pixel data resulting from the initial linear interpolation.

The above-described procedure rearranges pixel data in a square lattice pattern while generating them. Alternatively, there may be executed steps of broadening the frequency band of only pixel data output from the photodiodes at the positions of virtual pixels, interpolating, based on the broadband pixel data, pixel data at the positions of the photodiodes where pixel data of primary colors are absent to thereby increase the number of pixel data, and rearranging the pixel data in a square lattice pattern.

Reference will be made to FIG. 54 for describing another modification of the signal processing 36 included in the illustrative embodiment. This modification also uses color filter segments arranged in the W square lattice, CyYe full-checker pattern. The image pickup 30 transforms signal charges output from the photodiodes PD to corresponding voltage signals 30a, as stated earlier. The signals 30a are converted to digital signals 34a and then input to the signal processing 36. In the signal processing 36, the interpolation 36b includes a plane interpolation and rearrangement circuit 366b in addition to the virtual pixel interpolation 360b. The broadband signal processing 36c includes a chrominance matrix 364c, a contour signal generation circuit 378c, and an adder 380c.

Figure 55:
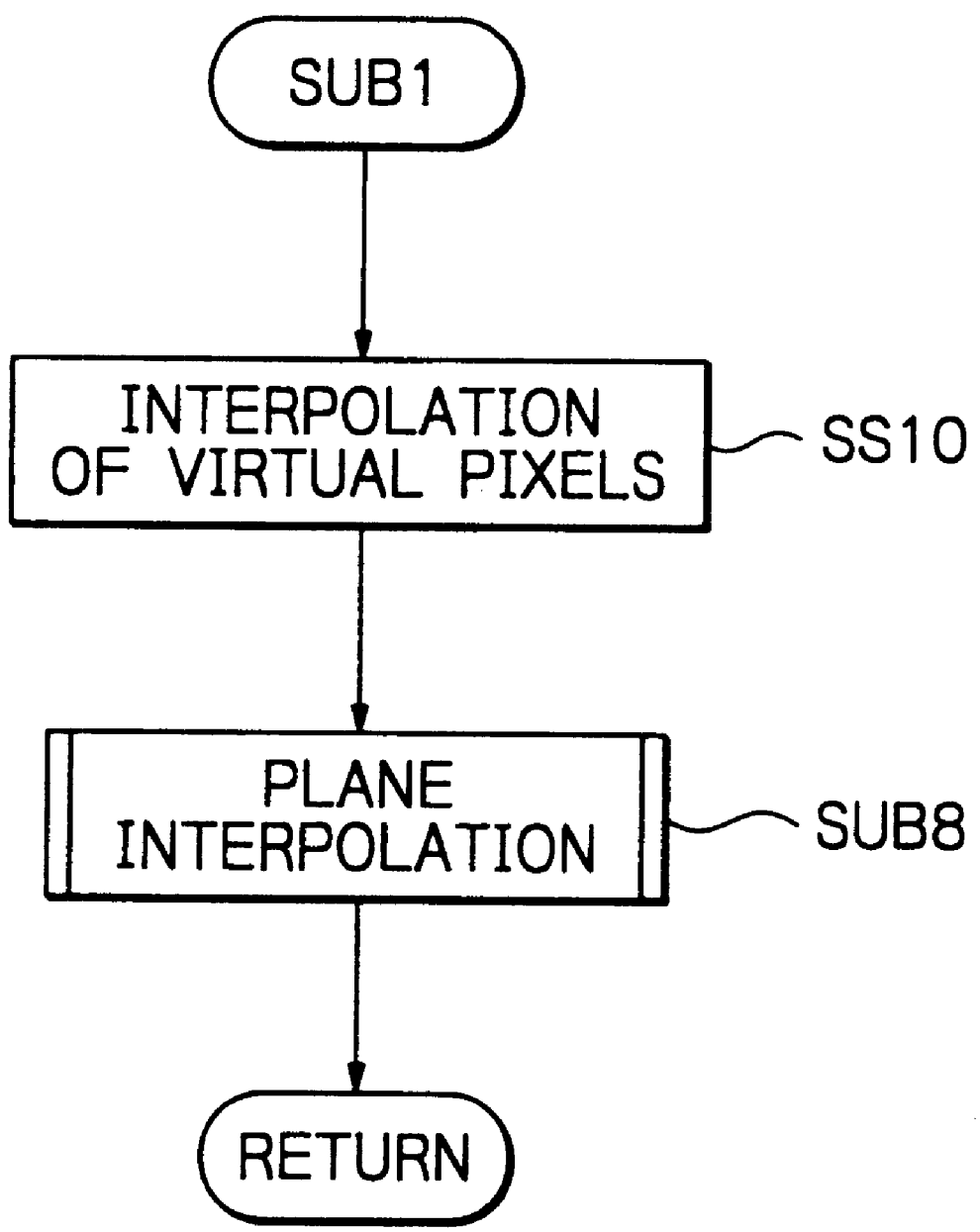
FIG. 55 is a flowchart demonstrating the generation of luminance data particular to the modification of FIG. 54 and executed with pixel data generated by the interpolation of virtual pixels in the subroutine SUB1.

Paying attention to each of three primary colors R, G and B, the plane interpolation and rearrangement circuit 366b generates plane data, which include pixel data of primary colors at the positions of the real photodiodes, while rearranging them into three component signals, giving consideration to color reproducibility as well. FIG. 55 shows the subroutine SUB1 including this function. The plane interpolation and rearrangement circuit 366b includes an R plane interpolation and rearrangement 3660, a G plane interpolation and rearrangement 3662, and a B plane interpolation and rearrangement 3664. Functions assigned to these sections 3660 through 3664 will be described later in relation to a subroutine SUB8 (see FIG. 56).

The chrominance matrix 364c generates chrominance signals and luminance signals on the basis of three component signals output from the plane interpolation and rearrangement circuit 366b.

The contour signal generation circuit 378c includes a contour enhancement data generation 3780 and a frequency overlap prevention 3782. The contour enhancement data generation 3780 detects a correlation by using pixel data of color G 94 fed from the G plane interpolation and rearrangement 3662, and then executes interpolation with the data having a greater correlation value. Of course, the generation 3780 interpolates even the positions of photodiodes where pixel data of primary colors are absent.

Figure 57:
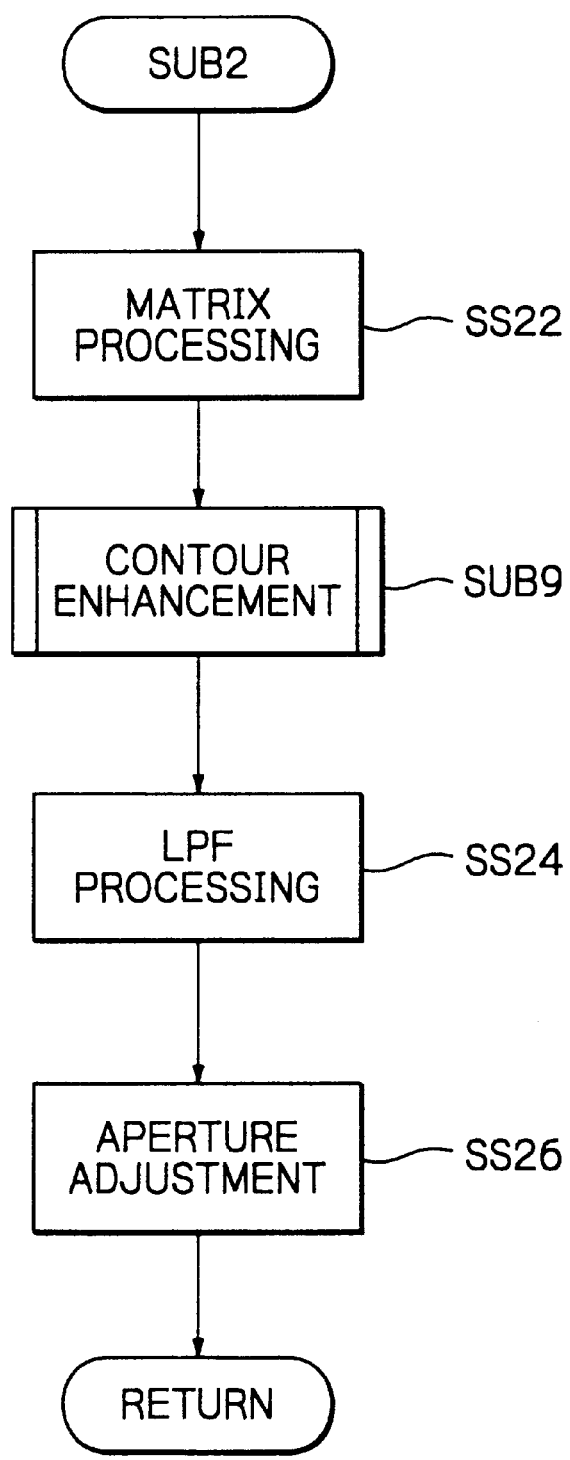
FIG. 57 is a flowchart showing the subroutine SBU2 particular to the modification of FIG. 54.

In the subroutine SUB2 shown in FIG. 57, a subroutine SUB9 executes contour enhancement including such interpolation. Pixel data output from the generation 3780 are fed to the frequency overlap prevention 3782. Assume that signals attaching importance to horizontal resolution and vertical resolution, respectively, include a common frequency band. Then, the frequency overlap prevention 3782 limits the common frequency band of either one of the above signals, as stated earlier. The resulting output 98 of the prevention 3782 is input to the adder 380c. The adder 380c adds the output 98 of the prevention 3782 and the output 100 of the chrominance matrix 364c in order to enhance the contour of the luminance signal Y.

If desired, the pixel data constituting the basis of the high-frequency component signal ($Y_H$), which attaches importance to resolution, may be produced from the pixel data to be fed to the plane interpolation and rearrangement circuit 366b. In this case, the contour enhancement data generation 3780 generates the high-frequency component signal ($Y_H$) by use of the above pixel data and, e.g., the $Y_h$ part of the $Y_h \cdot Y_{low}$ generating method. At this instant, the generation 3780 rearranges the data in a square lattice pattern and then feeds them to the frequency overlap prevention 3782. When signals input to the prevention 3782 and respectively attaching importance to horizontal resolution and vertical resolution include the same frequency band, the prevention 3782 limits the same frequency band of one signal, combines the limited signal and the other signal, and delivers the resulting signal to the adder 380c. The signal output from the prevention 3782 is identical with the high-frequency component signal ($Y_H$) of the previous modification.

The adder 380 adds the output of the contour signal generation circuit 378c and the luminance signal output from the chrominance matrix 364c, thereby enhancing the contour of the luminance signal.

A specific operation of the signal processing 36 shown in FIG. 54 will be described hereinafter. The signal processing 36 corrects pixel data output from the W square lattice, CyYe full-checker image pickup 30 and causes the virtual pixel interpolation 360b to generate pixel data of primary colors at the positions of virtual pixels by using the corrected pixel data, as in the illustrative embodiment and previous modification thereof. In this modification paying attention to each of three primary colors R, G and B, the plane interpolation circuit 366b interpolates pixel data of a color other than the color interpolated at the positions of virtual pixels and pixel data of three primary colors at the positions of photodiodes.

Specifically, for plane interpolation and rearrangement, the circuit 366b interpolates a row (horizontal) or a column (vertical) containing one of primary colors R, G and B, to which attention is paid in consideration of color reproducibility, by weighting and averaging pixel data. Also, the circuit 366b interpolates a row or a column containing a color different form the subject color by averaging pixel data on the adjoining row r the adjoining column.

Figure 56:
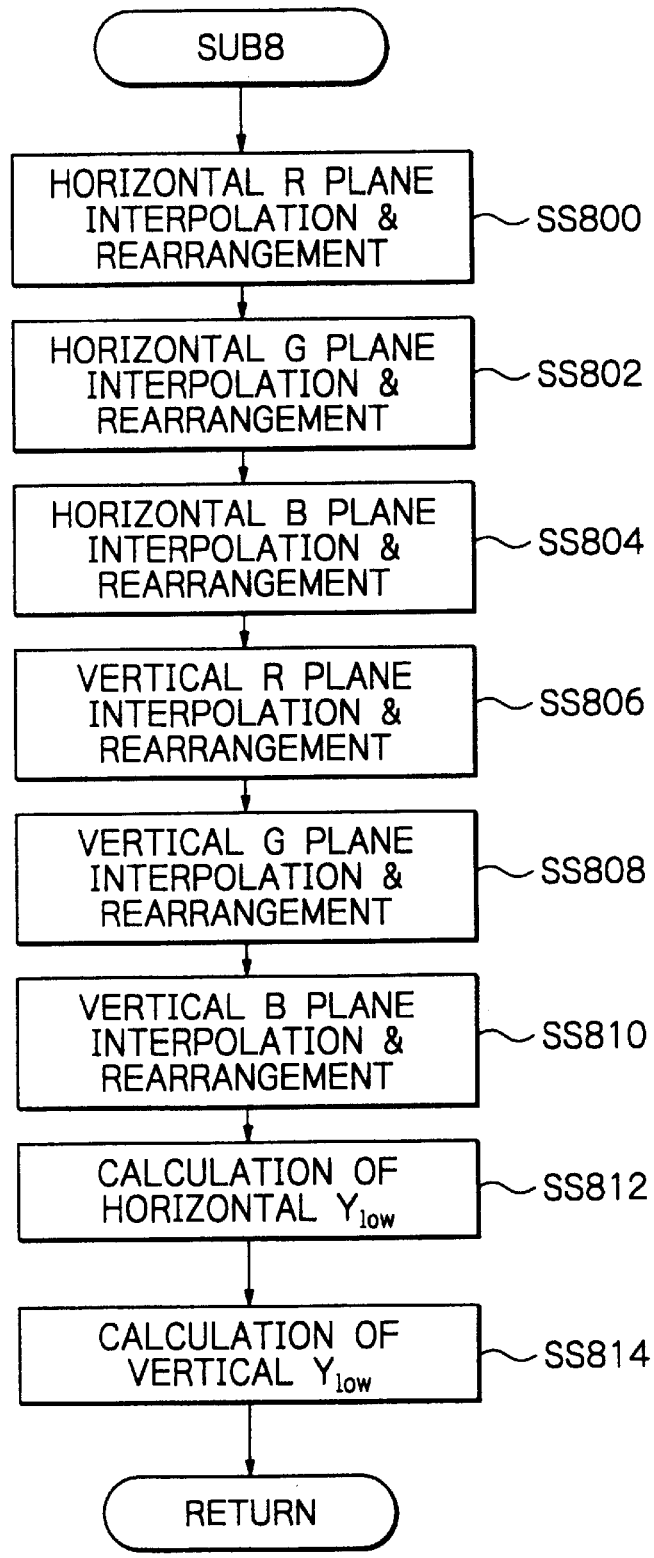
FIG. 56 is a flowchart showing a subroutine SUB8 of FIG. 55 specifically.

As shown in FIG. 56, the subroutine SUB8 for the plane interpolation and rearrangement begins with a substep SS800. In the substep SS800, horizontal interpolation and rearrangement are effected in an R plane. Specifically, pixel data on a row containing color R are weighted and averaged for interpolation. As for a row containing a color other than R, pixel data on a row adjoining such a row are averaged for interpolation. More specifically, assuming the five-row five-column arrangement of colors $R_{10}$ through $R_{54}$ shown in FIG. 26, the R plane interpolation and rearrangement 3660 performs the following exemplary calculations:

$$R_{low10H} = R_{10},$$

$$R_{low11H} = (3*R_{10} + R_{14})/4,$$

$$R_{low12H} = (2*R_{10} + 2*R_{14})/4$$

$$R_{low13H} = (R_{10} + 3*R_{14})/4$$

$$R_{low14H} = R_{14}, \ldots \tag{35}$$

After the substep SS800, horizontal interpolation and rearrangement are effected in a G plane (substep SS802). Specifically, pixel data on a row containing color G are weighted and averaged for interpolation. As for a row containing a color other than G, pixel data on a row adjoining such a row are averaged for interpolation. More specifically, assuming the basic arrangement of FIG. 26, the G plane interpolation and rearrangement 3662 performs the following exemplary calculations:

$$G_{low10H}=G_{21}/3,$$
$$G_{low11H}=G_{21}/2,$$
$$G_{low12H}=(G_{21}+G_{23})/4,$$
$$G_{low13H}=G_{23}/2,$$
$$G_{low14H}=G_{23}/3,$$
$$G_{low20H}=G_{21}/2,$$
$$G_{low21H}=G_{21},$$
$$G_{low22H}=(G_{21}+G_{23})/2,$$
$$G_{low23H}=G_{23},$$
$$G_{low24H}=G_{23}/3,\ldots \quad (36)$$

Subsequently, horizontal interpolation and rearrangement are effected in a B plane (substep SS804). Specifically, pixel data on a row containing color B are weighted and averaged for interpolation. As for a row containing a color other than B, pixel data on a row adjoining such a row are averaged for interpolation. More specifically, assuming the basic arrangement of FIG. 26, the B plane interpolation and rearrangement 3664 performs the following exemplary calculations:

$$B_{low10H}=B_{12}/3,$$
$$B_{low11H}=B_{12}/2,$$
$$B_{low12H}=B_{12},$$
$$B_{low13H}=B_{12}/2,$$
$$B_{low14H}=B_{12}/3,$$
$$B_{low20H}=(3*B_{30}+B_{12})/4,$$
$$B_{low21H}=(3*B_{30}+2*B_{12})/4,$$
$$B_{low22H}=B_{12}/2,$$
$$B_{low23H}=(2*B_{12}+3*B_{34})/4,$$
$$B_{low24H}=2*B_{12}/3,\ldots \quad (37)$$

The substep SS804 is followed by a substep SS806 and successive substeps for effecting plane interpolation and rearrangement in the vertical direction. Specifically, the plane interpolation circuit 366b interpolates a column containing the subject color R, G or B by weighting and averaging pixel data, while interpolating a column containing any other color by weighting and averaging pixel data on the adjoining column. In the substep SS806, the circuit 366b interpolates a column containing color R by weighting and averaging pixel data on that column, and interpolates a column not containing color R by averaging pixel data on the adjoining column. More specifically, again assuming the basic arrangement of FIG. 26, the R plane interpolation and rearrangement 3660 performs the following exemplary calculations:

$$R_{low10V}=R_{10},$$
$$R_{low20V}=(3*R_{10}+R_{50})/4,$$
$$R_{low30V}=(2*R_{10}+2*R_{50})/4,$$
$$R_{low40V}=(R_{10}+3*R_{50})/4,$$
$$R_{low50V}=R_{50},\ldots \quad (38)$$

After the substep SS806, vertical interpolation and rearrangement are effected in the G plane (substep SS808). Specifically, pixel data on a column containing color G are weighted and averaged for interpolation. As for a column containing a color other than G, pixel data on a column adjoining such a row are averaged for interpolation. More specifically, assuming the basic arrangement of FIG. 26, the G plane interpolation and rearrangement 3662 performs the following exemplary calculations:

$$G_{low10V}=G_{21}/3,$$
$$G_{low20V}=G_{21}/2,$$
$$G_{low30V}=(G_{21}+G_{41})/4,$$
$$G_{low40V}=G_{41}/2,$$
$$G_{low50V}=G_{51}/3,$$
$$G_{low11V}=G_{21}/2,$$
$$G_{low21V}=G_{21},$$
$$G_{low31V}=(G_{21}+G_{41})/2,$$
$$G_{low41V}=G_{41},$$
$$G_{low51V}=G_{41}/3,\ldots \quad (39)$$

Subsequently, vertical interpolation and rearrangement are effected in the B plane (substep SS810). Specifically, pixel data on a column containing color B are weighted and averaged for interpolation. As for a column containing a color other than B, pixel data on a column adjoining such a column are averaged for interpolation. More specifically, assuming the basic arrangement of FIG. 26, the B plane interpolation and rearrangement 3664 performs the following exemplary calculations:

$$B_{low10V}=B_{30}/3$$
$$B_{low20V}=B_{30}/2,$$
$$B_{low30V}=B_{30},$$
$$B_{low40V}=B_{30}/2,$$
$$B_{low50V}=B_{30}/3,$$
$$B_{low11V}=(3*B_{21}+B_{30})/4,$$
$$B_{low21V}=(3*B_{12}+3*B_{30})/4,$$
$$B_{low31V}=B_{30}/2,$$
$$B_{low41V}=(3*B_{30}+3*B_{52})/4,$$
$$G_{low51V}=G_{52}/2,\ldots \quad (40)$$

In a substep SS812 following the substep 810, the plane interpolation circuit 366b generates data constituting a horizontal luminance signal ($Y_{LH}$) attaching importance to faithful color reproduction. Specifically, the luminance signal ($Y_{LH}$), i.e., $Y_{low}$ is produced from $R_{low}$, $G_{low}$ and $B_{low}$ determined at each position by:

$$Y_{low}=0.3*R_{low}+0.5*G_{low}+0.11*B_{low} \quad (41)$$

For the above calculation, use is made of R, G and B interpolated in the respective planes in the consecutive substeps SS800 through SS804.

Subsequently, by using the equation (41), the plane interpolation circuit 366b generates a vertical luminance signal ($Y_{Lv}$) attaching importance to faithful color reproduction (substep SS814). For this purpose, use is made of R, G and B interpolated in the respective planes in the substeps SS806 through SS810. The data so calculated are delivered to the chrominance matrix 364c. After the substep SS814, the operation returns.

By the above procedure, not only R, G and B pixel data are interpolated and rearranged in the respective planes, but also data at the positions of virtual pixels between adjoining R, G and B are calculated. In this manner, the subroutine SUB8 executes plane interpolation and rearrangement of each of colors R, G and B, calculates a $Y_{low}$ value for each of rearranged positions, and outputs a signal corresponding to the $Y_{low}$ value. While the subroutine SUB8 directly executes plane interpolation and rearrangement in the horizontal and vertical directions, a decision step for determining whether or not to execute the calculations for plane interpolation and rearrangement may precede each of the substeps SS800 and SS806.

Figure 58:
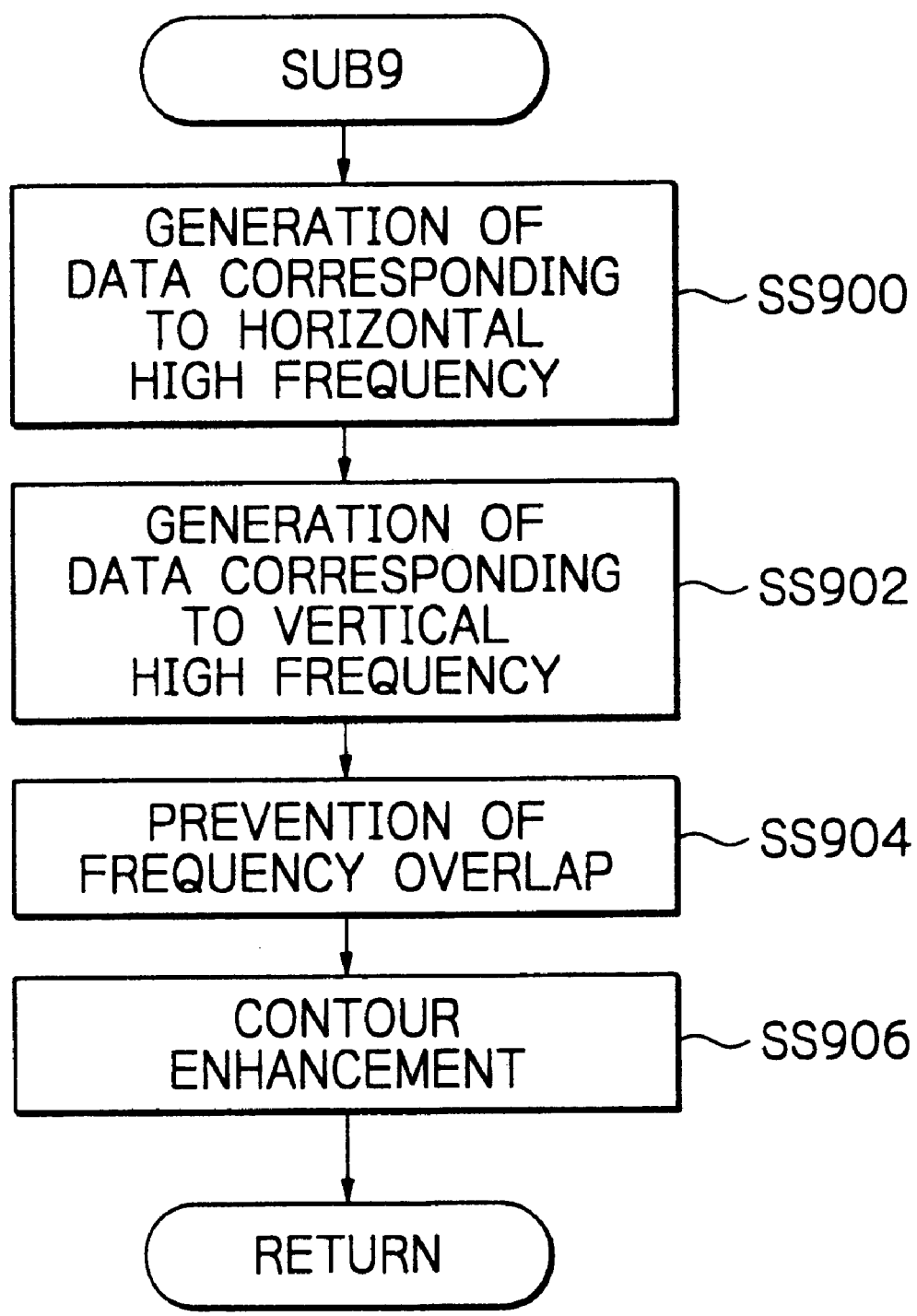
FIG. 58 is a flowchart showing a subroutine SUB9 of FIG. 57 specifically.

FIG. 57 shows the subroutine SUB2 particular to this modification and executed with the above-described pixel data and signals for broadening the frequency band of luminance data. As show, a subroutine SUB9 for contour enhancement is executed after, e.g., the matrix processing (substep SS22). The subroutine SUB9 generates high-frequency component signals ($Y_H$) in the horizontal and/or vertical directions in accordance with a procedure shown in FIG. 58 specifically. This function is assigned to the contour signal generation circuit 378c. As shown, the subroutine SUB9 begins with a substep SS900.

In the substep SS900, pixel data for horizontal high frequency components are generated by use of the G plane data. For this purpose, only the $Y_h$ part of the $Y_h \cdot Y_{low}$ generating method described in relation to the subroutine SUB1 may be used, if desired. Pixel data for contour enhancement can be generated by a method different from the previously stated method. The alternative method will be briefly described hereinafter.

Figure 59:
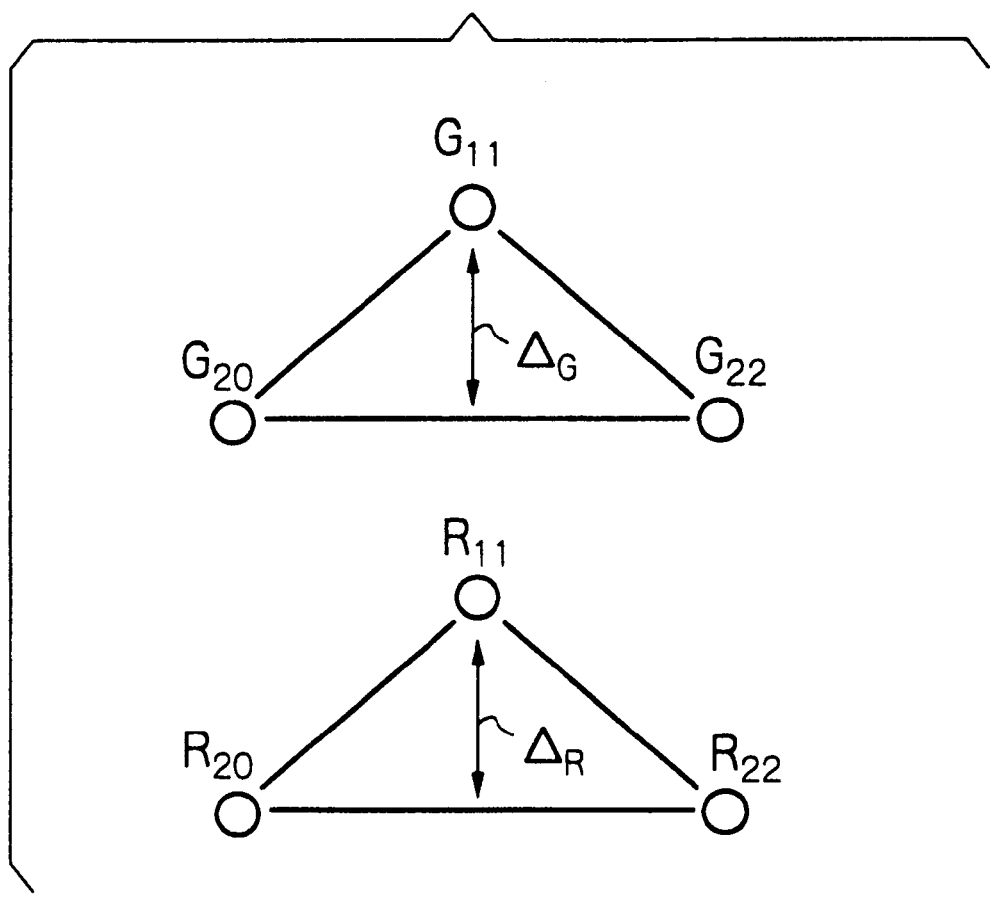
FIG. 59 is a schematic view showing the principle of calculation of pixel data executed by correlation processing included in the subroutine SUB9.

The Variation of the level of a G signal has noticeable influence on the variation of the luminance of a video signal, as well known in the art. The alternative method is based on the fact that such the rearrangement of the other colors R and B reflect the above influence. The principle of the method will be described specifically with reference to FIG. 59; FIG. 59 does not directly correspond to FIG. 26. As shown, to obtain unknown pixel data $R_{11}$ by way of example, known signal levels $G_{20}$, $G_{11}$, $G_{22}$, $R_{20}$ and $R_{22}$ are used. For interpolation, a weighted mean $\Delta_G$ of $G_{20}$ and $G_{22}$ and a weighted mean $\Delta_R$ of $R_{20}$ and $R_{22}$ are assumed to be equal to each other ($\Delta_G = \Delta_R$). This relation allows the unknown pixel data $R_{11}$ to be easily calculated because weighting coefficients for producing weighted means are also known. Such a procedure may be repeated to effect R plane interpolation and rearrangement. This also applies to the interpolation of B signals.

After the substep SS900, pixel data for vertical high frequency components are generated on the basis of the G plane data and the above-described relation (substep SS902). Subsequently, to prevent the frequency bands of the horizontal and vertical signals produced by substeps SS900 and SS902 from overlapping each other, the frequency band of one of the two signals is limited (substep SS904). The limited signal and the other signal are combined and then fed to the adder 380c.

The substep SS904 is followed by a substep SS906 in which the adder 380c executes contour enhancement. The luminance signal Y (100) output from the chrominance matrix 364c is applied to one input of the adder 380c. Applied to the other input of the adder 380c is the high-frequency component signal (98) output from the contour signal generation 378c and attaching importance to horizontal resolution and/or vertical resolution. As a result, a luminance signal 102 with an enhanced contour is output from the adder 380c. In this manner, for contour enhancement, high frequency component signals are added to the luminance signals rearranged in color-by-color planes and subjected to the chrominance matrix processing. After the substep SS906, the operation returns. Such a procedure is also successful to enhance the quality of image signals.

Figure 60:
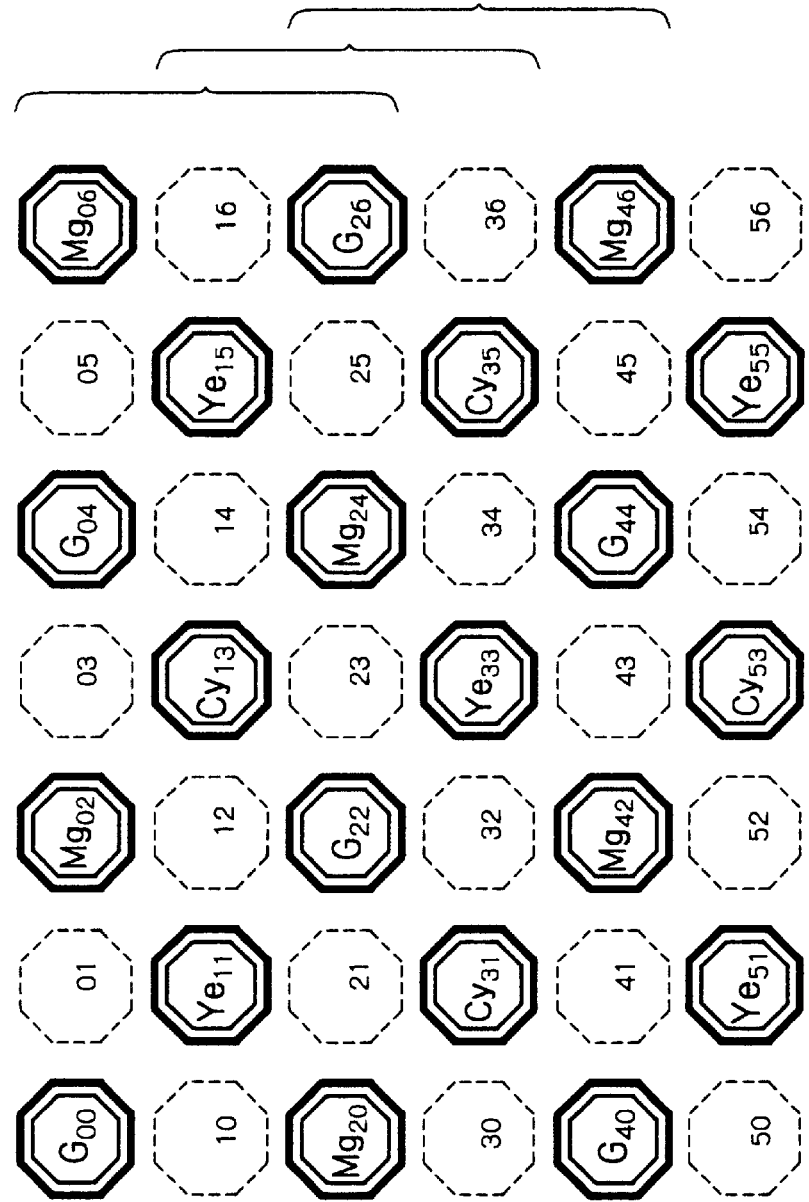
FIG. 60 is a schematic view showing a four-color full checker pattern applied to the image pickup and the read-out of signals.

Assume that the signal processing 36 has the configuration described with reference to FIGS. 42 and 43 (first modification), and that the color filter segments preceding the image pickup 30 are arranged in a four-color full-checker pattern. Then, as shown in FIG. 60 specifically, the image pickup 30 reads signal charges out of three lines at a time with or without line-by-line shift. For the read-out with line-by-line shift, use may be made of MOS type of shooting. When it is desired to read out signal charges without line-by-line shift and to feed signal with line-by-line shift, the signals may be once written to a nondestructive buffer memory and then read out of the memory in accordance with the line-by-line shift. In this manner, the signal processing 36 interpolates virtual pixels with each three lines of pixel data in place of the previously stated two lines of data. The component-by-component generation 364b and broadband signal processing 36c implement band-by-band data generating means and band broadening means, respectively.

The operation of the above-described signal processing 36 will be described hereinafter. The corrected pixel data are input to the virtual pixel interpolation 360b. While the interpolation 360b basically operates in the same manner as in the previous modification (see FIGS. 47 and 50), it uses different equations for producing pixel data of primary colors from pixel data of complementary colors. Specifically, by using pixel data of three complementary colors Mg, Cy and Ye and pixel data of primary color G, pixel data of three primary colors are generated by:

$$R = 0.95Mg + 1.37Ye - 0.43G - 0.85Cy \quad (42a)$$

$$G = -0.15Mg + 0.48Ye + 0.68G + 0.05Cy \quad (42b)$$

$$B = 1.00Mg - 0.90Ye - 0.50G + 1.40Cy \quad (42c)$$

For the virtual pixel 12, for example, four photodiodes $Mg_{02}$, $Ye_{11}$, $Cy_{13}$ and $G_{22}$ adjoining the virtual pixel 12 are used. Three primary colors R, G and B for the virtual pixel 12 are produced by:

$$R_{12} = 0.95Mg_{02} + 1.37Ye_{11} - 0.43G_{13} - 0.85Cy_{22} \quad (43a)$$

$$G_{12} = -0.15Mg_{02} + 0.48Ye_{11} + 0.68G_{13} + 0.05Cy_{22} \quad (43b)$$

$$B_{12} = 1.00Mg_{02} - 0.90Ye_{11} - 0.50G_{13} + 1.40Cy_{22} \quad (43c)$$

For the virtual pixel 23 on the next line, the primary colors R, G and B are produced by:

$$R_{23} = 0.95Mg_{24} + 1.37Ye_{33} - 0.43G_{22} - 0.85Cy_{13} \quad (44a)$$

$$G_{23} = -0.15Mg_{24} + 0.48Ye_{33} + 0.68G_{22} + 0.05Cy_{13} \quad (44b)$$

$$B_{23} = 1.00Mg_{24} - 0.90Ye_{33} - 0.50G_{22} + 1.40Cy_{13} \quad (44c)$$

In this manner, while three lines of pixel data of complementary and primary colors are fed, four pixels around a virtual pixel are used to generate pixel data of primary colors for the virtual pixel. Although the pixel data of primary colors R, G and B are generated in a zigzag pattern, this does not matter at all because the broadband signal processing 36c executes LPF processing with the low frequency, color and luminance components.

The subroutine SUB6, FIG. 48, will be briefly described hereinafter. As for the low frequency, luminance and chrominance components in the substeps SS602 and SS608, the G square, CyYe full-checker pattern of generated data is taken into account. Luminance data $Y_{low}$ are produced from pixel data obtained at positions corresponding to the above pattern. In the substeps S612 and SS618, high frequency components are generated by:

$$Y_h = 2*G + Mg = 2*G + R + B \tag{45}$$

Figure 61:
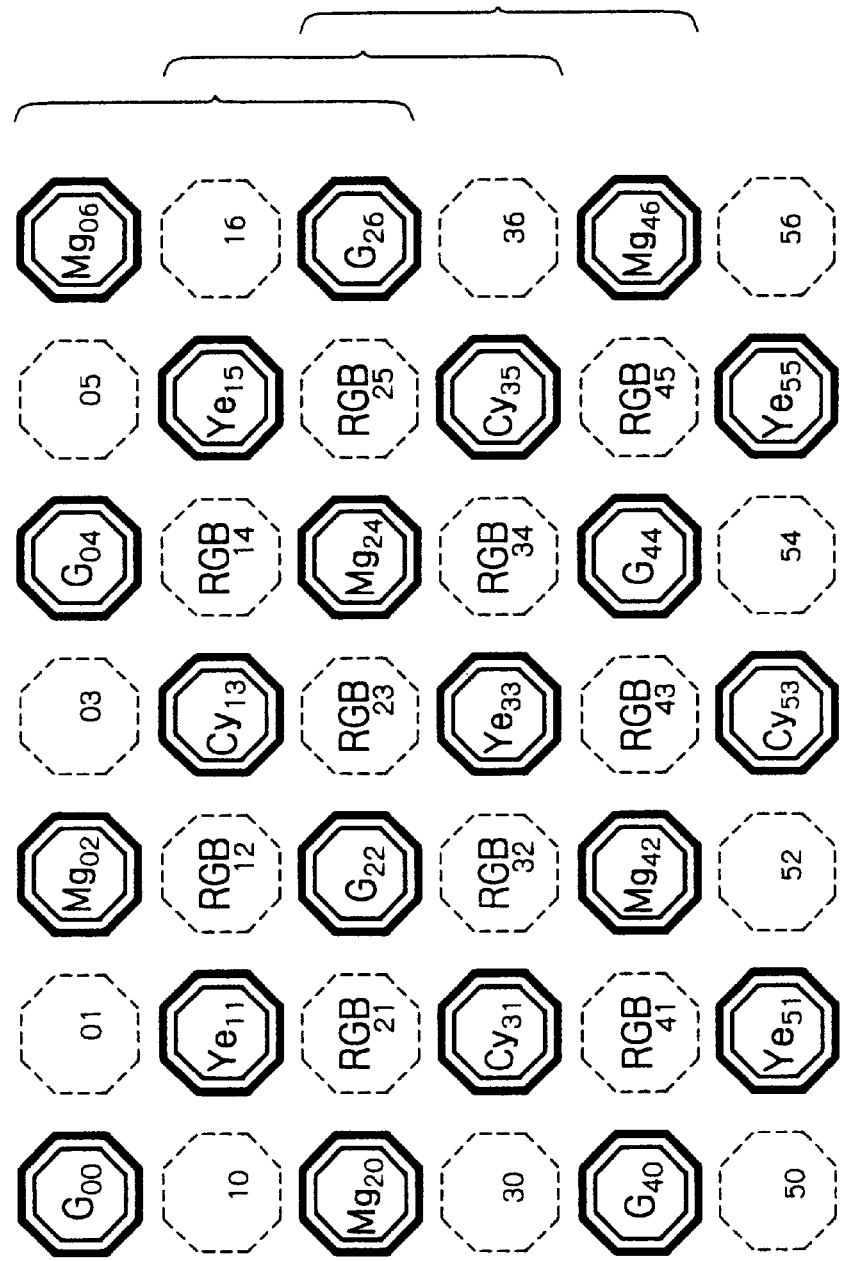
FIG. 61 is a schematic view showing a relation between virtual pixels to be interpolated and colors in the pattern shown in FIG. 60.

As for the positions of G photodiodes shown in FIG. 61, luminance data $Y_{h00}$ for, e.g., $G_{00}$ is produced by either one of:

$$Y_{h00} = G_{00} + Mg_{02} \tag{46a}$$

$$Y_{h00} = G_{00} + Mg_{20} \tag{46b}$$

As for a virtual pixel position between cyan Cy and yellow Ye, luminance data $Y_h$ is produced by:

$$Y_h = Ye + Cy = 2*G + R + B \tag{47}$$

A high frequency component is produced by vertical and horizontal adaptive interpolation using pixel data $Ye_{11}$ and $Cy_{13}$ or pixel data $Ye_{11}$ and $Cy_{31}$:

$$Y_{h12} = Ye_{11} + Cy_{13} \tag{48a}$$

$$Y_{h21} = Ye_{11} + Cy_{31} \tag{48b}$$

As the equations (45) and (47) indicate, as for color G alone, a high frequency component is calculated in the same manner as in the equation (47) that doubles pixel data G and then adds magenta pixel data to the product. The pixel data and high-frequency components generated are not calculated on a plane at this stage of processing. To produce data for the positions not calculated yet, the previously stated interpolation using LPFs is executed to thereby produce data over the entire frame.

Processing to follow in the subroutine SUB2 is identical with the previously stated processing. The high frequency components may be applied to the modification as contour enhancing signals. With the procedure described above, too, it is possible to promote efficient use of incident light and to further improve the quality of image signals.

Another interpolating method available with the present invention will be briefly described hereinafter. Again, assume that the filter segments are arranged in the W square lattice, CyYe full-checker pattern. The interpolating method generates pixel data of color W (corresponding to luminance data) at positions where the real photodiodes are present. Specifically, as for the position of pixel data $Cy_{22}$ shown in FIG. 18, color $W_{22}$ (luminance data) is produced by using pixel data $Ye_{02}$, $Ye_{20}$, $Ye_{24}$, $Ye_{42}$ and $Cy_{22}$ by:

$$W_{22} = Y_{h22} = (Ye_{02} + Ye_{20} + Ye_{24} + Ye_{41})/4 + Cy_{22} \tag{49}$$

The adaptive processing applied to virtual pixels may alternatively be applied to the real photodiodes in order to generate luminance data on the basis of correlation, as will be described hereinafter. In this case, the interpolation 36b may include a real pixel interpolating circuit in addition to the virtual pixel interpolation 360b. Referring again to FIG. 18, correlations in the horizontal and vertical directions are calculated, and then differences between them each are compared with a preselected threshold TH1. If the differences are greater than the threshold TH1, it is determined that correlations exist. Then, one of the two directions having a smaller absolute value is determined to be the direction of correlation. To produce luminance data, a mean value of two pixels data in the direction of correlation and pixel data located at a position to be calculated are added together.

For example, paying attention to pixel data $Ye_{20}$, $Ye_{24}$, $Ye_{02}$ and $Ye_{42}$, absolutes values $|Ye_{20}-Ye_{24}|$ and $|Ye_{02}-Ye_{42}|$ are produced. Subsequently, differences between the absolute values is compared with the threshold TH1:

$$(|Ye_{20}-Ye_{24}|-|Ye_{02}-Ye_{42}|) > TH1 \tag{50a}$$

$$(|Ye_{02}-Ye_{42}|-|Ye_{20}-Ye_{24}|) > TH1 \tag{50b}$$

A correlation is determined to exist in the vertical direction if the relation (50a) holds or to exist in the horizontal direction if the relation (50b) holds. A mean value of two correlated pixel data and pixel data located at the center between the correlated pixel data and where luminance should be generated are added to produce luminance data. If neither the relation (50a) nor the relation (50b) holds, it is determined that a correlation does not hold in the horizontal direction and the vertical direction. In this case, the equation (49) is used to calculate luminance data.

When the relations (50a) and (50b) indicate that a correlation does not hold, four pixel data of color W around the position where luminance should be generated may be used to detect correlations. Specifically, in FIG. 18, correlations of color W are determined in the horizontal and vertical directions. Differences between the correlations each are compared with a preselected threshold TH2. If the differences are greater than the threshold TH2, it is determined that correlations hold. Then, one of the two directions having a smaller absolute value is determined to be the direction of correlation. To produce luminance data, a mean value of two pixels data in the direction of correlation and pixel data located at a position to be calculated are added together.

For example, paying attention to pixel data $W_{11}$, $W_{13}$, $W_{31}$ and $W_{33}$, absolute values $|W_{11}-W_{13}|$ and $|W_{31}-W_{33}|$ are produced. Then, differences of the two absolute values are added to produce a correlation value $WC_{h2}$ in the horizontal direction. Likewise, differences of $|W_{11}-W_{31}|$ and $|W_{13}-W_{33}|$ are added to produce a correlation value $WC_{v2}$ in the vertical direction. Subsequently, differences between the correlation values $WC_{h2}$ and $WC_{v2}$ each are compared with the threshold value TH2:

$$(WC_{h2} - WC_{v2}) > TH2 \tag{51a}$$

$$(WC_{v2} - WC_{h2}) > TH2 \tag{51b}$$

A correlation is determined to exist in the vertical direction if the relation (51a) holds or to exist in the horizontal direction if the relation (51b) holds. A mean value of two correlated pixel data and pixel data located at the center between the correlated pixel data and where luminance should be generated are added to produce luminance data. If neither the relation (51a) nor the relation (51b) holds, it is determined that a correlation does not hold in the horizontal direction and the vertical direction. In this case, the equation (49) is used to calculate luminance data.

The addition of cyan and yellow is represented by $2G+R+B$, as stated earlier. Therefore, a relation of $G+R+B=W$ is derived when the adjoining pixel data of color G is subtracted. This means that the same weight as color W of the existing sampling point is available.

As for the color G, pixel data $G_{22}$ may be calculated by using the color $G_{11}$, $G_{13}$, $G_{31}$ and $G_{33}$ and color $R_{11}$, $R_{13}$, $R_{31}$ and $R_{33}$ generated for the pixel data $W_{11}$, $W_{13}$, $W_{31}$ and $W_{33}$, and color $R_{22}$ generated for the pixel data $Cy_{22}$ by:

$$G_{22}=(G_{11}+G_{13}+G_{31}+G_{33})/4+R_{22}-(R_{11}+R_{13}+R_{31}+R_{33})/4 \qquad (52)$$

As for the positions of the photodiodes corresponding to color W, pixel data of colors R and B may be calculated by respectively using color W and a mean value of Cy pixel data and color W and a mean value of Ye pixel data:

$$R_{33}=W_{33}-(Cy_{22}+Cy_{44})/2 \qquad (53a)$$

$$B_{33}=W_{33}-(Ye_{24}+Ye_{42})/2 \qquad (53b)$$

As for pixel data $Cy_{22}$, pixel data $R_{22}$ may be produced by:

$$R_{22}=(W_{11}+W_{13}+W_{31}+W_{33})/4-Cy_{22} \qquad (54)$$

By the above calculations, luminance data W are generated in a checker pattern. Pixel data can be easily generated over the entire frame by the previously stated interpolation.

In the illustrative embodiment and modifications thereof, the color filter is assumed to have the W square lattice, CyYe full-checker pattern or the four-color full-checker pattern. Even with the G square lattice, CyYe full-checker pattern or the CyMgYeG partly overlapping full-checker pattern, it is possible to calculate pixel data of primary colors R and B on the basis of R=Ye−G and B=Cy−G. To enhance resolution, luminance data Y are produced by using the G square lattice, CyYe full-checker pattern, FIG. 10B, and CyMgYeG partly overlapping full-checker pattern, i.e., by Y=Ye+Cy+G=3G+R+B and Y=Mg+Ye+Cy+G=3G+2(R+B). It is to be noted that relations of Ye=R+G, Cy=G+B and Mg=R+B hold. Such a pattern is also successful to promote efficient use of incident light and to enhance the quality of image signals.

As stated above, the digital camera 10 in accordance with the present invention has pixels arranged in the so-called honeycomb pattern so as to reduce the number of pixels, compared to the conventional square lattice pattern. The camera 10 can therefore faithfully reproduce colors and enhance resolution, performing the signal processing to consider the pattern.

In a conventional digital camera, the number of pixels is increased to improve color reproducibility and resolution. This, however, reduces the photosensitive area of the individual pixel to the limit of reduction of a pixel pitch and thereby lowers the sensitivity of the individual photodiode. When the pixels of the conventional image pickup should be shifted due to their limited size and in order to improve the signal characteristic, accurate pixel shift must be implemented on the production line. This requirement cannot be met without resorting to an extremely sophisticated production line that increases the cost of optics built in the camera.

By contrast, the digital camera 10 with the color filter CF having the pixel shift type honeycomb arrangement reduces the number of pixels to, e.g., one half of the conventional digital camera. This kind of filter arrangement facilitates the assembly of the image pickup 30 and color filter CF forming part of the optics as well as the adjustment of the same.

A specific assembly of a plurality of color filters arranged in the pixel shift, honeycomb pattern will be described hereinafter. A plurality of prisms or beam splitting means, not shown, are connected and arranged in the optics such that light transmitted through a lens is incident to a plurality of the photosensitive array of the image pickup 30. Assume that the image pickup 30 has two photosensitive array. Then, as shown in FIGS. 62A and 62B, the color filter CF is implemented as two color filters CF1 and CF2.

Figure 62A:
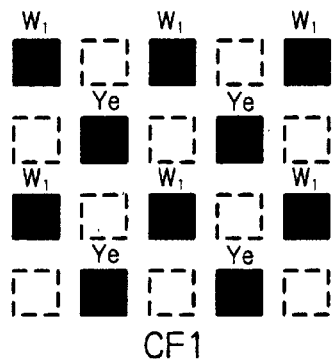
FIGS. 62A through 62F are schematic views showing a relation between different color patterns and spatial arrangements derived from the color patterns in relation to a two-plate type color filter applied to the image pickup.
Figure 62B:
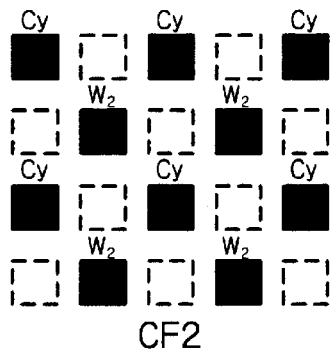

As shown in FIG. 62A, the color filter CF1 has rows of colors $W_1$ and rows of color Ye spatially arranged alternately with each other. As shown in FIG. 62B, the color filter CF2 has rows or color $W_2$ and rows of color Cy spatially arranged alternately with each other; color Cy is positioned on the rows of color $W_1$ of the color filter CF1, implementing the honeycomb arrangement. When the color filter CF2, for example, is adhered to the color filter CF1 while being shifted by one pixel pitch in the direction of rows, the filters CF1 and CF2 readily implement the W stripe, CyYe full-checker pattern, as shown in FIG. 62C.

Figure 62D:
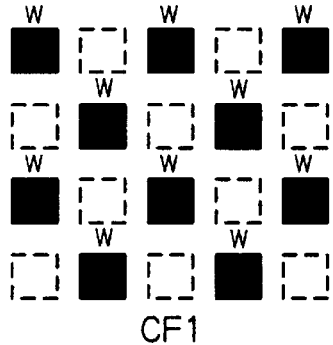
Figure 62E:
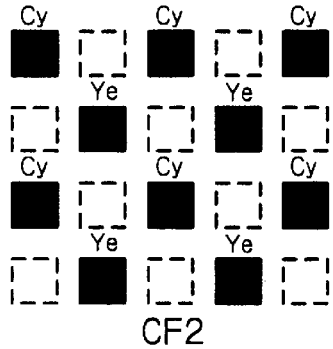
Figure 62C:
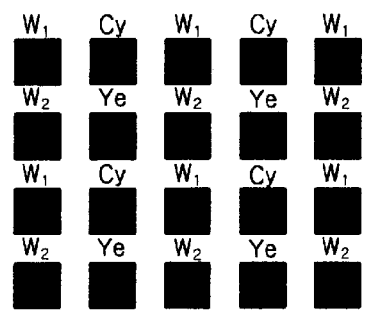
Figure 62F:
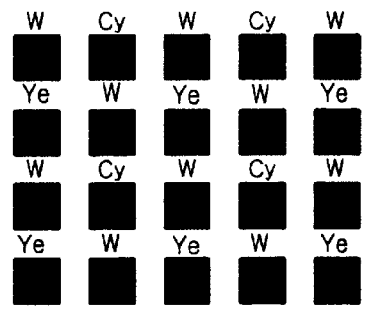

Alternatively, as shown in FIGS. 62D and 62E, the color filter CF1 may have only color W while the color filter CF2 may have colors Ye and Cy spatially arranged alternately with each other in a honeycomb pattern or checker pattern. In this case, too, the color filter CF2, for example, is adhered to the color filter CF1 by being shifted by one pixel pitch. This realizes the Bayer pattern more easily than in the configuration of FIGS. 62A and 62B (see FIG. 62F).

Figure 63A:
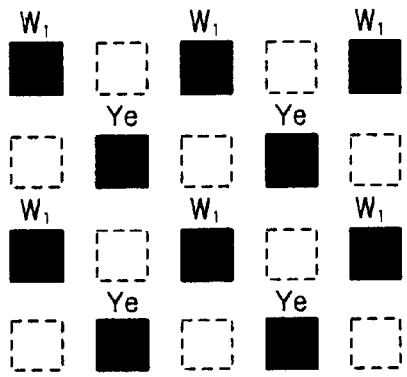
FIGS. 63A through 63C are schematic views showing a relation between other color patterns and spatial arrangements derived from the color patterns.
Figure 63B:
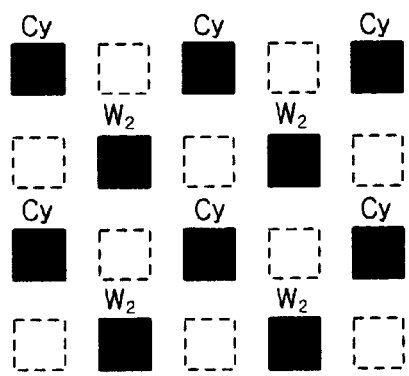
Figure 63C:
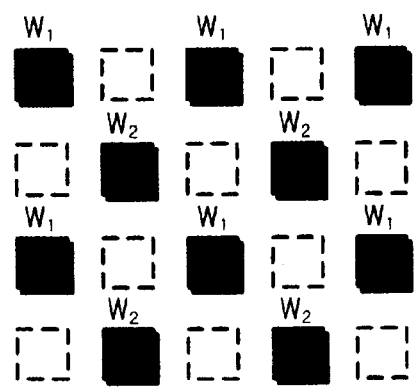

As shown in FIGS. 63A and 63B, another specific filter assembly also uses the color filters CF1 and CF2 of FIGS. 62A and 62B. The difference is that the color filters CF1 and CF2 are adhered together with their pixel positions fully coinciding with each other.

Figure 64A:
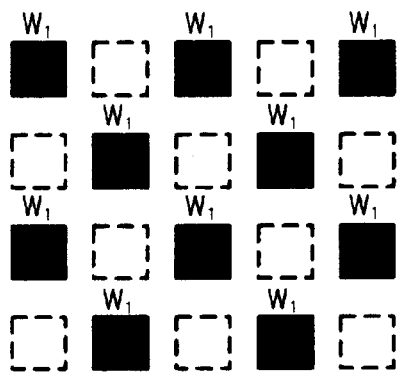
FIGS. 64A through 64E are schematic views showing a relation between different color patterns and spatial frequencies derived from the color patterns in relation to a three plate type color filter applied to the image pickup.
Figure 64D:
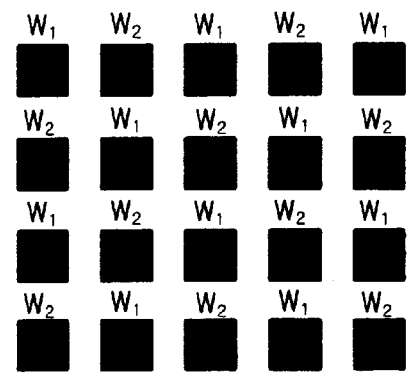
Figure 64B:
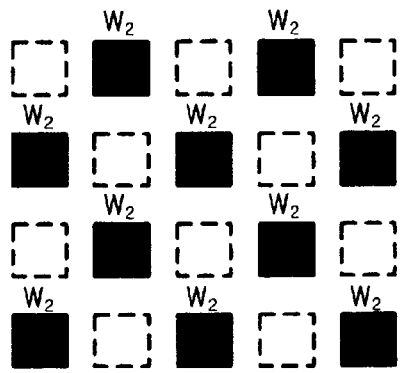
Figure 64E:
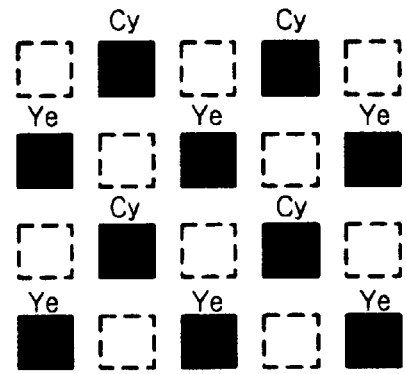
Figure 64C:
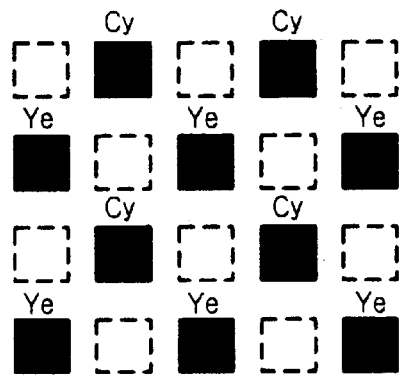

FIGS. 64A, 64B and 64C show a specific filter assembly using three color filters having the honeycomb arrangement. As shown in FIGS. 64A and 64B, color filters CF1 and CF2 have a honeycomb arrangement and are shifted from each other by a pixel pitch (half-pitch at adherent). The color filters CF1 and CF2 include the same color $W_1$ and $W_2$. As shown in FIG. 64C, a color filter CF3 has the same honeycomb arrangement as the color filter CF2, but includes colors Ye and Cy. The color filters CF2 and CF3 whose pixels are arranged in the same relation are adhered to each other. As a result, as shown in FIG. 64D, identical colors $W_1$ and $W_2$ alternate with each other in a square lattice configuration. Also, as shown in FIG. 64E, different colors Ye and Cy are arranged in a honeycomb configuration.

Figure 65A:
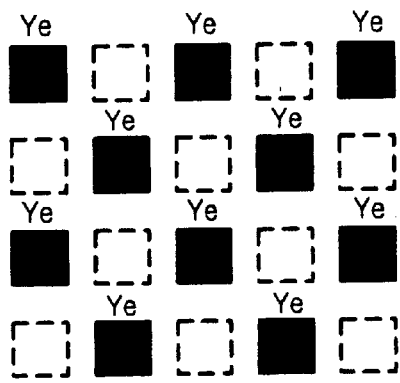
FIGS. 65A through 65D are schematic views showing a relation between other color patterns and spatial arrangements derived from the color patterns in the case of the three-plate type color filter.
Figure 65B:
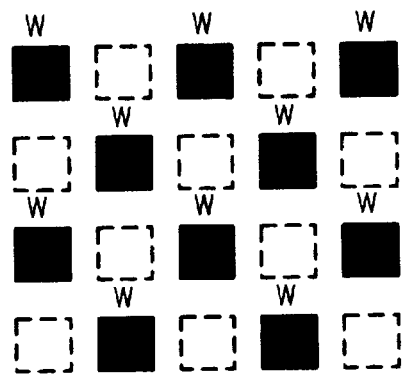
Figure 65D:
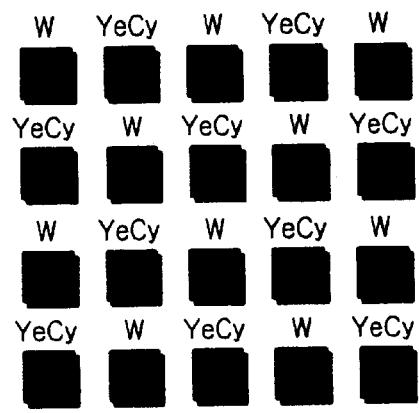
Figure 65C:
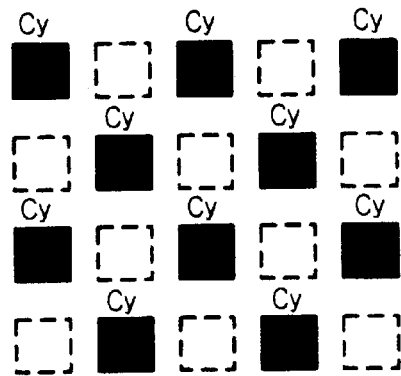

FIGS. 65A, 65B and 65C show another specific filter assembly using three color filters. As shown, three color filters CF1, CF2 and CF3 have an identical honeycomb arrangement. Colors Ye, W and Cy are assigned to the color filters CF1, CF2 and CF3, respectively. The color filters CF1 and CF3 are adhered to the color filter CF2 by being shifted by one pitch (half-pitch at adherent). FIG. 65C shows the resulting pattern in which color W and superposed colors Ye and Cy alternate with each other. Any one of conventional three-plate type color filters may also be constructed with the honeycomb arrangement.

A plane sequential, single plate type of digital camera to which the present invention is applied will be briefly described hereinafter. This type of digital camera is desirable to shoot a stationary subject. The plane sequential, single plate system is desirably practicable with black-and-white cells in both of pickup and receipt.

The digital camera of the type described includes an image pickup section having bidimensionally arranged photosensitive cells. A moving mechanism moves the image pickup section in, e.g., the horizontal direction (X) and vertical direction (Y) in a bidimensional plane parallel to the pickup surface of the image pickup section. A plurality of color filters having the honeycomb arrangement are disposed on an optical path between a subject and the image pickup section, e.g., just in front of the image pickup section. A filter switching mechanism selects one of the color filters and positions it on the optical path. A record/reproduction section records the output of the image pickup section. A color signal processing selectively processes the output of the pickup section or the output of the record/reproduction section.

The image pickup section, color filters and color signal processing are constructed in the same manner as in the illustrative embodiment. Because the moving mechanism moves the image pickup section, the color filters each are provided with an area greater than the photosensitive area of the image pickup so as to cover the photosensitive area even when the image pickup is moved.

The moving mechanism finely moves the image pickup section in accordance with the kind of the color filter brought to the optical path, i.e., the shift of the pixels of the filter. If delicate control over the movement of the image pickup section is difficult to perform, a suitable amount of movement may be set because the relation between the pixel pitches to shift is periodic. To accurately move the image pickup section in the X and Y directions, the moving mechanism includes a stepping motor or similar drive source, a gear for transferring the drive force of the drive source, a rack meshing with the gear for transforming the rotation of the gear to translation, and a translation control unit for controlling the drive source. The image pickup section is mounted on the rack. The image pickup section is connected to the translation control unit, record/reproduction section and color signal processing by, e.g., a flexible printed circuit board, so that signals can be input and output without regard to the movement of the image pickup section. In this construction, the image pickup section is movable in accordance with the kind of the color filter selected.

The filter switching mechanism includes a filter mount having a disk formed with filter openings at a preselected angular distance and a preselected radial position, taking account of the number of the filters. A motor or drive source causes the disk to rotate about its axis. A rotation control unit controls the motor. The surface of the filter mount where the openings are present should preferably be parallel to the photosensitive surface of the image pickup section. The output shaft of the motor is passed through a hole formed in the center of the disk and affixed to the wall of the hole by, e.g., adhesive. The rotation control unit controls the start and end of rotation of the disk such that the disk rotates by each preselected angle. With this configuration, the filter switching mechanism brings desired one of the color filters to the optical path.

The record/reproduction section receives pixel data via, e.g., an SCSI interface. Specifically, the record/reproduction section transforms signals received from the image pickup section to pixel data in accordance with the combination of the operation of the filter switching section and that of the moving mechanism records the pixel data. That is, a single subject is shot a plurality of times for generating a single picture. The pixel data recorded in the record/reproduction section are read out and sent to the color signal processing section. In response, the processing section practices any one of the methods of the illustrative embodiment and modifications thereof so as to produce a high quality picture by attaching importance to color reproducibility and resolution. The image pickup section with the color filters having the honeycomb arrangement frees a production line from sophisticated arrangements and adjustments. Moreover, the image pickup section does not need on-chip color filters customarily mounted on photosensitive cells.

The digital camera may include two color filters having the honeycomb arrangement and two image pickup sections. Such image pickup sections can be regarded as a plane sequential, color image pickup unit having a black-and-white square lattice configuration.

In the above-described digital camera, signal charges including a plurality of complementary colors, as determined by the color filter, are stored in the photodiodes PD arranged in the photosensitive array of the image pickup 30. The signal charges are sequentially read out two lines at a time, three lines at a time, or three lines at a time while shifting the lines one by one. The A/D 34 digitizes the signal charges to output pixel data including a plurality of complementary colors. The signal processing 36 generates pixel data of color R, G or B by interpolation at the positions of virtual or real photodiodes on the basis of the above pixel data. It is noteworthy that the complementary color filter promotes efficient use of incident light more than a primary color filter. Therefore, despite that the sensitivity of the photodiodes PD densely arranged in the image pickup 30 (so-called megapixels) is apt to fall, signal charges output from the image pickup 30 can be efficiently converted and contribute to the enhancement of image quality. Moreover, the pixel data generated are used to interpolate data for the actual or virtual photodiodes, and the pixel data interpolated are used to broaden the frequency band of pixel data at the real and virtual photodiodes. It is therefore possible not only to maintain an adequate signal level with the improved sensitivity, but also to further enhance the resolution of image signals while obviating false colors.

The signals read out by the two-line scheme, three line scheme or three-line scheme with line shift in accordance with the arrangement of the color filter are digitized and then stored in the form of pixel data. Subsequently, the pixel data are read out by the same scheme. At this instant, pixel data of R, G or B are generated at the positions of virtual pixels on the basis of pixel data of complementary color of the adjoining photodiodes. Pixel data of complementary colors realize efficient use of incident light more than pixel data of primary colors. The pixel data generated are used to interpolate pixel data of R, G or G at the positions of real photodiodes, and the resulting pixel data are used to broaden the frequency band of pixel data at the positions of real and virtual photodiodes. Such a procedure implements unprecedented high resolution and therefore high image quality. In this manner, by processing image signals in matching relation to the arrangement of the color filter, it is possible to output high quality image signals. This kind of processing is similarly applicable to image processing.

In summary, it will be seen that the present invention provides a solid-state image sensor and a signal processing method therefor capable of enhancing the resolution of image signals representative of a shot and obviating, e.g., false colors.

The entire disclosure of Japanese patent application No. 187178/1999 filed Jul. 1, 1999 including the specification, claims, accompanying drawings and abstract of the disclosure is incorporated herein by reference in its entirely.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. A solid-state image sensor for separating colors of incident light at positions corresponding to apertures formed in a screen member, transforming color-separated light to electric signals representative of an image, and processing said electric signals to thereby output broadband signals, said solid-state image sensor comprising:

an image pickup section including color separating means comprising, among a plurality of color filters each having a particular spectral characteristic for separating the colors of the light incident via the apertures, a color filter having a spectral characteristic of complementary colors;

a photosensitive array comprising photosensitive cells, which photoelectrically transform the light passed through said color filter, and photosensitive cells adjoining said photosensitive cells, wherein said photosensitive cells are bidimensionally arranged while being shifted from each other in a vertical direction and/or a horizontal direction;

electrodes so arranged as to go around the apertures formed in said photosensitive array for reading signals out of said photosensitive cells, and;

transfer registers for sequentially transferring the signals read out via said electrodes in the horizontal direction or the vertical direction of said photosensitive array;

an analog-to-digital converter for converting the signals output from said image pickup section to digital data; and a signal processing section for generating, assuming that positions on a plane, in which the digital data are arranged, void of the photosensitive cells due to a shifted arrangement of said photosensitive cells are virtual photosensitive cells, pixel data of any one of three primary colors red (R), green (G) and blue (B) for interpolating said virtual photosensitive cells or the actually present photosensitive cells on the basis of pixel data that include a plurality of complementary colors and are read out of said actually present photosensitive cells, two lines at a time, three lines at a time, or three lines at a time with a line-by-line shift in accordance with said color filter, and broadening a frequency band of pixel data at said actually present photosensitive cells and said virtual photosensitive cells on the basis of said pixel data interpolated.

2. An image sensor in accordance with claim 1, wherein said apertures are bidimensionally arranged such that, assuming that said apertures each have a shape of either one of a square lattice and a polygon and that a distance between said photosensitive cells respectively corresponding to said apertures is a pixel pitch, said apertures are shifted from each other by one half of said pixel pitch column by column in the vertical direction or row by row in the horizontal direction, or bidimensionally arranged with a shape of either one of a square lattice rotated by 45° and a polygon.

3. An image sensor in accordance with claim 1, wherein said color filter uses a plurality of any of cyan (Cy), magenta (Mg), yellow (Ye), white (W) and green (G) particular to subtractive mixture and has a W square lattice, CyYe full-checker pattern, in which W is arranged in a square lattice while Cy and Ye are shifted from W by one half of the pixel pitch, with nearby photosensitive cells being shifted in accordance with the shifted arrangement of said photosensitive cells.

4. An image sensor in accordance with claim 1, wherein said color filter uses a plurality of any of Cy, Mg, Ye and G particular to subtractive mixture and has a G square lattice, CyYe full-checker pattern, in which G is arranged in a square lattice while Cy and Ye are shifted from G by one half of the pixel pitch, with nearby photosensitive cells being shifted in accordance with the shifted arrangement of said photosensitive cells.

5. An image sensor in accordance with claim 1, wherein said color filter uses a plurality of any of Cy, Mg, Ye and G particular to subtractive mixture and has a partly overlapping full-checker pattern in which part of a full-checker patter using Cy, Mg, Ye and G overlaps or a partly overlapping checker pattern in which W is substituted for G, with nearby photosensitive cells being shifted from each other by one half of the pixel pitch in accordance with the shifted arrangement of said photosensitive cells.

6. An image sensor in accordance with claim 1, wherein said color filter uses Cy, Ye, Mg and G particular to subtractive mixture and has three of Cy, Ye, Mg and G combined and arranged in the vertical direction or the horizontal direction with nearby photosensitive cells being shifted from each other by one half of the pixel pitch in accordance with the shifted arrangement of said photosensitive cells.

7. An image sensor in accordance with claim 1, wherein said color filter uses Cy, Ye and W particular to subtractive mixture and has Cy, Ye and W arranged in the vertical direction or the horizontal direction with nearby photosensitive cells being shifted from each other by one half of the pixel pitch in accordance with the shifted arrangement of said photosensitive cells.

8. An image sensor in accordance with claim 1, wherein said color filter uses a plurality of any of Cy, Mg, Ye and R, G and B and has a four-color full-checker pattern in which G is positioned at a center of a CyYe full-checker pattern while G surrounding said CyYe full-checker pattern is arranged in a square lattice or in which W is substituted for G, with nearby photosensitive cells being shifted from each other by one half of the pixel pitch in accordance with the shifted arrangement of said photosensitive cells.

9. An image sensor in accordance with claim 1, wherein said image pickup reads out, in accordance with an arrangement of said color filter, the signals output from said photosensitive cells, two lines at a time, three lines at a time, or three lines at a time with a line-by-line shift.

10. An image sensor in accordance with claim 1, wherein said signal processing comprises:

an interpolating circuit for calculating the pixel data for said virtual photosensitive cells by using two lines of pixel data output from said actually present photosensitive cells at a time, and calculating luminance data for said virtual photosensitive cells by using said pixel data calculated; and a band broadening circuit for further broadening a frequency band included in said pixel data output from said interpolating circuit.

11. An image sensor in accordance with claim 10, wherein said interpolating circuit comprises:

a first interpolating circuit for interpolating a subject virtual pixel under consideration by performing subtraction at least once with pixel data output from two or three of the actually present photosensitive cells adjoining said subject virtual pixel and including the complementary colors; and a second interpolating circuit for calculating luminance data for the subject virtual pixel by combining pixel data of the primary colors calculated by said first interpolating circuit for the virtual photosensitive cells.

12. An image sensor in accordance with claim 11, wherein said first interpolating circuit comprises a color interpolating block for calculating, when said color filter has a combination of patterns of two or three of Cy, Mg, Ye, W and G pixel data, the pixel data and R, G and B for the subject virtual pixel by using one of a combination of R=W−Cy, B=W−Ye and G=Ye+Cy−W, a combination of R=Ye−G, B=Cy−G and G=G, and a combination of R=Ye−G, B=Cy−G and G=G.

13. An image sensor in accordance with claim 11, wherein said second interpolating circuit comprises a generating block for calculating, when said color filter has a combination of patterns of three or four of Cy, Mg, Ye, W and G pixel data, luminance data Y for the subject virtual pixel by using one of a combination of Y=Ye+Cy+W, a combination of Y=Ye+Cy+G, and a combination of Y=Mg+Ye+Cy+G.

14. An image sensor in accordance with claim 11, wherein said interpolating circuit further comprises a third interpolating circuit for calculating luminance data for a subject actually present photosensitive cell under consideration by using pixel data around said subject actually present photosensitive cell.

15. An image sensor in accordance with claim 10, wherein said band broadening circuit comprises:
a luminance interpolating circuit for interpolating luminance data for a subject actually present photosensitive cell under consideration or a subject virtual photosensitive cell under consideration by using luminance data output from said interpolating circuit;
a plane interpolating circuit for further broadening, by using the pixel data output from said luminance interpolating circuit and said interpolating circuit, a frequency band included in said pixel data, and generating an R, a G and a B plane data;
a matrix circuit for generating luminance data and chrominance data by using the R, G and B plane data; and
an aperture adjusting circuit for executing contour enhancement with the luminance data output from said matrix circuit.

16. An image sensor in accordance with claim 15, wherein said luminance interpolating circuit executes low-pass filter processing with the luminance data.

17. An image sensor in accordance with claim 11, wherein said second interpolating circuit comprises an adaptive interpolating circuit for calculating subject luminance data Y under consideration by using G pixel data and R and B pixel data around said subject luminance data Y or by taking account of adaptive processing based on a decision on a horizontal color boundary and a vertical color boundary.

18. An image sensor in accordance with claim 14, wherein said third interpolating circuit comprises a luminance calculating block for calculating, when said color filter has a W square lattice, CyYe full-checker pattern in which G is arranged in a square lattice while Cy and Ye are shifted from W by one half of the pixel pitch, luminance data W for a subject Cy or a subject Ye photosensitive cell under consideration by adding a mean of pixel data of one color of said full-checker pattern different from the other color of a position of said subject Cy or Ye photosensitive cell and the pixel data of said other.

19. An image sensor in accordance with claim 14, wherein said third interpolating circuit comprises a complementary-color adaptive interpolating circuit for generating subject luminance data W under consideration by adding, while taking account of adaptive processing based on a decision on a horizontal and a vertical color boundary, a mean value of the pixel data of a direction greater in correlation than the other direction.

20. An image sensor in accordance with claim 1, wherein said signal processing section comprises:
a band-by-band data generating circuit for calculating pixel data for the virtual photosensitive cells by using the pixel data output from the actually present photosensitive cells, three lines at a time, and calculating, for each frequency band, particular luminance data and particular chrominance data relating to said virtual photosensitive cell and said actually present photosensitive cells by using said pixel data calculated; and
a frequency raising circuit for further raising frequencies of signal components included in the pixel data output from said band-by-band data generating circuit.

21. An image sensor in accordance with claim 10, wherein said band broadening circuit comprises:
a calculating circuit for performing calculations with the pixel data interpolated in the virtual photosensitive cells by said interpolating circuit in accordance with faithful color reproduction and resolution in a horizontal and/or a vertical resolution to which importance is attached to thereby output component signals;
a pseudo-adding circuit for adding, with respect to a pseudo-frequency, the component signals output from said calculating circuit and respectively having importance attached to color reproducibility and resolution;
an overlap preventing circuit for preventing, when the component signals output from said calculating circuit and respectively having importance attached to resolution in the horizontal and vertical directions include a same frequency band, said same frequency band from overlapping;
a signal adjusting circuit for controlling an amplitude of the component signal output from said calculating circuit and having importance attached to color reproducibility; and
a signal converting circuit for generating R, G and B on the basis of the component signals output from said signal adjusting circuit and said overlap preventing circuit.

22. An image sensor in accordance with claim 20, wherein said frequency raising circuit comprises:
an item-by-item calculating circuit for executing, with the pixel data output from said band-by-band data generating circuit for the virtual photosensitive cells, calculations on the basis of faithful color reproduction and resolution in a horizontal and/or a vertical direction to which importance is attached to thereby output component signals;
a pseudo-adding circuit for adding, with respect to a pseudo-frequency, the component signals output from said item-by-item calculating circuit and respectively having importance attached to color reproducibility and resolution;
an overlap preventing circuit for preventing, when the component signals output from said item-by-item calculating circuit and respectively having importance attached to resolution in the horizontal and vertical directions include a same frequency band, said same frequency band from overlapping;
a signal adjusting circuit for.executing contour enhancement and amplitude control with the component signal output from said overlap preventing circuit and having importance attached to resolution, and executing amplitude control with the component signal having importance attached to color reproducibility; and a signal converting circuit for generating R, G and B on the basis of the component signals output from said signal adjusting circuit.

23. An image sensor in accordance with claim 21, wherein said pseudo-adding circuit comprises:
 a first adding circuit for receiving at one input a first component signal output from said calculating circuit and lying in a frequency band having importance attached to resolution, and receiving at the other input a second component signal lying in a frequency band lower than said frequency band and having importance attached to color reproducibility;
 a filtering circuit for freeing an output of said first adding circuit and said first component signal from aliasing distortions; and
 a second adding circuit for adding outputs of said filtering circuit.

24. An image sensor in accordance with claim 22, wherein said overlap preventing circuit comprises:
 a filter for limiting a frequency band included in one signal output from said pseudo-adding circuit and identical with a frequency band included in the other signal also output from said pseudo-adding circuit; and
 an adding circuit for adding an output of said filter and said other signal.

25. An image sensor in accordance with claim 15, wherein said aperture adjusting circuit comprises:
 an enhancement data generating circuit for performing correlation detection and interpolation with only G of the virtual photosensitive cells to thereby output a component signal attaching importance to resolution as a contour enhancing signal; and
 an overlap preventing circuit for preventing, when the contour enhancing signal output from said enhancement data generating circuit attaches importance to resolution in the horizontal and vertical directions and include a same frequency band, said same frequency band from overlapping.

26. An image sensor as claimed in claim 9, wherein said image pickup section comprises a plurality of image pickup devices each having a respective photosensitive array, said image sensor further comprising beam splitting optics intervening between said plurality of image pickup devices and focusing optics, which focuses the incident light, for splitting said incident light into at least two light paths to thereby project an image of a subject on photosensitive array of said plurality of image pickup devices;
 wherein the photosensitive cells constituting the respective photosensitive array are bidimensionally arranged in rows and columns and have a center, as to a geometric shape of said respective photosensitive array, shifted by one half of the pixel pitch in a direction of rows and a direction of columns from a center of the photosensitive cells constituting the other photosensitive array; and
 wherein said color filter comprises a plurality of color filters respectively positioned in front of the photosensitive array and using complementary colors that produce, when superposed, pixels of primary colors at the positions where said photosensitive cells are absent.

27. An image sensor in accordance with claim 26, wherein assuming that the photosensitive section comprises two photosensitive devices, said plurality of color filters form, when combined, a W square lattice, CyYe full-checker pattern in which W is arranged in a square lattice while Cy and Ye are arranged in a full-checker pattern, a G square lattice, CyYe full-checker pattern in which G is arranged in a square lattice, a partly overlapping full-checker pattern in which part of said W square lattice, CyYe full-checker pattern overlap or in which W is substituted for G, a vertical or a horizontal stripe pattern, or a four-color full-checker pattern in which G is positioned at a center of a CyYe full-checker pattern while G surrounding said CyYe full-checker pattern is arranged in a square lattice or in which W is substituted for G.

28. An image sensor in accordance with claim 26, wherein assuming that the photosensitive section comprise three photosensitive devices, said plurality of filters comprise a first color filter with a shifted pixel pattern, a second color filter identical in color with said first color filter, but shifted in pixel pattern from said first color filter by one half of the pixel pitch, and a third color filter identical in pixel pattern with, but different in color, from said second color filter, and wherein said second and third color filters are adhered to each other.

29. An image sensor in accordance with claim 26, wherein assuming that the photosensitive section comprises three photosensitive devices, two of three color filters each having a particular shifted pixel pattern both are shifted by one pixel pitch to thereby form a color filter having an overlapping spatial arrangement.

30. A signal processing method using photosensitive cells bidimensionally arranged beneath apertures that are formed in a screen member for causing light to be incident to said photosensitive cells via a plurality of color filters each having a particular spectral sensitivity characteristic, said apertures having a shape of a square lattice or a polygon and shifted in a vertical direction column by column or in a horizontal direction row by row or a square lattice rotated by 45° or a polygon, said method handling said photosensitive cells as bidimensional pixels for transforming the incident light to image signals based on said pixels and processing said images signals to thereby output broadband image signals, said signal processing method comprising:
 a digitizing step for converting signals read out of the photosensitive cells, two lines at a time, three lines at a time or three lines at a time with a line-by-line shift in accordance with a combination pattern of said plurality of filters to digital data;
 a data storing step for storing pixel data produced by said digitizing step;
 a virtual pixel interpolating step for reading out the pixel data in a same manner as the signals are read out of the photosensitive cells, and interpolating pixel data of any one of R, G and B in a position of a subject virtual photosensitive cell under consideration, which is void of a photosensitive cell due to a shifted arrangement of said photosensitive cells, on the basis of pixel data of complementary colors output from the photosensitive cells adjoining said subject virtual photosensitive cell; and
 a band broadening step for interpolating pixel data of R, G or B in a position of a subject actually present photosensitive cell under consideration by using the pixel data interpolated by said virtual pixel interpolating step, and using resulting pixel data to broaden a frequency band of the pixel data at positions of the actually present photosensitive cells and the virtual photosensitive cells.

31. A method in accordance with claim 30, wherein said virtual pixel interpolating step comprises:
 a first interpolating step for calculating, when said virtual pixel interpolating step reads out the pixel data, two lines at a time, the pixel data for a subject virtual photosensitive cell under consideration by performing subtraction at least once with pixel data output from two or three photosensitive cells adjoining said subject virtual photosensitive cell and including complementary colors; and a second interpolating step for calculating luminance data for the subject virtual photosensitive cell by combining pixel data of the primary colors calculated by said first interpolating step for the virtual photosensitive cells.

32. A method in accordance with claim 31, wherein said first interpolating step calculates, when generating the pixel data by using a combination of patterns of two or three of Cy, Ye and W pixel data output from the photosensitive cells adjoining the subject virtual pixel, R, B and G for said subject virtual pixel by using R=W−Cy, B=W−Ye and G=Ye+Cy−W, respectively.

33. A method in accordance with claim 31, wherein said second interpolating step adds all of Cy, Ye and W pixel data output from the photosensitive cells adjoining the subject virtual photosensitive cell to thereby generate luminance data for said subject virtual photosensitive cell.

34. A method in accordance with claim 31, wherein said first interpolating step generates for the virtual photosensitive cells a G square lattice, RB full-checker pattern in which a G square lattice and an RB full-checker shifted from said G square lattice by one half of the pixel pitch are combined, said second interpolating step generating, when generating luminance data from R pixel data and B pixel data of said G square lattice, RB full-checker pattern around G pixel data, luminance data for a subject actually present photosensitive cell under consideration from a half-value of one of said R pixel data and B pixel data used to generate the luminance data and surrounding pixel data produced by adding the other pixel data closest to said one pixel data and located at an equal distance and then dividing a resulting sum by a number of the pixel data added.

35. A method in accordance with claim 31, wherein assuming that the color filter has the W square lattice, CyYe full-checker pattern, said first interpolating step generates color pixel data for the virtual photosensitive cells, said virtual pixel interpolating step further comprising:

a third interpolating step for calculating, assuming that Cy or Ye of said color filter is used at a position of the actually present photosensitive cell and that luminance data is to be generated at the position of the photosensitive cell of one of Cy or Ye, the luminance data on the basis of four image data of the other color adjoining said photosensitive cell, adding said luminance data and pixel data of said photosensitive cell, and generating, based on a resulting sum, pixel data having importance attached to faithful color reproduction in a horizontal direction and/or a vertical direction and pixel data having importance attached to resolution;

the luminance data being calculated at either one of the virtual photosensitive cell and the actually present photosensitive cell.

36. A method in accordance with claim 31, wherein assuming that the color filter has the W square lattice, CyYe full-checker pattern, said first interpolating step generates color pixel data at positions of the virtual photosensitive cells, the virtual pixel interpolating step further comprising:

a fourth interpolating step for calculating, assuming that Cy or Ye is used at a position of a subject actually present photosensitive cell under consideration and that luminance data is to be generated at a position of one of Cy and Ye photosensitive cells, first correlation values in a horizontal/vertical direction with four pixel data of the other color adjoining said one photosensitive cell, producing a mean value of two photosensitive cells positioned in a direction of a first correlation value greater than a preselected value or producing, if said correlation values are smaller than said preselected value in both of the horizontal and vertical directions, a mean value of said four pixel data, adding said mean value and pixel data of said photosensitive cell, and generating, based on a resulting sum, pixel data having importance attached to faithful color reproduction in the horizontal and/or the vertical direction and pixel data having importance attached to resolution;

the luminance data being calculated at either one of the virtual photosensitive cell and the actually present photosensitive cell.

37. A method in accordance with claim 36 wherein said fourth interpolating step calculates the first correlation values in the horizontal/vertical direction on the basis of four pixel data adjoining the subject photosensitive cell, and produces a mean value of the two photosensitive cells positioned in the direction of the correlation value greater than said first preselected value, or uses, if the first correlation values are smaller than the first preselected value in both of the horizontal and vertical directions, four W pixel data adjoining the subject photosensitive cell, adds absolute values of differences between the pixel data positioned in the horizontal direction and adds absolute values of differences between the pixel data positioned in the vertical direction to thereby produce second correlation values in the horizontal and vertical directions, respectively, and produces a mean value of two photosensitive cells positioned in a direction of the second correlation value greater than said second preselected value, or produces a mean value of the four W pixel data if the correlation values are smaller than the second preselected value in both of the horizontal and vertical directions, and adds the mean value and the pixel data of the subject photosensitive cell, and generates, based on a resulting sum, pixel data having importance attached to faithful color reproduction in the horizontal and/or the vertical direction and pixel data having importance attached to resolution.

38. A method in accordance with claim 30, wherein, assuming that the color filter has the four-color full-checker pattern, said virtual pixel interpolating step comprises:

a fifth interpolating step for interpolating, when the pixel data stored by said data storing step are read out, three lines at a time or three lines at a time with a line-by-line shift, R, G and B for the virtual photosensitive cell surrounded by the photosensitive cells of four colors;

a sixth interpolating step for interpolating pixel data produced by said fifth interpolating step in the photosensitive cells;

a low-frequency luminance calculating step for calculating luminance data for a subject virtual photosensitive cell under consideration positioned between Cy and Ye by adding two Cy and Ye pixel data arranged in the horizontal and vertical directions; and a high-frequency luminance calculating step for generating, assuming that G pixel data at a G photosensitive cell is high-frequency luminance data, said high-frequency luminance data by adding a double of said G pixel data and pixel data output from an Mg photosensitive cell.

39. A method in accordance with claim 30, wherein said band broadening step comprises:

a luminance interpolating step for interpolating luminance data in positions of the photosensitive cells by using the luminance data produced by said virtual pixel interpolating step;

a plane interpolating step for broadening a frequency band of pixel data produced by said luminance interpolating step and said virtual pixel interpolating step, and generating R plane data, G plane data and B plane data;

a matrix step for generating luminance data and chrominance data on the basis of the R, G and B plane data; and an aperture adjusting step for executing contour enhancement with the luminance data generated by said matrix step.

40. A method in accordance with claim 39, wherein said luminance interpolating step comprises:

a horizontal interpolating step for generating, based on the luminance data generated by said virtual pixel interpolating step, luminance data for the photosensitive cells in an order of the horizontal direction and the vertical direction, or vice versa, executing, when interpolating pixel data in positions of the photosensitive cells in the horizontal direction, a zeroth-stage horizontal step that multiplies each pixel data to be interpolated by a particular coefficient and a first-stage horizontal step that adds right data and left data adjoining said pixel data and multiplies a resulting sum by a coefficient, and repeating n times a horizontal step that performs multiplication with pixel data equally spaced from said pixel data to be interpolated in the horizontal direction with a coefficient in the same manner as in said first-stage horizontal step, and adding all of products output after said zeroth-stage and first-stage horizontal steps to thereby generate pixel data to interpolate; and a vertical processing step for multiplying, when generating pixel data for a subject position under consideration by using the pixel data produced by said horizontal interpolating step, multiplying the pixel data positioned in the vertical direction by a corresponding coefficient and adding all of resulting products to thereby execute vertical low-pass processing.

41. A method in accordance with claim 31, wherein said second interpolating step produces, when calculating the luminance data, first correlation values in the horizontal and vertical directions and compares said first correlation values with a first preselected value, said second interpolating step comprising:

a horizontal luminance calculating step for adding, if a result of comparison indicates that a correlation holds in the horizontal direction, pixel data in the horizontal direction and dividing a resulting sum by a double of a number of pixel data added to thereby produce surrounding pixel data;

a vertical luminance calculating step for adding, if the result of comparison indicates that a correlation holds in the vertical direction, pixel data in the vertical direction and dividing a resulting sum by a double of a number of pixel data added to thereby produce surrounding pixel data; and a mean luminance calculating step for adding, if correlation values in the horizontal and vertical directions resulting from the comparison both are smaller than the preselected value, the other pixel data closest to the subject and located at an equal distance, and dividing a resulting sum by a double of a number of pixels added to thereby produce surrounding pixel data;

a luminance data pattern being generated on the basis of a half-value data of the subject pixel data and said surrounding pixel data output by any one of said horizontal luminance calculating step, said vertical luminance calculating step, and said mean luminance calculating step.

42. A method in accordance with claim 41, wherein said second interpolating step compares, before calculating the luminance data, the first correlation values of the horizontal and vertical directions with the first preselected value, executes said horizontal luminance calculating step or said vertical luminance calculating step in accordance with a result of comparison, adds, assuming that one of the R pixel data and B pixel data is the luminance data to be generated, correlation values derived from the other pixel data horizontally aligning with each other at both sides of said luminance data to thereby produce second correlation values in the horizontal and vertical directions, and compares said second correlation values with a second preselected value, said second interpolating step comprising:

said horizontal luminance calculating step executed when a result of comparison indicates that a correlation holds in the horizontal direction;

said vertical luminance calculating step executed when the result of comparison indicates that a correlation holds in the vertical direction; and said mean luminance calculating step executed when the result of comparison indicates that a correlation does not hold in the vertical or the horizontal direction;

a luminance data pattern being generated on the basis of a half-value data of the subject pixel data and the surrounding pixel data output by any one of said horizontal luminance calculating step, said vertical luminance calculating step, and said mean luminance calculating step.

43. A method in accordance with claim 42, wherein said second interpolating step adds G pixel data diagonally aligning with each other and calculates, if an absolute value of a difference between resulting sums is greater than a third preselected value, the surrounding pixel data in said mean luminance calculating step.

44. A method in accordance with claim 31, wherein said second interpolating step calculates, before calculating the luminance data, a first right oblique correlation value and a first left oblique correlation value with differences between the pixel data of a same color obliquely aligning with each other in two directions with the intermediary of the subject pixel data whose luminance is to be calculated, and compares said first right oblique correlation value and said first left oblique value with a fourth preselected value, said second interpolating step comprising:

a right oblique luminance calculating step for adding, if a result of comparison indicates that a correlation holds in a right oblique direction, the pixel data used to produce the first right oblique correlation value and dividing a resulting sum by a double of a number of pixel data added to thereby produce surrounding pixel data;

a left oblique luminance calculating step for adding, if the result of comparison indicates that a correlation holds in a left oblique direction, the pixel data used to produce the first left oblique correlation value and dividing a resulting sum by a double of a number of pixel data added to thereby produce surrounding pixel data; and a mean luminance calculating step for adding, if the result of comparison indicates that the first right oblique correlation value and the first left oblique correlation value are smaller than the fourth preselected value, all of the pixel data of the same color used to calculate the correlation values and dividing a resulting sum by a double of a number of pixel data used to thereby produce surrounding pixel data;

a luminance data pattern being generated on the basis of half-value data of the subject pixel data and said surrounding pixel data output by any one of said right oblique luminance calculating step, said left oblique luminance calculating step, and said mean luminance calculating step.

45. A method in accordance with claim 44, wherein said second interpolating step compares, before calculating the luminance data, the first right oblique correlation value and the first left oblique correlation value with the fourth preselected value, and adds a half-value of the subject pixel data and the surrounding pixel data produced by said right oblique luminance calculating step or said left oblique luminance calculating step, and further calculates a second right oblique correlation value and a second left oblique correlation value with differences between the pixel data of a different color obliquely aligning with each other in two directions with the intermediary of said subject pixel data, and compares said second right oblique correlation value and said second left oblique value with a fifth preselected value, said second interpolating step further comprising:

a right oblique luminance calculating step for performing, if a result of comparison indicates that a correlation holds in a right oblique direction, a calculation with the pixel data of different color used to produce the second right oblique correlation value and dividing a result of calculation by a double of a number of pixel data used for the calculation to thereby produce surrounding pixel data;

a left oblique luminance calculating step for performing, if the result of comparison indicates that a correlation holds in a left oblique direction, a calculation with the pixel data used to produce the second left oblique correlation value and dividing a result of calculation by a double of a number of pixel data used for the calculation to thereby. produce surrounding pixel data; and a mean luminance calculating step for performing, if the result of comparison indicates that the second right oblique correlation value and the second left oblique correlation value both are smaller than the fifth preselected value, a calculation with all of the pixel data of the different color used to produce the second correlation values and dividing a result of calculation by a double of a number of pixel data used for the calculation to thereby produce surrounding pixel data;

a luminance data pattern being generated by adding a half-value data of the subject pixel data and said surrounding pixel data output by any one of said right oblique luminance calculating step, said left oblique luminance calculating step and said mean luminance calculating step.

46. A method in accordance with claim 44, wherein said second interpolating step compares, before calculating the luminance data, the first right oblique correlation value and the first left oblique correlation value with the fourth preselected value, and adds a half-value of the subject pixel data and the surrounding pixel data produced by said right oblique luminance calculating step or said left oblique luminance calculating step, and further calculates a second right oblique correlation value and a second left oblique correlation value with differences between the pixel data of a different color obliquely aligning with each other in two directions with the intermediary of said subject pixel data, and compares said second right oblique correlation value and said second left oblique value with a fifth preselected value, said second interpolating step further comprising:

a right oblique luminance calculating step for performing, if a result of comparison indicates that a correlation holds in a right oblique direction, a calculation with the pixel data of different color used to produce the second right oblique correlation value and dividing a result of calculation by a double of a number of pixel data used for the calculation to thereby produce surrounding pixel data;

a left oblique luminance calculating step for performing, if the result of comparison indicates that a correlation holds in a left oblique direction, a calculation with the pixel data used to produce the second left oblique correlation value and dividing a result of calculation by a double of a number of pixel data used for the calculation to thereby produce surrounding pixel data; and a mean luminance calculating step for performing, if the result of comparison indicates that the second right oblique correlation value and the second left oblique correlation value both are smaller than the fifth preselected value, a calculation with all of the pixel data of the different color used to produce the second correlation values and dividing a result of calculation by a double of a number of pixel data used for the calculation to thereby produce surrounding pixel data;

a luminance data pattern being generated by adding a half-value data of the subject pixel data and said surrounding pixel data output by any one of said right oblique luminance calculating step, said left oblique luminance calculating step and said mean luminance calculating step;

said second interpolating step rotating, before the calculation, positions of the pixels by 45°, then calculating the first and second correlation values in the horizontal and vertical directions, then comparing said first and second correlation values with the preselected values to thereby calculate luminance data, and gain rotating the positions of said pixels to return said luminance data to original positions.

47. A method in accordance with claim 42, wherein the first correlation value in the horizontal direction and the second correlation value in the vertical direction are respectively represented by a sum of an absolute value of a difference between one pixel of different color horizontally aligning with the other pixel of different color with the intermediary of the subject pixel and the luminance data of said subject pixel and an absolute value of a difference between said other pixel data of different color and the luminance data of said subject pixel, and a sum of an absolute value of a difference between one pixel of different color vertically aligning with the other pixel of different color with the intermediary of said subject pixel and the luminance data of said subject pixel and an absolute value of a difference between said other pixel data of different color and the luminance data of said subject pixel.

48. A method in accordance with claim 45, wherein the second right oblique correlation value and the second left oblique correlation value are respectively represented by an absolute value of the pixel data of different color horizontally aligning with each other with the intermediary of the subject pixel and an absolute value of the pixel data of different color vertically aligning with each other with the intermediary of said subject pixel.

49. A method in accordance with claim 42, wherein said second interpolating step compares, before calculating the luminance data, the first right oblique correlation value and the first left oblique correlation value with the fourth preselected value, and adds a half-value of the subject pixel data and the surrounding pixel data produced by said right oblique luminance calculating step or said left oblique luminance calculating step, and further calculates a second right oblique correlation value and a second left oblique correlation value with differences between the pixel data of a different color obliquely aligning with each other in two directions with the intermediary of said subject pixel data, and compares said second right oblique correlation value and said second left oblique value with a fifth preselected value, said second interpolating step further comprising:

a right oblique luminance calculating step for performing, if a result of comparison indicates that a correlation holds in a right oblique direction, a calculation with the pixel data of different color used to produce the second right oblique correlation value and dividing a result of calculation by a double of a number of pixel data used for the calculation to thereby produce surrounding pixel data;

a left oblique luminance calculating step for performing, if the result of comparison indicates that a correlation holds in a left oblique direction, a calculation with the pixel data used to produce the second left oblique correlation value and dividing a result of calculation by a double of a number of pixel data used for the calculation to thereby produce surrounding pixel data; and a mean luminance calculating step for performing, if the result of comparison indicates that the second right oblique correlation value and the second left oblique correlation value both are smaller than the fifth preselected value, a calculation with all of the pixel data of the different color used to produce the second correlation values and dividing a result of calculation by a double of a number of pixel data used for the calculation to thereby produce surrounding pixel data;

a luminance data pattern being generated by adding a half-value data of the subject pixel data and said surrounding pixel data output by any one of said right oblique luminance calculating step, said left oblique luminance calculating step and said mean luminance calculating step;

the second correlation values being calculated by use of the pixel data closer to the subject pixel than the pixel data used to calculate the first correlation values.

50. A method in accordance with claim 39, wherein said plane interpolating step uses the pixel data of the respective colors generated, in said first interpolating step, for the virtual photosensitive cells in the G square lattice and the RB full-checker pattern shifted from said G square by one half of the pixel pitch, and the luminance data generated in said second interpolating step, said plane interpolating step comprising:

a step assigned to plane interpolation of the G pixel data for adding a difference between a mean value of the actually generated G pixel data adjoining a subject pixel to be interpolated in the horizontal and/or the vertical direction and a mean value of the luminance data adjoining said subject pixel in the horizontal and/or the vertical direction and the luminance data corresponding to the position of said subject pixel;

a first R step assigned to plane interpolation of the R pixel data for adding the luminance data of the position of the subject pixel to a difference between a mean value of the actually generated R pixel data obliquely adjoining said subject pixel and a mean value of the luminance data adjoining said subject pixel in a same direction as said actually generated R pixel data;

a second R step assigned to the plane interpolation of the R pixel data for adding the luminance data for remaining R of the subject pixel to a difference between a mean value of the pixel data located an equal distance and produced by said first R step and a mean value of the luminance data located at said equal distance to thereby generate pixel data R for the remaining R;

a third R step assigned to the plane interpolation of the R pixel data for adding the luminance data for remaining R of the subject pixel to a difference between a mean value of the R pixel data closest to the subject pixel and produced by said first and second R steps and a mean value of the luminance data corresponding to the pixels used to produce said mean value to thereby generate pixel data for the remaining R of the subject pixel;

a first B step assigned to plane interpolation of the B pixel data for adding the luminance data of the position of the subject pixel to a difference between a mean value of the actually generated B pixel data obliquely adjoining said subject pixel and a mean value of the luminance data adjoining said subject pixel in a same direction as said actually generated B pixel data;

a second B step assigned to the plane interpolation of the B pixel data for adding the luminance data for remaining B of the subject pixel to a difference between a mean value of the pixel data located an equal distance and produced by said first B step and a mean value of the luminance data located at said equal distance to thereby generate B pixel data for the remaining B; and a third B step assigned to the plane interpolation of the B pixel data for adding the luminance data for remaining B of the subject pixel to a difference between a mean value of the B pixel data closest to the subject pixel and produced by said first and second B steps and a mean value of the luminance data corresponding to the pixels used to produce said mean value to thereby generate pixel data for the remaining B of the subject pixel.

51. A method in accordance with claim 30, wherein said band broadening step comprises:

an absent data interpolating step for interpolating, by using the pixel data and the luminance data produced by said virtual pixel interpolating step, absence of pixel data and luminance data at positions of the photosensitive cells;

an item-by-item data generating step for generating, by using the pixel data and the luminance data produced by said absent data interpolating step and said virtual pixel interpolating step, a component signal having importance attached to faithful color reproducibility and a component signal having importance attached to resolution in the horizontal and/or the vertical direction; and an R, G and B matrix step for generating R, G and B by using the luminance data and the chrominance data produced by said item-by-item data generating step.

52. A method in accordance with claim 51, wherein said item-by-item data generating step comprises:

a color reproducibility step for executing the calculation with the pixel data output from the photosensitive cells in accordance with the shifted arrangement, while attaching importance to faithful color reproducibility in the horizontal and/or the vertical direction; and a resolution step for executing the calculation with the pixel data while attaching importance to resolution in the horizontal and/or the vertical direction.

53. A method in accordance with claim 52, wherein said item-by-item data generating method comprises:

a pseudo-adding step for adding the component signals attaching importance to color reproducibility and resolution, respectively, with respect to a pseudo-frequency; and a band overlap preventing step for preventing a same frequency band from overlapping when importance is attached to resolution in the horizontal and vertical directions.

54. A method in accordance with claim 53, wherein said pseudo-adding step comprises:

a subtracting step for subtracting a second component signal attaching importance to color reproducibility and lying in a frequency band lower than a frequency band of a first component signal produced by said pixel data generating step, from said frequency band of said first component signal attaching importance to resolution;

a distortion preventing step for executing processing with an output of said subtracting step and said first component signal for obviating aliasing distortions; and a second adding step for adding resulting outputs of said distortion preventing step.

55. A method in accordance with claim 53, wherein said band overlap preventing step comprises:

a band limiting step for limiting a frequency band of one of a horizontal and a vertical component signal identical with a frequency band of the other component signal; and an adding step for adding an output of said band limiting step and the other component signal.

56. A method in accordance with claim 31, wherein optics projects an image of a scene at least to two photosensitive surfaces constituted by the photosensitive cells bidimensionally arranged, wherein said two photosensitive surfaces have respective geometric centers shifted from each other by one half of the pixel pitch in a direction of rows and a direction of columns, and wherein said second interpolating step uses pixel data produced by spatially superposing images of the scene incident to said two photosensitive surfaces via filters positioned in front of said photosensitive surfaces in one-to-one correspondence to said photosensitive surfaces for separating incident light into complementary colors or complementary colors and G.

* * * * *